(12) United States Patent
Carruthers

(10) Patent No.: US 11,040,457 B2
(45) Date of Patent: Jun. 22, 2021

(54) CABLE MANAGEMENT SYSTEM AND DEVICES

(71) Applicant: DROSSBACH NORTH AMERICA INCORPORATED, Trenton (CA)

(72) Inventor: David A. Carruthers, Trenton (CA)

(73) Assignee: DROSSBACH NORTH AMERICA INCORPORATED, Trenton (CA)

( * ) Notice: Subject to any disclaimer, the term of this patent is extended or adjusted under 35 U.S.C. 154(b) by 0 days.

(21) Appl. No.: 15/120,272

(22) PCT Filed: Mar. 6, 2015

(86) PCT No.: PCT/CA2015/050170
§ 371 (c)(1),
(2) Date: Aug. 19, 2016

(87) PCT Pub. No.: WO2015/131288
PCT Pub. Date: Sep. 11, 2015

(65) Prior Publication Data
US 2017/0059059 A1   Mar. 2, 2017

Related U.S. Application Data

(60) Provisional application No. 61/948,699, filed on Mar. 6, 2014.

(51) Int. Cl.
*B25J 19/00* (2006.01)
(52) U.S. Cl.
CPC ........... *B25J 19/0025* (2013.01); *B25J 19/00* (2013.01); *B25J 19/0029* (2013.01)

(58) Field of Classification Search
CPC .... B25J 19/00; B25J 19/0025; B25J 19/0029; B25J 19/0091; F16L 3/01; H02G 11/006
(Continued)

(56) References Cited

U.S. PATENT DOCUMENTS 4,709,715 A   12/1987   Knight
6,293,504 B1 *  9/2001  Hartmann ............. F16L 3/1075
24/270
(Continued)

FOREIGN PATENT DOCUMENTS

DE   102009017814 A1 * 11/2010  .......... B25J 19/0025
DE   102009037516 A1 *  3/2011  .......... B25J 19/0025
(Continued)

OTHER PUBLICATIONS

International Search Report from corresponding PCT Appln. No. PCT/CA2015/050170 dated May 29, 2015.

*Primary Examiner* — Joseph Brown
(74) *Attorney, Agent, or Firm* — Grossman, Tucker, Perreault & Pfleger, PLLC

(57) ABSTRACT

A system and devices for guiding flexible corrugated hoses in industrial and robotic applications, where it is common to require tubing and electrical cables to be routed to various locations. A device for guiding such flexible hoses is described, comprising a rigid tube for containing a length of flexible corrugated hose and a spring element. A first end of the spring is fixed to an end of the tube, and a second end of the spring is fixed to an end of the flexible corrugated hose. The flexible corrugated hose may be drawn out of the tube against the force of the spring element, the spring element urging the flexible hose to return to a home position.

11 Claims, 78 Drawing Sheets

(58) Field of Classification Search
USPC .......................................... 74/490.01, 490.02
See application file for complete search history.

(56) References Cited

U.S. PATENT DOCUMENTS

| | | | |
|---|---|---|---|
| 6,811,124 B2 | 11/2004 | Karlinger | |
| 7,644,571 B2 * | 1/2010 | Melcher ............... | B25J 19/0025 248/49 |
| 7,810,764 B2 | 10/2010 | Burlot | |
| 7,810,765 B2 | 10/2010 | Burlot | |
| 2014/0030032 A1 | 1/2014 | Kuehn | |

FOREIGN PATENT DOCUMENTS

| | | | | |
|---|---|---|---|---|
| DE | 102009037517 A1 * | 3/2011 | .......... | B25J 19/0025 |
| DE | 102010019269 A1 * | 11/2011 | .......... | B25J 19/0025 |
| DE | 102011015984 A1 * | 10/2012 | .......... | B25J 19/0025 |
| EP | 2392436 A1 * | 12/2011 | .......... | B25J 19/0025 |
| GB | 823903 | 11/1959 | | |
| WO | WO-2010043214 A1 * | 4/2010 | .......... | B25J 19/0025 |

* cited by examiner

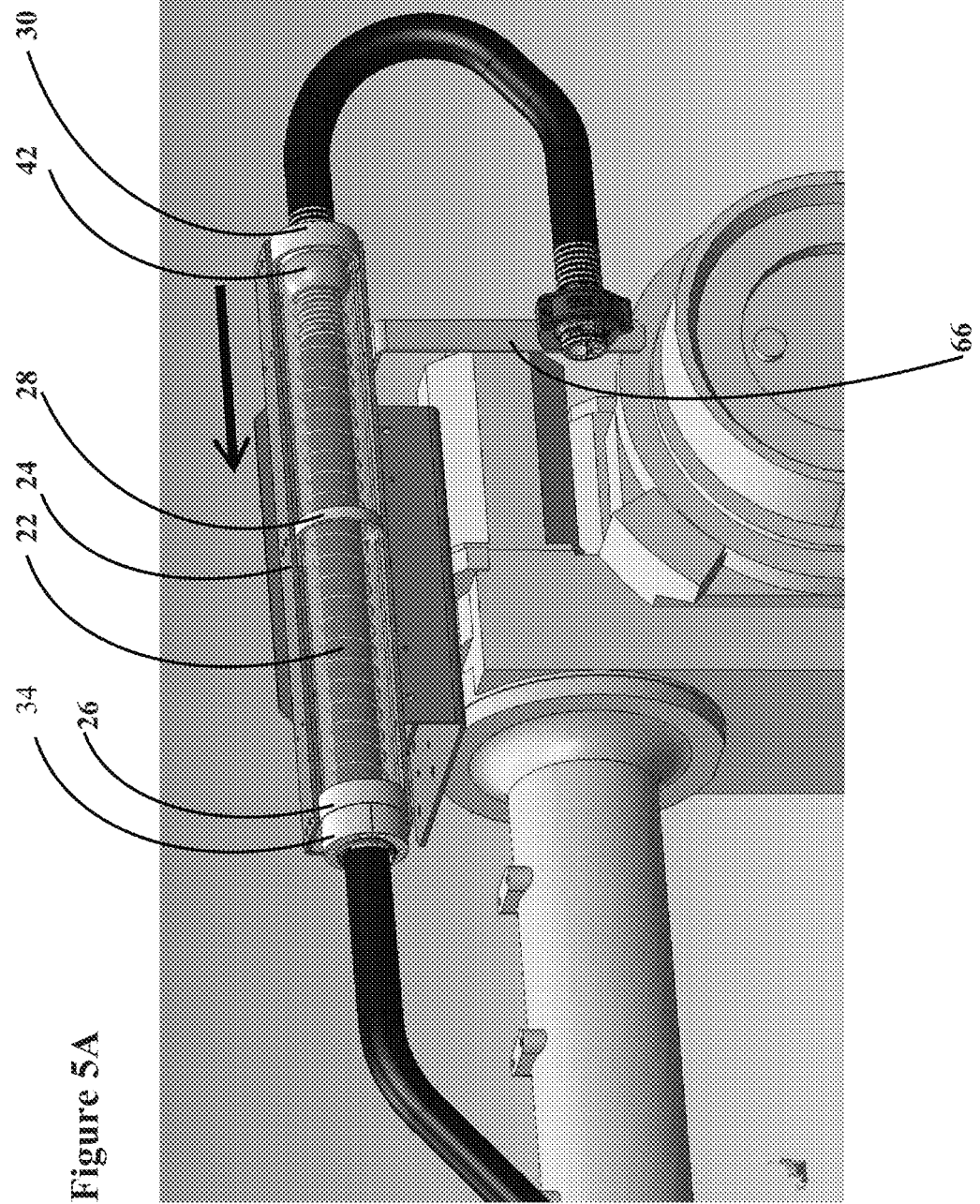

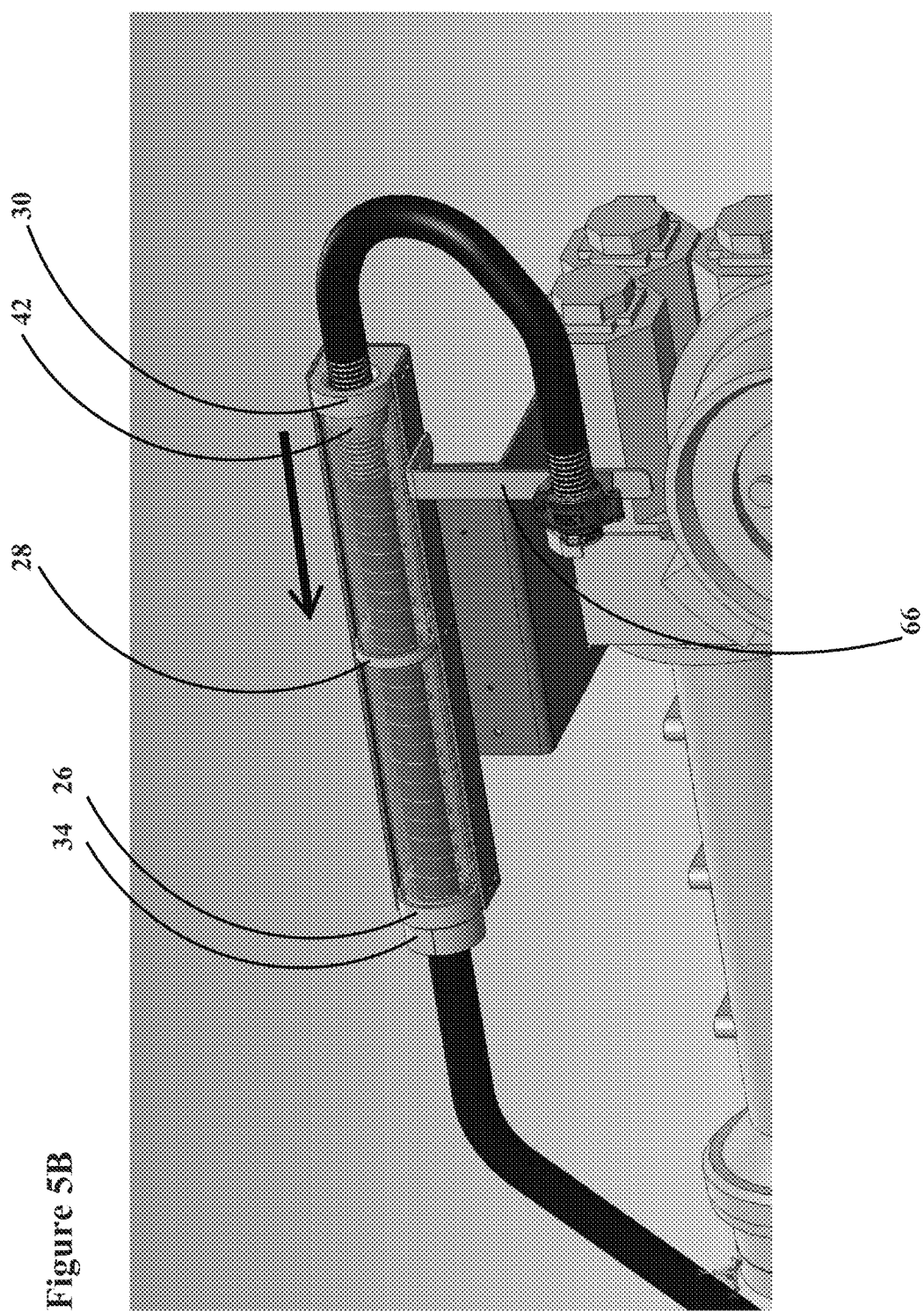

| Assembly Area # | Reiku Part # | Part Description | Qty Req'd Per Robot | Unit of Measurement | Std Pack Qty | | | | |
|---|---|---|---|---|---|---|---|---|---|
| 1 and 4 | PASSB-36S | Gripping Clamp | 2 | PC | 10 | | | | |
| 1 | PAKMB-36/36 | Combi Middle Jaw | 1 | PC | 10 | | | | |
| 1 and 4 | TKKSB-36TBA | Custom Cabletar | 2 | PC | 10 | | | | |
| 2 Inside Energy Tube | POFHB-36/36 | Spring Holder | 1 | PC | 10 | | | | |
| 2 Inside Energy Tube | DFST-36NEW | 36" Spring | 1 | PC | 10 | | | | |
| 2 Inside Energy Tube | PAPRB-36G | Protector | 1 | PC | 10 | | | | |
| 3 Installed on Conduit Area | PAPKB-36 | Cable Tie Protector | 2 | PC | 10 | | | | |
| 4 | PAVGB-36 | Connection Joint | 1 | PC | 10 | | | | |
| 1 TO 4 | PARAB-36G | PA12 Conduit | 5 | MT | 30 | | | | |
| Between 1 & 2 | PAMCN-36 | Conduit Marker | 2 | PC | 25 | | | | |
| ENERGY TUBE | | Spring box | 1 KIT | | 10 | | | | |
| ALL MOUNTING HARWARE | | | 1 KIT | | | | | | |

ALL ITEMS IN RED ARE OFF THE SHELF REIKU COMPONENTS

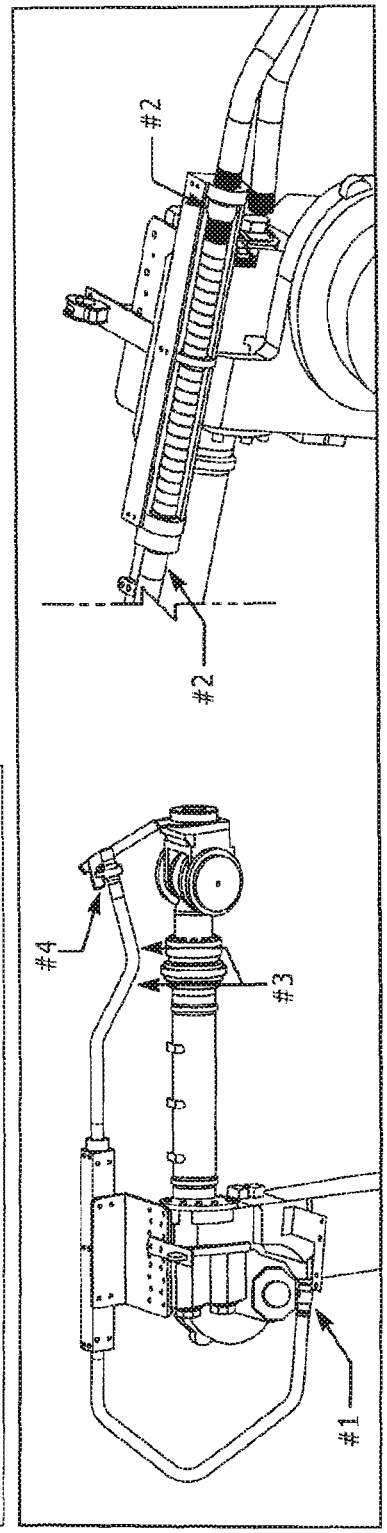

FIG. 30

| Assembly Area # | Reiku part # | Part Description | Qty Req'd Per Robot | Unit of Measurement | Std Pack Qty | | | | | |
|---|---|---|---|---|---|---|---|---|---|---|
| 1 | PASSB-52M | Gripping Clamp | 1 | PC | 10 | | | | | |
| 1 | PAMBB-52 | Combi Middle Jaw | 1 | PC | 10 | | | | | |
| 1 and 4 | TKKSB-52TBA | Custom Cabletar | 2 | PC | 10 | | | | | |
| 2 Inside Energy Tube | PAFHB-70 | Spring Holder | 1 | PC | 10 | | | | | |
| 2 Inside Energy Tube | DFST-5270 | 30" Spring | 1 | PC | 10 | | | | | |
| 2 Inside Energy Tube & 4 | PAPRB-52G | Protector | 2 | PC | 10 | | | | | |
| 3 Installed on Conduit Area | PAPRB-52 | Rotary Protector | 2 | | | | | | | |
| 4 | PASSB-70M | Gripping Clamp | 1 | PC | 10 | | | | | |
| 4 | PAKGB-52 | Ball Joint Jaw | 1 | NT | 30 | | | | | |
| 1 TO 4 | PARAB-52G | PA12 Conduit | 5 | PC | 25 | | | | | |
| Between 1 & 2 | PAMCN-52 | Conduit Marker | 2 | PC | 10 | | | | | |
| ENERGY TUBE | | Spring box | 1 KIT | | | | | | | |
| ALL MOUNTING HARWARE | | | 1 KIT | | | | | | | |

ALL ITEMS IN RED ARE OFF THE SHELF REIKU COMPONENTS

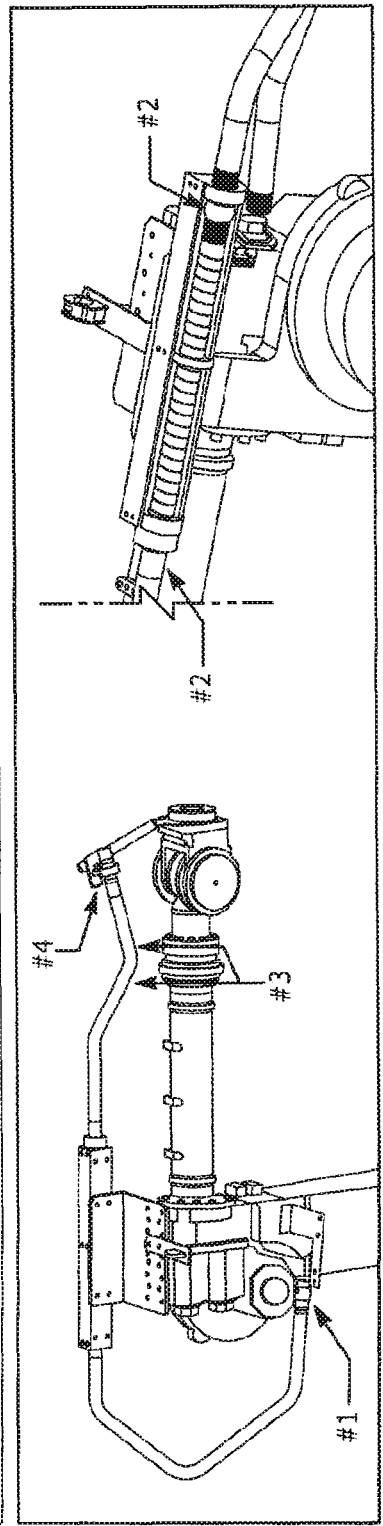

FIG. 31

| Assembly Area # | Reiku Part # | Part Description | Qty Req'd Per Robot | Unit of Measurement | Std Pack Qty | | | |
|---|---|---|---|---|---|---|---|---|
| 1 and 4 | PASSB-70M | Gripping Clamp | 2 | PC | 10 | | | |
| 1 | PAKMB-70 | Combi Middle Jaw | 1 | PC | 10 | | | |
| 1 and 4 | TKKSB-70TB | Custom Cabletar | 2 | PC | 10 | | | |
| 2 Inside Energy Tube | POFHB-70 | Spring Holder | 1 | PC | 10 | | | |
| 2 Inside Energy Tube | DFST-30 | 36" Spring | 1 | PC | 10 | | | |
| 2 Inside Energy Tube | PAPRB-70G | Protector | 1 | PC | 10 | | | |
| 3 Installed on Conduit Area | PAPKB-70G | Rotary Protector | 2 | PC | 10 | | | |
| 4 | PAVGB-70 | Connection Joint | 1 | PC | 10 | | | |
| 1 TO 4 | PARAB-70G | PA12 Conduit | 5 | MT | 30 | | | |
| Between 1 & 2 | PAMCN-70 | Conduit Marker | 2 | PC | 25 | | | |
| ENERGY TUBE | | Spring box | 1 KIT | | 10 | | | |
| ALL MOUNTING HARWARE | | | 1 KIT | | | | | |

ALL ITEMS IN RED ARE OFF THE SHELF REIKU COMPONENTS

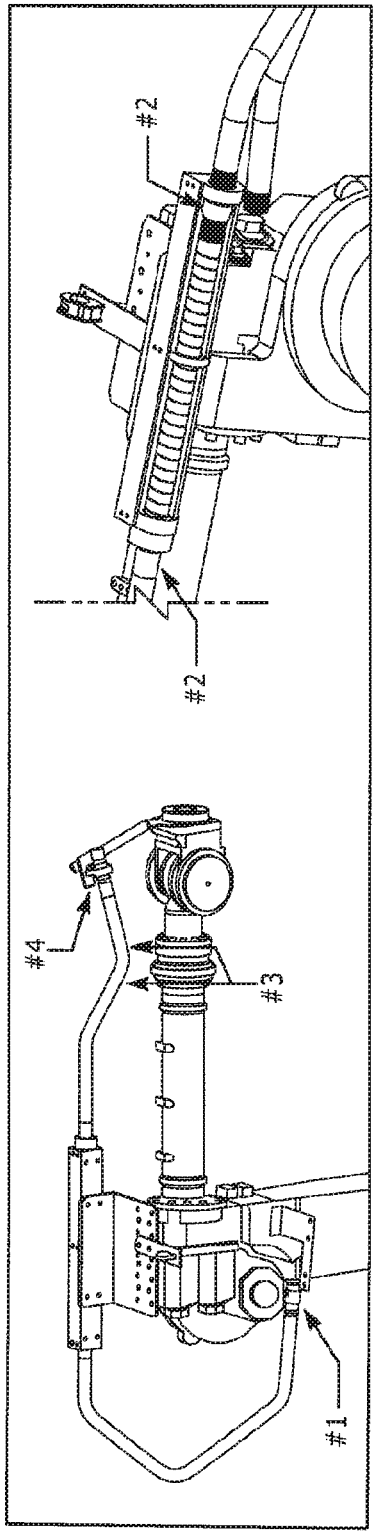

FIG. 32

CABLE MANAGEMENT SYSTEM AND DEVICES

FIELD OF INVENTION

The present invention relates to a system and devices for guiding cables and hoses, and in particular, relates to systems and devices for guiding flexible corrugated hoses in industrial and robotic applications.

BACKGROUND OF THE INVENTION

In the case of many machines and in industrial environments, it is common to require tubing and electrical cables to be routed to various locations. Industrial robots, for example, generally require various tubing and cables to be routed along and around moving parts, carrying pneumatic pressure or power to actuators, connecting electrical sensors to control systems, providing cooling liquid or cutting gases to various tools, etc.

These tubing and cables are generally collected together into flexible hoses or guides to organize the various tubing and cables, making it easier to determine the physical range of motion for the system. The flexible hoses or guides also prevent the various tubing and cables from being intertwined, strained or otherwise physically damaged.

In many applications a large range of motion is required, resulting in a great deal of slack at times. This slack in the flexible hoses or guides must be managed to prevent damage, friction and entangling over the thousands of cycles that these systems may perform. Although some slack compensation and management systems exist, such as unprotected spring coverings, none are very effective. As well, many of these systems consume valuable space in the industrial environment.

There is therefore a need for an improved system and devices for guiding tubing and cables in an industrial environment, maintaining organization and flexibility. Such systems and devices should preferably provide guiding and compensation in a compact, simple form which can be located in various positions on a robot or other machine.

SUMMARY OF THE INVENTION

It is an object of the invention to provide an improved system and devices for guiding tubing and cables in an industrial environment. The systems and devices of the invention maintain cable and hose organization and flexibility, providing guiding and longitudinally compensating for slack. The systems and devices of the invention are compact and simple, and can easily be located in various positions on a robot or other machine.

According to one aspect of the present invention there is provided a device for guiding at least one supply line, comprising: a flexible corrugated hose for containing the at least one supply line; a rigid tube for containing at least a portion of the longitudinal length of the flexible corrugated hose; a spring element enclosed by the tube, a first end of the spring being fixed to an end of the tube, and a second end of the spring being fixed to an end of the flexible corrugated hose, whereby the flexible corrugated hose may be drawn out of the tube against the force of the spring element, in a longitudinal direction.

According to another aspect of the present invention there is provided a device for guiding a flexible corrugated hose, comprising: a rigid tube for containing at least a portion of the longitudinal length of the flexible corrugated hose, the tube having an active end and a fixed or passive end; a compression spring enclosed by the tube, a first end of the compression spring being connected to the active end of the tube, and a second end of the compression spring being connected to an end of the flexible corrugated hose, whereby the flexible corrugated hose may be drawn out of the tube against the force of the compression spring, in a longitudinal direction.

According to an additional aspect of the present invention there is provided a device for guiding a flexible corrugated hose, comprising: a tube for containing at least a portion of the longitudinal length of the flexible corrugated hose, the tube having an active end and a fixed or passive end; an extension spring enclosed by the tube, a first end of the extension spring being connected to the fixed or passive end of the tube, and a second end of the extension spring being connected to an end of the flexible corrugated hose, whereby the flexible corrugated hose may be drawn out of the tube against the force of the extension spring, in a longitudinal direction.

According to a further aspect of the present invention there is provided a fitting for a robotic arm comprising: an arc-shaped wall comprising a portion of a cylinder wall; and first and second plates fixed to opposite, top and bottom edges, of the arc-shaped wall, the first and second plates for mounting to a joint of the robotic arm.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent from the following description in which reference is made to the appended drawings wherein:

FIGS. 5A to 5I show the details of an exemplary energy tube design in accordance with a further embodiment of the present invention.

FIG. 30 shows a bill of materials for a 36 mm cable saver in accordance with a further embodiment of the present invention.

FIG. 31 shows a bill of materials for a 52 mm cable saver in accordance with a further embodiment of the present invention.

FIG. 32 shows a bill of materials for a 70 mm cable saver in accordance with a further embodiment of the present invention.

DETAILED DESCRIPTION

Figure 1:
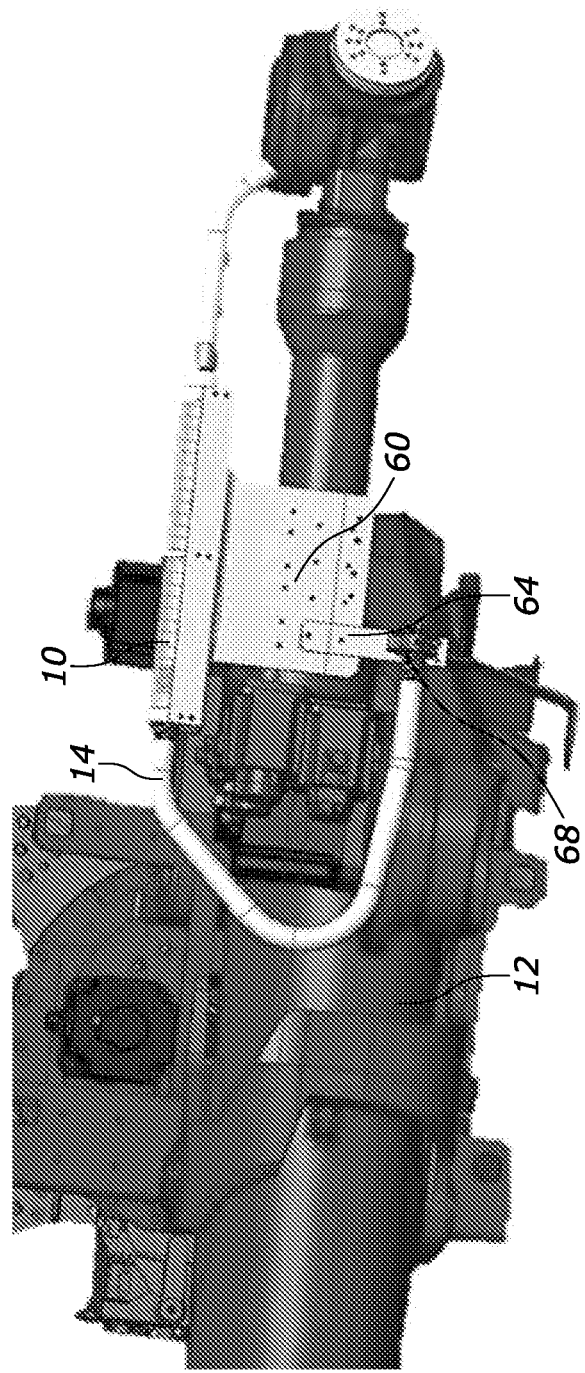
FIG. 1 shows an example of left side installation in accordance with an embodiment of the present invention.

One or more currently preferred embodiments have been described by way of example. It will be apparent to persons skilled in the art that a number of variations and modifications can be made without departing from the scope of the invention as defined in the claims.

Two primary devices are shown in the attached figures and are described herein: the Cable Saver 10 and the Cow's Mouth 80. A variety of support brackets and components used to assemble the Cable Saver 10 and the Cow's Mouth 80 are also shown and described. These are simply exemplary implementations of the inventions. A person skilled in the art would appreciate that the concepts of the invention could be implemented in many other ways:

Cable Saver:

The Cable Saver 10 provides a system that is inserted in-line with a corrugated flexible hose 14, providing it with longitudinal slack in a controlled, organized manner. If an arm or tool of a robot 12 is extended away from the Cable Saver 10, corrugated flexible hose 14 is drawn from the Cable Saver 10. If the arm or tool then returns closer to the Cable Saver 10, slack in the flexible corrugated hose 14 is drawn back into the Cable Saver 10 by a spring element 22.

In short, the Cable Saver 10 system consists of a length of corrugated flexible hose 14 which may carry a number of tubes, cables or hoses that are required to operate the robot 12. A length of the flexible corrugated hose 14 rests inside a larger, longitudinal rigid tube 20 which makes up the body of the Cable Saver 10. A spring element 22 inside the longitudinal rigid tube 20 urges the end of the corrugated flexible hose 14 into the longitudinal rigid tube 20. This is done by fixing one end of the spring element 22 to an end of the longitudinal rigid tube 20 with an entrance clamp or brace, and fixing the other end of the spring element 22 to a position on the corrugated flexible hose 14 with a circular clamp which fits inside the longitudinal rigid tube 20. The spring element 22 may be attached to either end of the longitudinal rigid tube 20, depending on whether the spring element 22 is a compression spring or an extension spring. The longitudinal rigid tube 20 rests in a formed support channel 24 which consists of side walls and a base, the longitudinal rigid tube 20 being held in the formed support channel 24 by way of a front plate 26, middle support 28 and back plate 30. The formed support channel 24 is drilled and tapped to accommodate a variety of mounting arrangements including brackets described hereinafter. Collectively, the combination of the spring element 22 and the longitudinal rigid tube 20 are referred to hereinafter as a "Spring Tube" or "Energy Tube" 40.

The attached FIGS. 13 to 32 present drawings and a bill of materials for three implementations of such a Cable Saver 10 system: a 36 mm diameter design, a 52 mm design and a 70 mm design. These are standard dimensions for corrugated flexible hose 14, but of course, other dimensions may also be used.

The Cable Saver 10 has a number of advantages over existing robotic and industrial cable management systems. A primary advantage of the Cable Saver 10 is its adaptability. The Cable Saver 10 has been designed so that it can be installed in multiple locations in robotic applications, maximizing the effectiveness for providing an optimum cable management solution. The Cable Saver 10 can be mounted on top of the robot 12, on the left side or right side (see FIGS. 1 and 2 respectively) or directly on top of a robot's Axis 3 location. The Cable Saver 10 can also be mounted onto either side of the robot 12 for applications where there is a height restriction. In an automated manufacturing cell there are generally clearance restrictions in the robot operating areas. Sometimes robots are placed beside walls or even side by side with other robots, and the ability to put the cable protection on opposing sides from potential interference reduces the potential of the cables and hoses becoming intertwined.

Note that while the cable management components in the figures are generally shown as smooth, they are typically and preferably implemented as flexible, corrugated cable guides. Note also, that the longitudinal rigid tubes 20 are shown in the figures as being transparent. This was done simply so that the internal spring element 22 and other components are visible. Typically, the longitudinal rigid tubes 20 will not be transparent.

Figure 3:
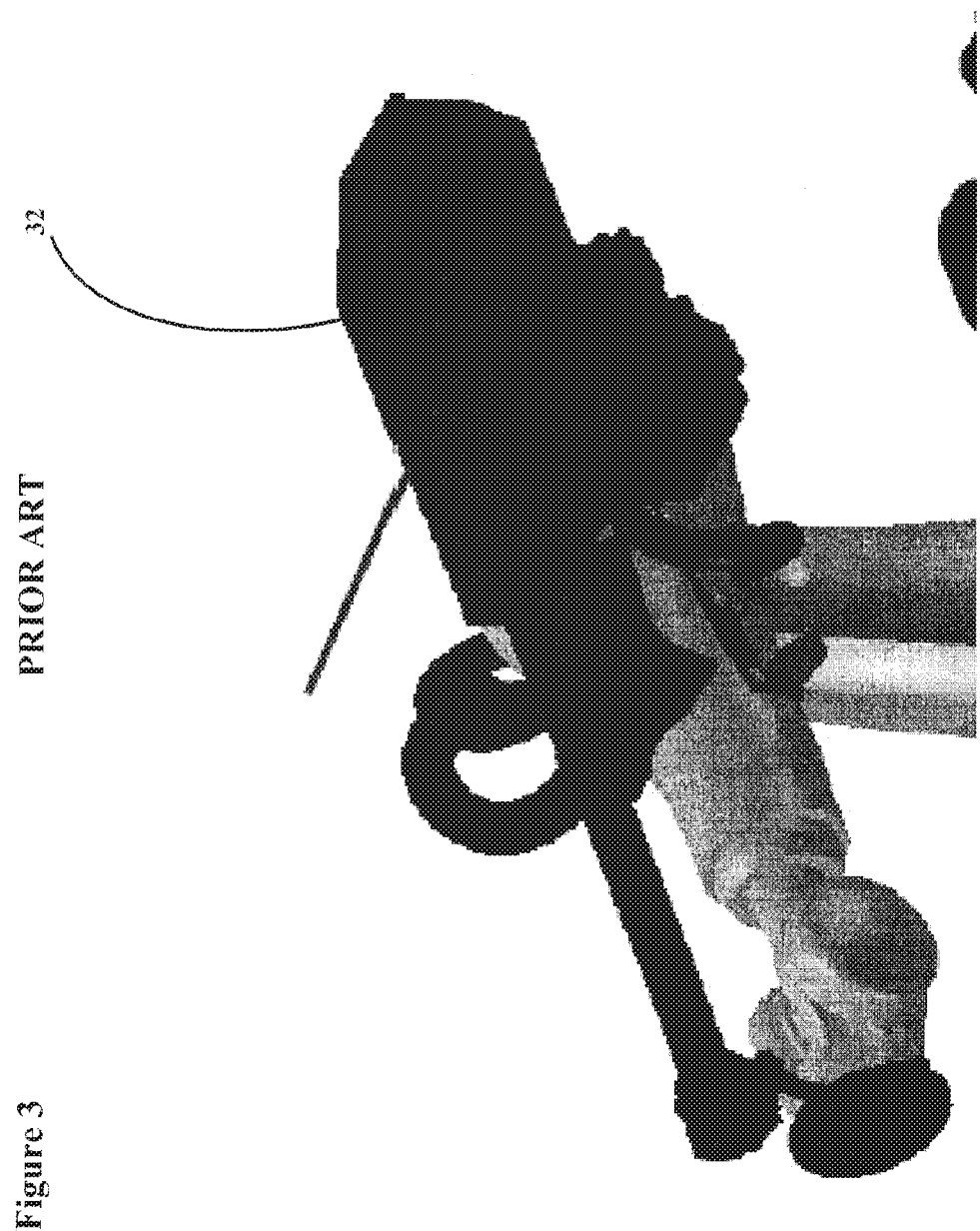
FIG. 3 shows an example of competitor "Box" installation.

Some existing cable management systems utilize a large "box" 32 that only mounts in one area on the robot known as the top of Axis 3 (see FIG. 3). This is valuable real estate on a robot 12 as this is the primary area for engineers to locate all of their coolant water, electrical, pneumatic and communication junction boxes. Thus, it is not desirable to have a system that can only be installed in such a location. As shown in FIG. 3, it is clear that the prior art "box" 32 completely consumes all of the space in this area, which is not generally acceptable or desirable. Such a cable management "box" 32 also restricts the length of service loop that can be retracted in the competitor's systems. Existing competitor products are designed solely to be used with 70 mm I.D. conduit which is costly and too large for over 75% of robotic installations. In contrast, the Cable Saver 10 may be implemented in various sizes, such as the 36 mm, 52 mm and 70 mm I.D. sizes shown in the drawings.

Figure 4:
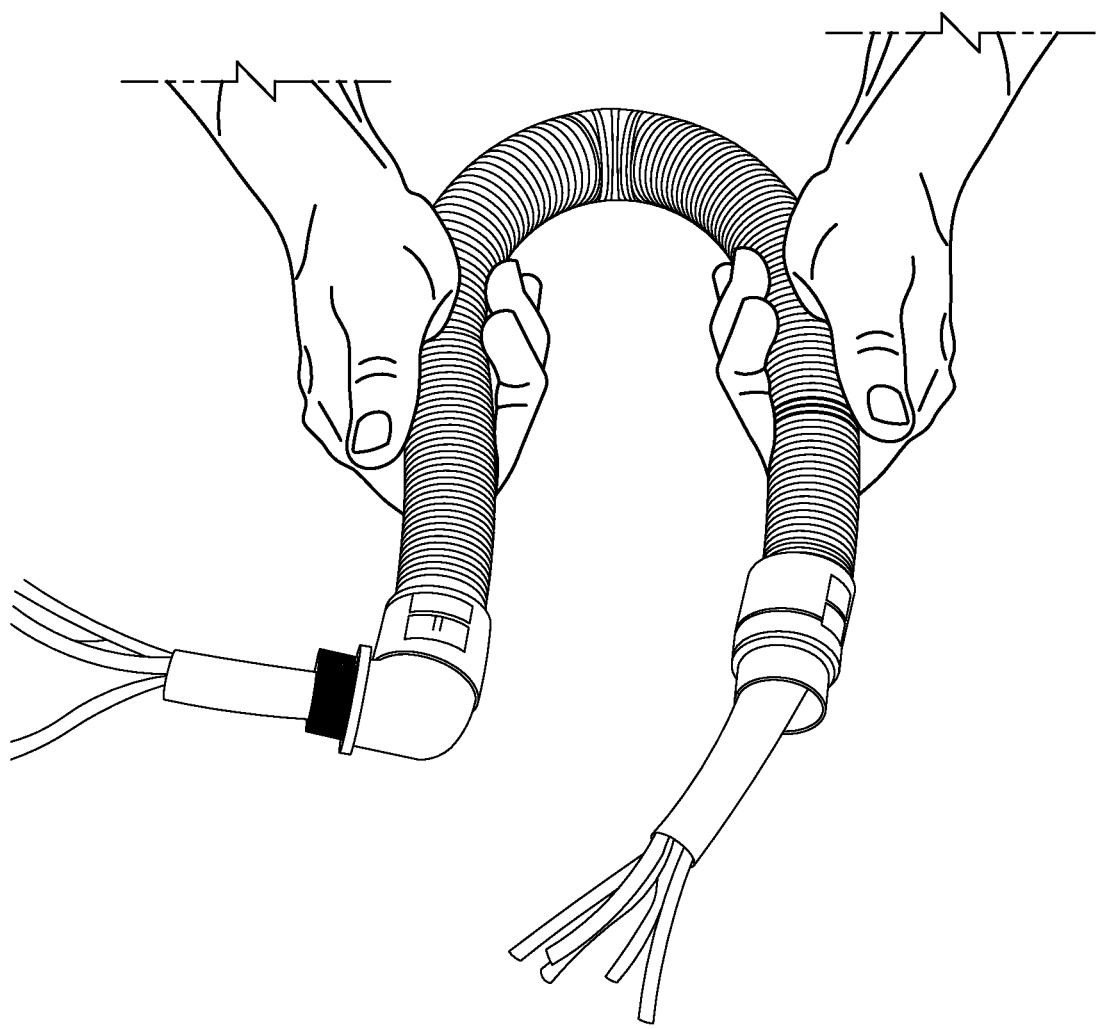
FIG. 4 shows a corrugated hose assembly in accordance with a further embodiment of the present invention.

Some prior art cable management "boxes" 32 have a tight 180° turn that may impede on the conduit making a comfortable bend radius inside the confines of the box. In contrast, the linear design of the Cable Saver 10 described herein avoids this problem. As well, the design described herein preferably uses corrugated conduit which does not suffer loss of inside diameter (I.D.) like traditional smooth wall conduit. The parallel rings of the corrugated flexible conduit maintain the I.D. without deformation when subjected to a bend radius, unlike smooth wall conduits which distorts under such a bend. Additional corrugated tubing fittings may also be used with the system to remove torsional, axial and longitudinal forces from the corrugated flexible conduit, in turn mitigating the extent of such forces on the cables and hoses contained in the corrugated flexible conduit. FIG. 4 presents a photo of an exemplary flexible corrugated tubing system.

Over 85% of dynamic automated/robotic "downtime" can be directly attributed to cable and hose failure due to mechanical or environmental influences. The cables and hoses required to provide services and commands to the automated equipment are subjected to repeated mechanical flexing and dynamic loads along with other various environmental influences such as heat, U.V. (ultraviolet) rays, chemical exposure, sparks, welding slag, grease, water, coolants, etc. The use of the flexible corrugated hose 14 and enclosed nature of the Cable Saver 10 system provides protection to the cables and hoses, relieving them of the majority of the mechanical and environmental forces/stresses they would endure without the protection of the Cable Saver 10 system.

However, providing mechanical and environmental protection is not the only issue in providing an effective dynamic cable management solution. As the word "dynamic" suggests, automated/robotic applications involve motion and in order to service the multitude of potential movements that a robot 12 can make, a surplus or "service loop" of cables and hoses covered in flexible corrugated hose 14 must be present in order to allow the robots 12 to make their movements. The ability to control and safely locate this service loop of cables and hoses is one of the primary functions of the Cable Saver 10.

Figure 6:
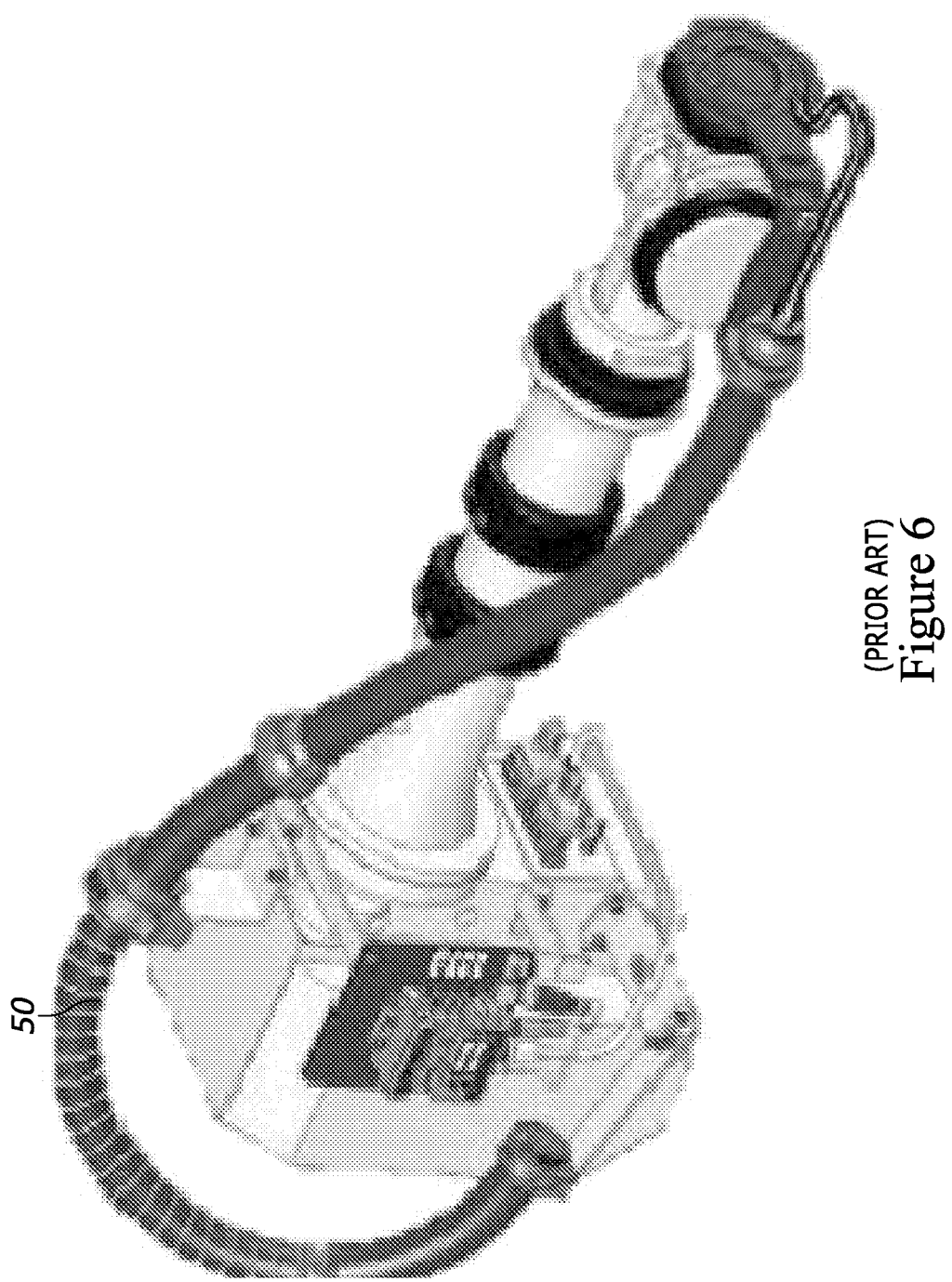
FIGS. 6 and 7 show examples of "Component" Installations.
Figure 7:
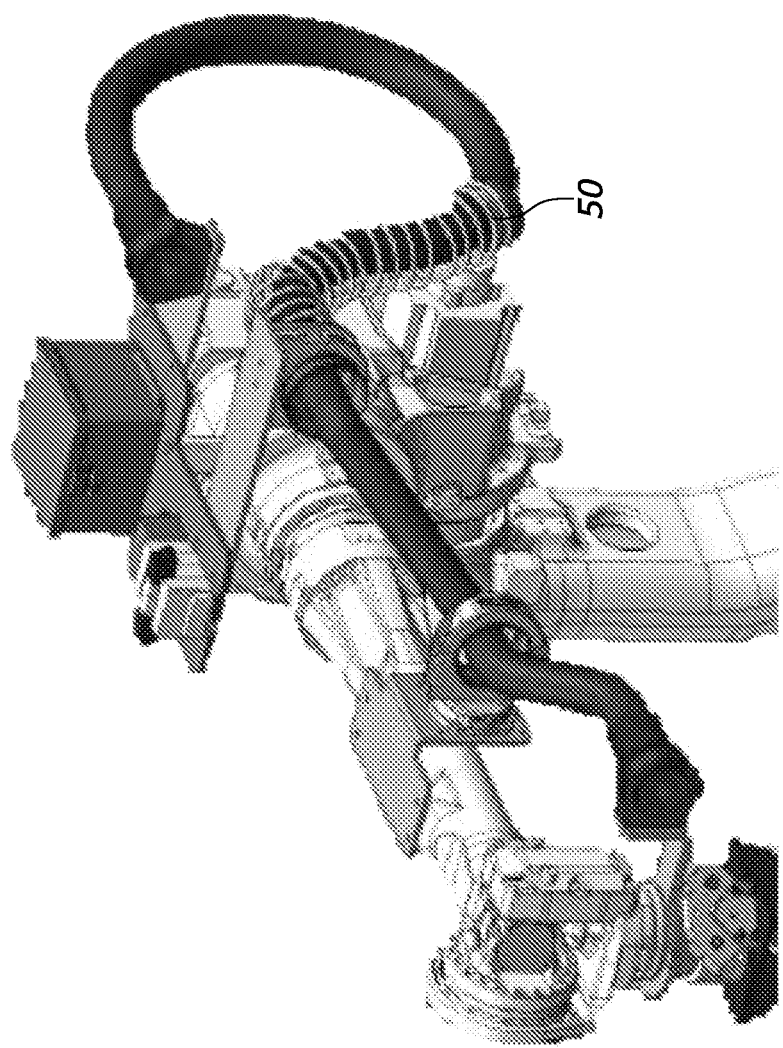

Prior to the development of the Cable Saver 10 in order to provide dynamic cable management solutions without consuming the valuable area on top of Axis 3 and to offer the required longer length of conduit service loop, "component" solutions 50 such as those shown in FIGS. 6 and 7, could be used. The previous "component" installations 50 did provide a degree of cable management and also enabled the use of the Axis 3 area for the installation of supply service boxes as previously discussed. However, these "component-type" installations 50 were very time consuming in the design and installation stages as various hardware and mounting plates would be required to locate the various components to be utilized. The new "modular" mounting hardware for the Cable Saver 10 enables the delivery of a single integrated system to customers that can be mounted on their robot in considerably less time.

Also with the previous "component" installations 50 the weight of the spring was a constant issue. Controlling the "sag" and the spring rubbing on the robot 12 has now been eliminated as the spring element 22 of the inventive system is housed inside the longitudinal rigid tube 20 of the Cable Saver 10.

The retraction energy or "K" factor of the spring was not efficiently utilized in the "component" installations 50 either. As the spring was not housed or contained, the spring would move from side to side, deflecting some of the energy into lateral movements. Now that the spring element 22 is housed in a longitudinal rigid tube 20, the "K" factor of the spring element 22 is directed to primarily lateral energy and the movement of the flexible corrugated hose 14 is now more linear versus a combination of side to side and lineal motion in the past.

The system of the invention may be used in a broad range of applications. The amount of area inside the flexible corrugated hose 14 that the robotic application will require is dictated by the robot's application, as are the exact quantity and the O.D.'s for each cable and hose that the EOAT (end of arm tool) requires. An example where a larger 70 mm I.D. conduit would be required is a robotic spot welding application where there would be large diameter cables carrying the high voltage current out to the "heavy" welding gun located at the end of arm tool area. This could consist of a single 2"+O.D. multi-conductor cable or a series of 3×¾" single conductor cables. In conjunction with the weld current cable(s) there would be a requirement for anywhere from two to six individual ¾" O.D. coolant hoses utilized to cool the welding gun and current transformer(s). In such a case there may also be various communication cables carrying visual/camera signals to locate the EOAT welding device or XYZ optical sensor communication cables, plus assorted power cables for the Robot motors. Such a welding application would be considered a large payload and a physical sized 210 kg robot would be utilized.

As another example a 36 mm Cable Saver 10 might be used with a smaller 70 kg payload on a material handling robot, where everything is scaled down accordingly. At the EOAT there might be two or three pneumatic "gripping" tools that each only require a ⅜" airline, and there might be two small diameter communication cables that interact with optical sensors that tell the "gripper" that the part is in position to be picked up. As noted above, competing cable management systems typically offer only a single, 70 mm "box" solution 32. Offering three different sizes in a modular solution as in the case of the system described herein, provides numerous advantages. The smaller sized 36 mm Cable Saver 10 takes up less of a "footprint" on a smaller robot 12 as well as providing considerable cost savings due to the use of smaller, less expensive components. As well, the smaller system provides increased clearances for the robot 12 operating in close tolerance workspaces.

As described hereinafter, mounting hardware for the energy tube 40 has been designed to be utilized with all three sizes of Cable Saver Systems. Some of the EOAT mounting hardware is scaled down because of the dimensions of smaller payload robots 12. For example, a 210 kg robot 12 would have a larger diameter 180 mm "wrist/spindle" outside diameter O.D. in order to support up to 210 kg payload while a 70 kg robot wrist would have around 125 mm O.D. An assortment of possible mounting brackets (the "A" "B" and "L" brackets) are presented in the Installation section which follows, and in FIGS. 24 to 29.

Figure 5C:
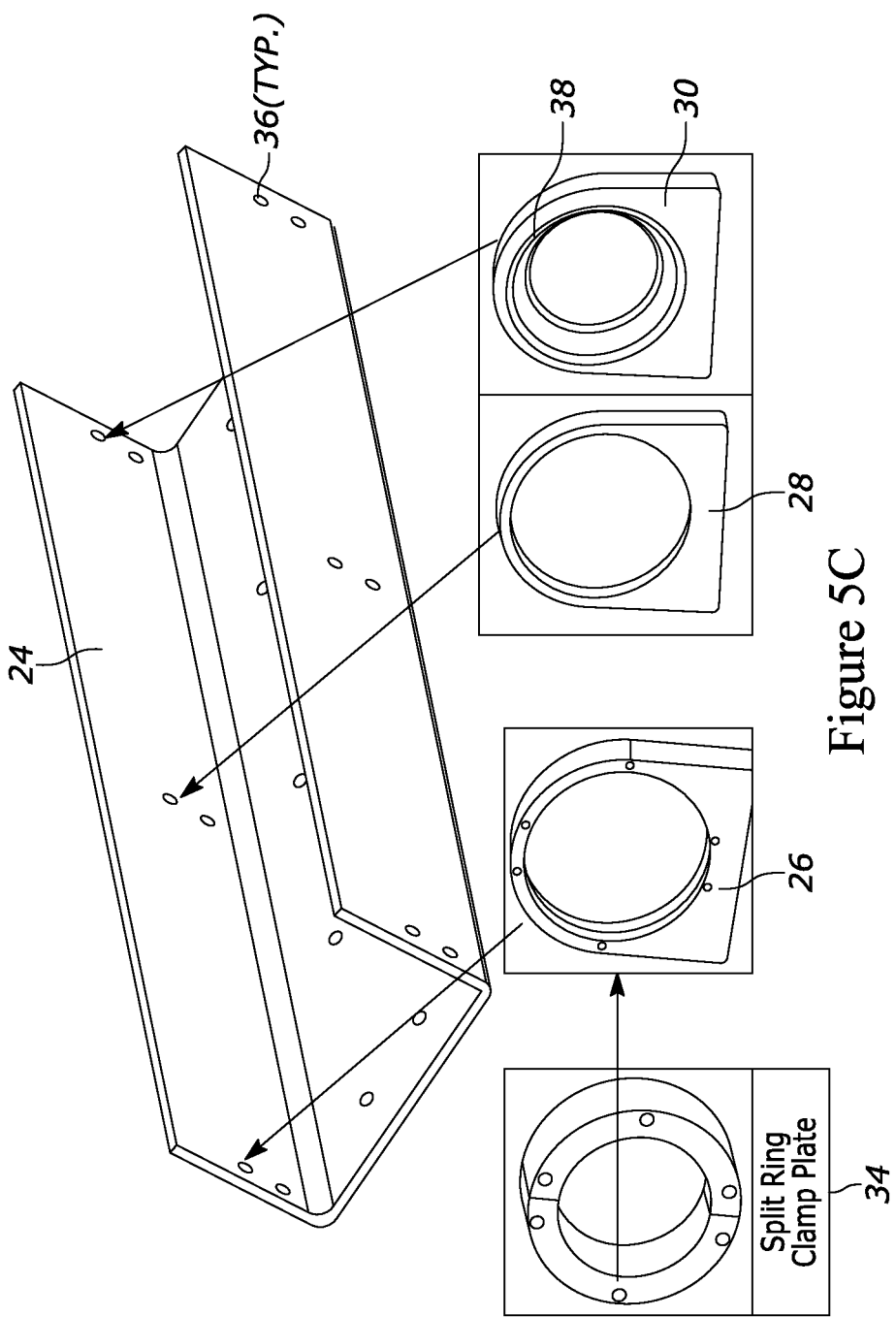
Figure 5D:
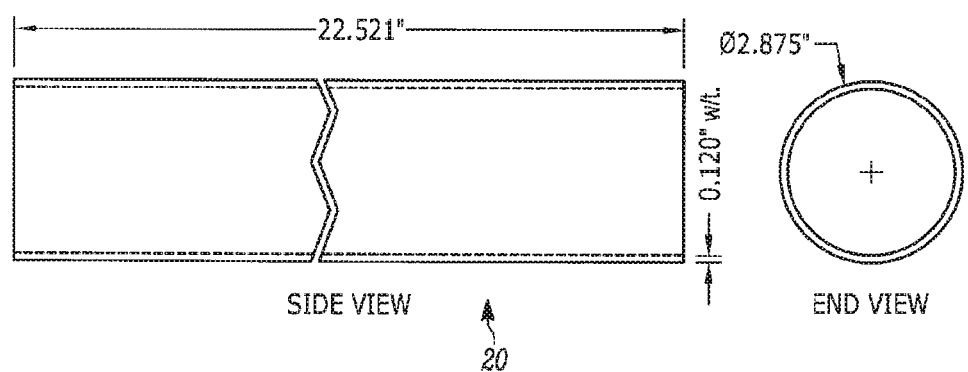
Figure 14A:
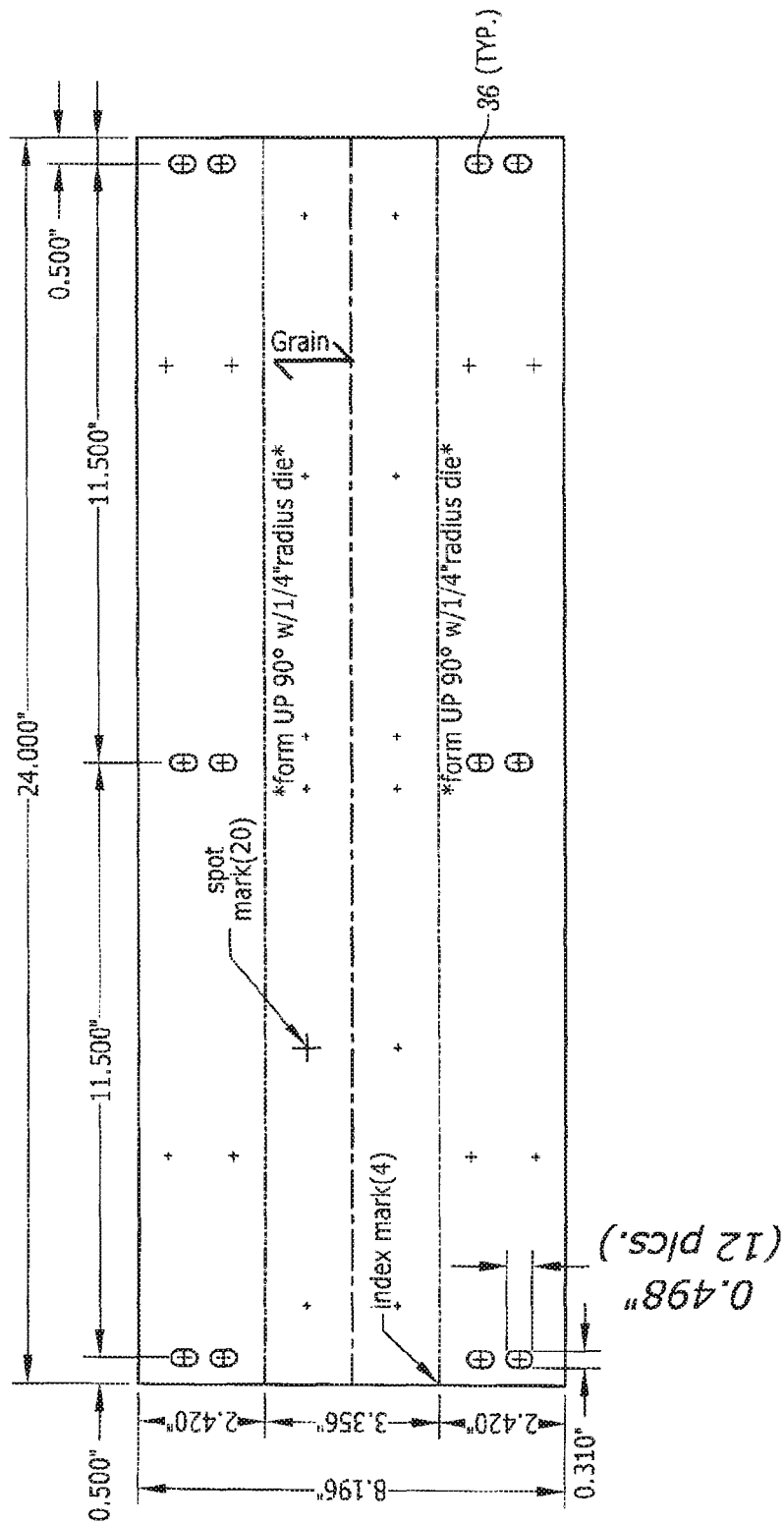
FIG. 14 shows a 36 mm formed channel support in accordance with a further embodiment of the present invention.
Figure 14B:
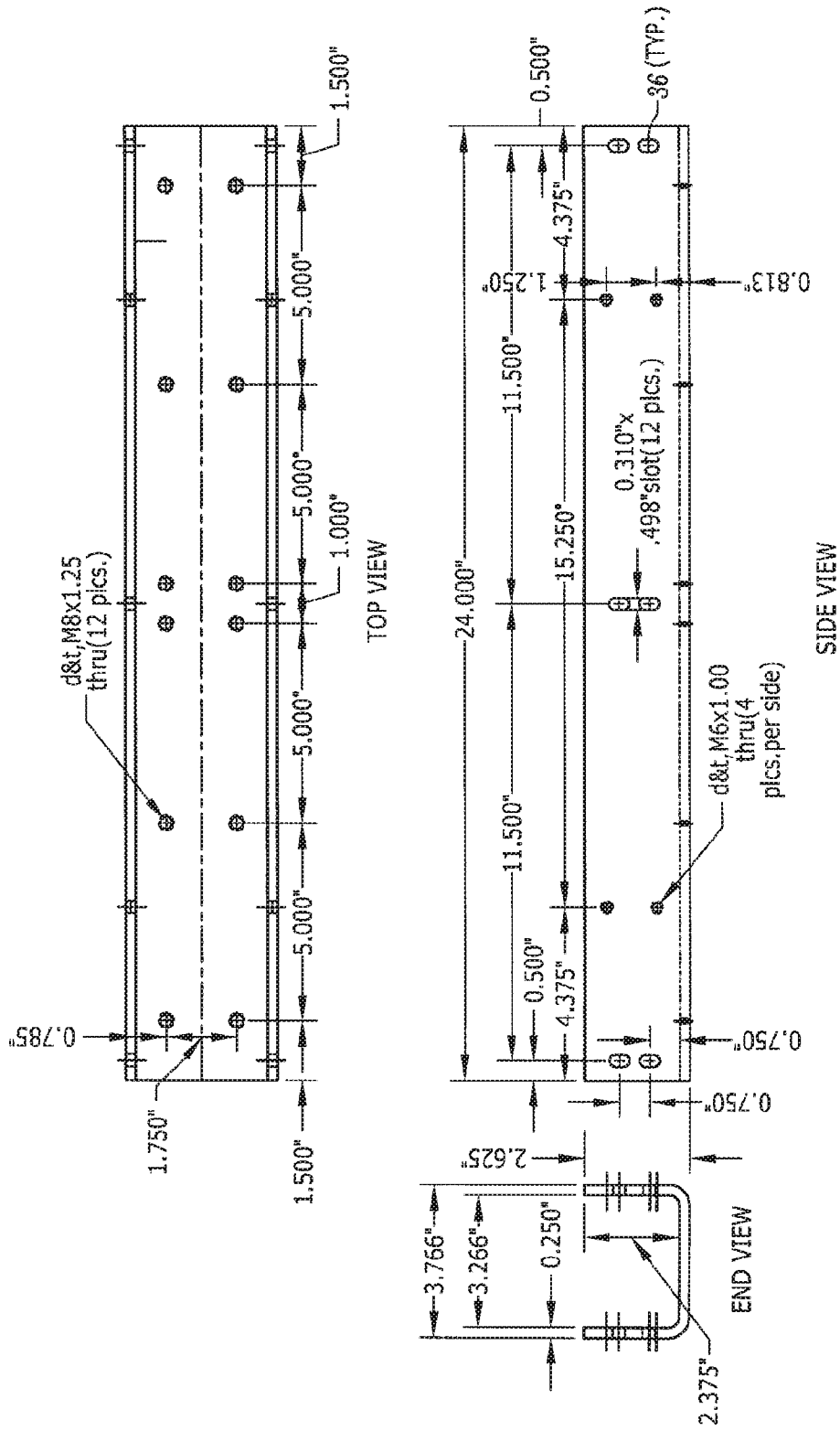
Figure 15:
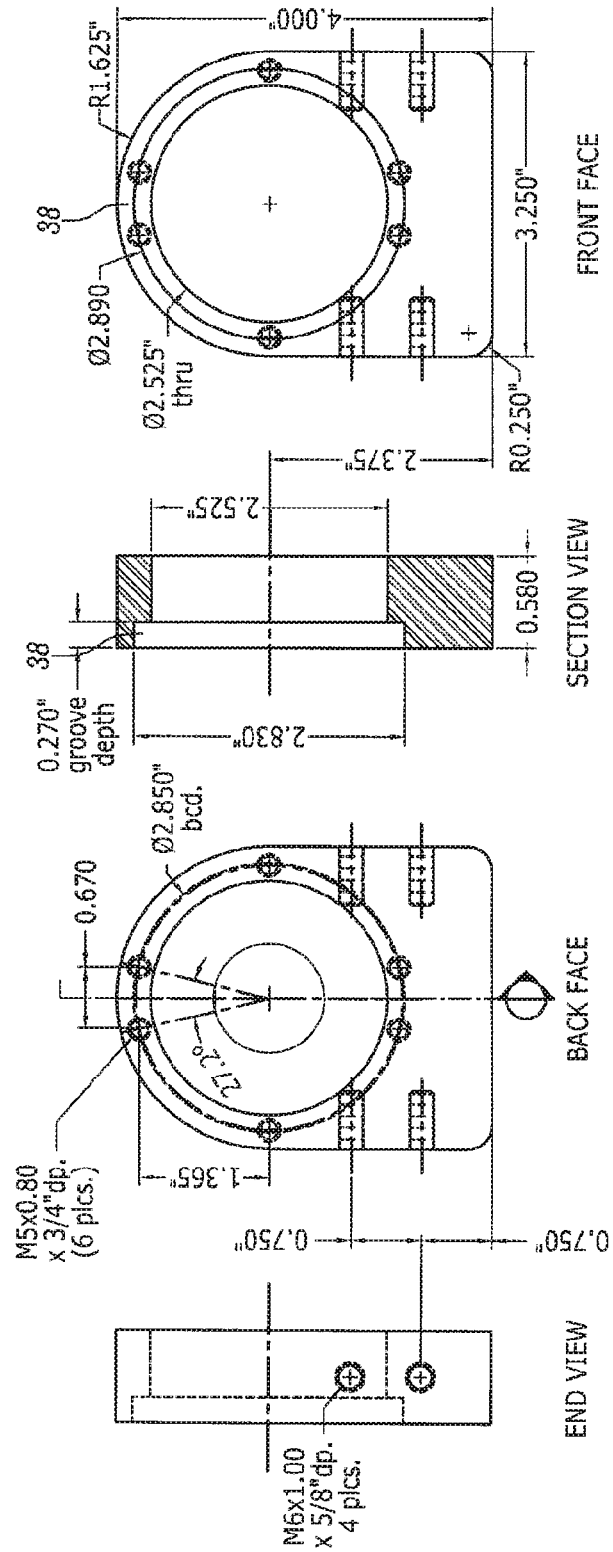
FIG. 15 shows a 36 mm front plate in accordance with a further embodiment of the present invention.
Figure 16:
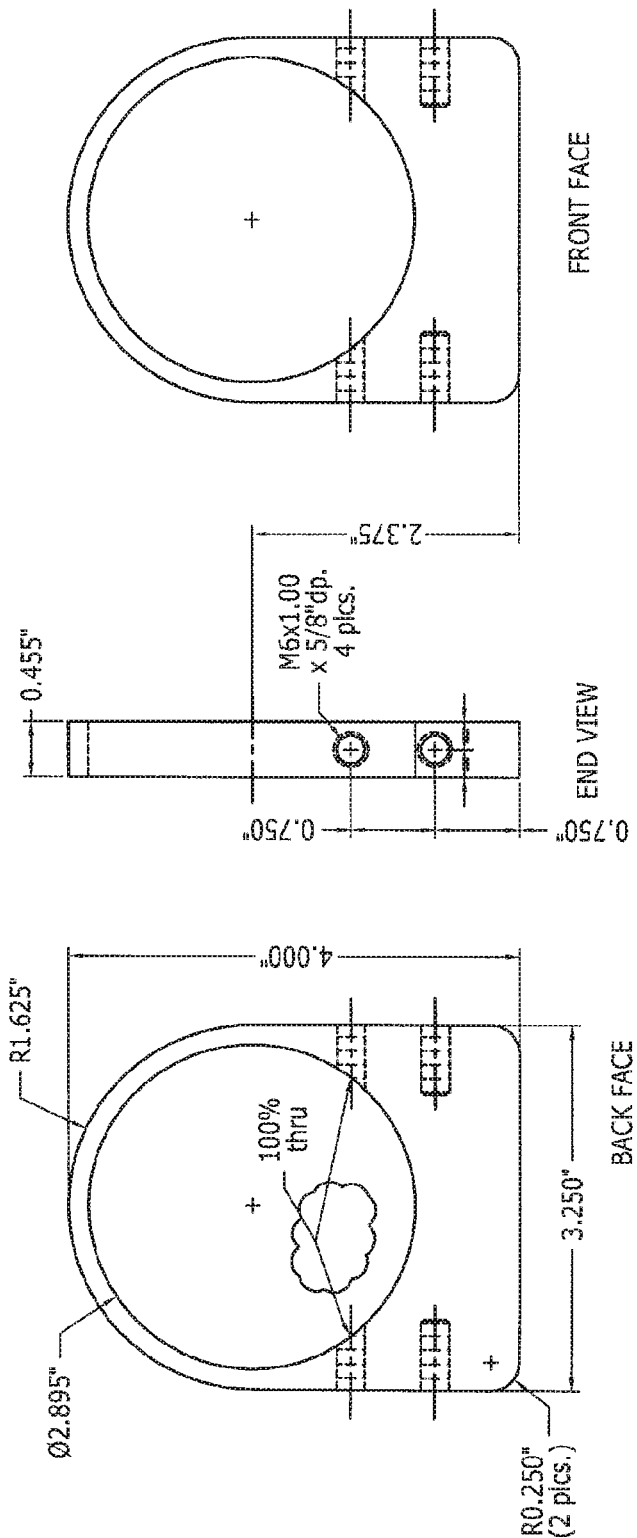
FIG. 16 shows a 36 mm mid plate in accordance with a further embodiment of the present invention.
Figure 17:
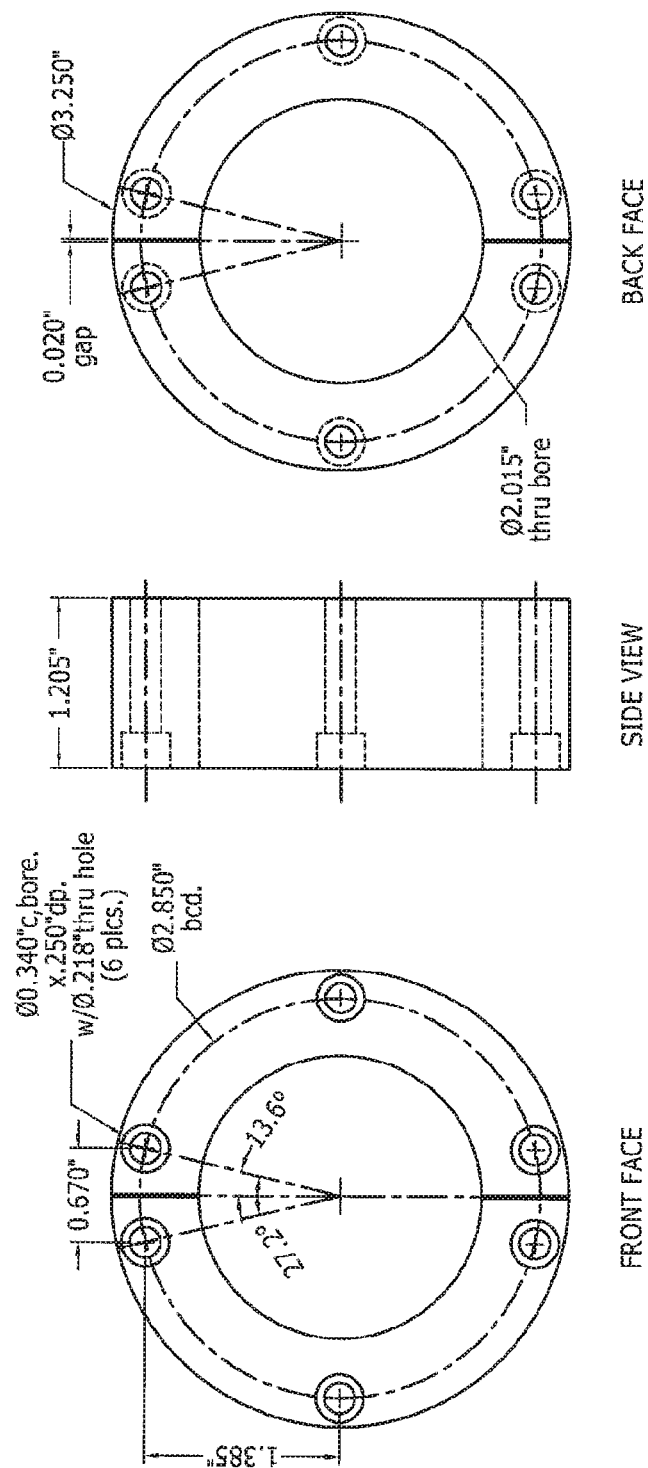
FIG. 17 shows a 36 mm split ring clamp in accordance with a further embodiment of the present invention.
Figure 18:
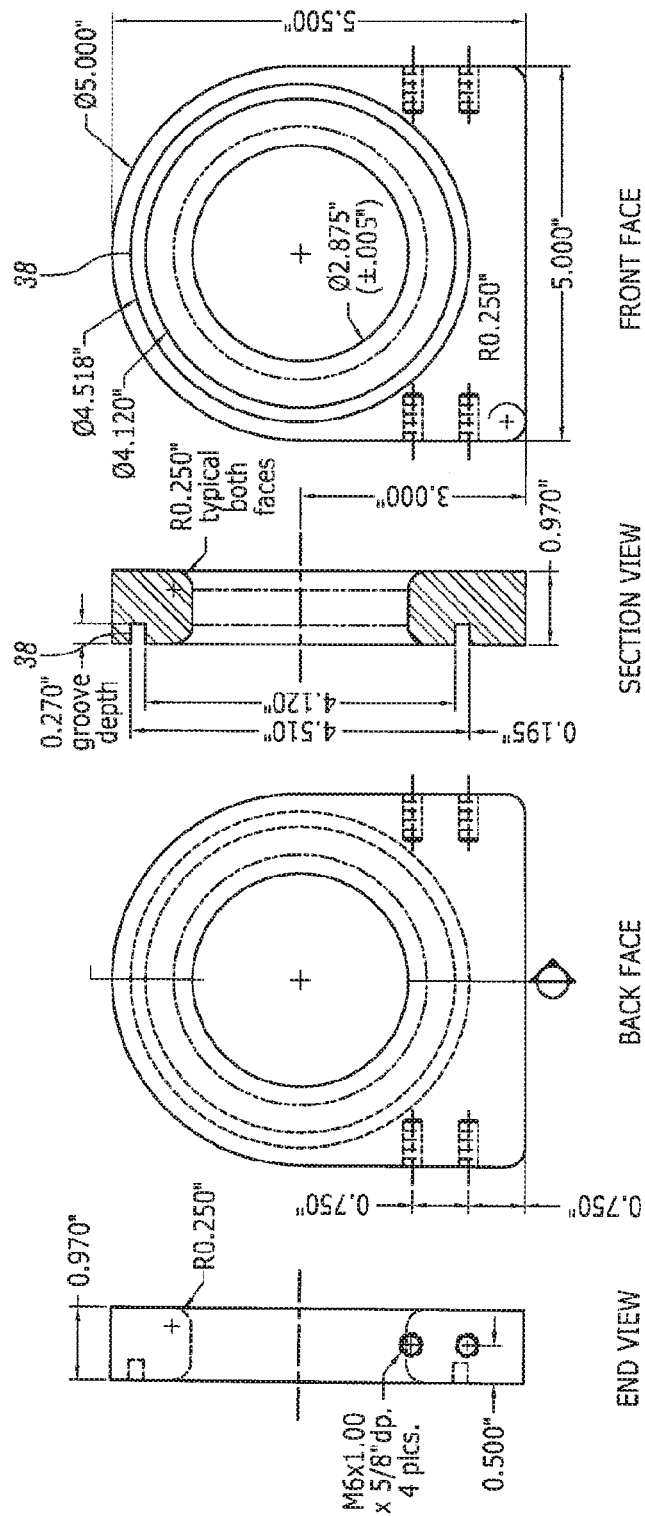
FIG. 18 shows a 52 mm back plate in accordance with a further embodiment of the present invention.

A comprehensive bill of materials for each size of Cable Saver is presented in FIGS. 30 to 32, the identified "off the shelf" REIKU components being manufactured by REIKU Germany. With regard to the 36 mm Cable Saver 10 design, the dimensions of the longitudinal rigid tube 20 is shown in FIG. 5D as a 22.521" length of 2½" schedule 10, 6061-T4 aluminum pipe. The dimensions and fabrication details of the 36 mm back plate 30 are shown in the engineering drawing of FIG. 13, while the 36 mm formed channel support 24 is shown in FIGS. 14A and 14B, the 36 mm front plate 26 in FIG. 15, the middle support 28 in FIG. 16 and the split ring clamp plate 34 in FIG. 17. All of the 36 mm back plate 30, front plate 26, middle support 28 and split ring clamp plate 34 are preferably machined from 6061-T6 aluminum. The 36 mm formed channel support 24 is preferably fabricated from ¼" thick 5052 aluminum which is folded as shown in FIG. 14B. As shown in FIGS. 5A to 5C, the back plate 30, front plate 26 and middle support 28 are simply bolted to the formed channel support 24, preferably with button head cap screws. The two halves of the split ring clamp plate 34 are installed at a later time to hold the spring holder (Reiku POFHB-36/36 as noted in FIG. 30) in place, the two halves of the split ring clamp plate 34 mounting to the face of the front plate 26. The free end of the spring is attached to a protector 42 which is clamped to the flexible corrugated hose 14.

Figure 5E:
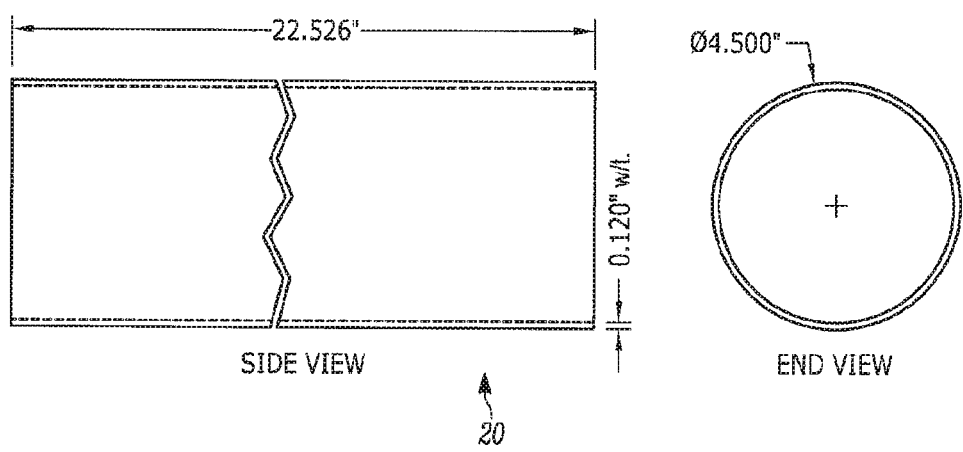
Figure 19A:
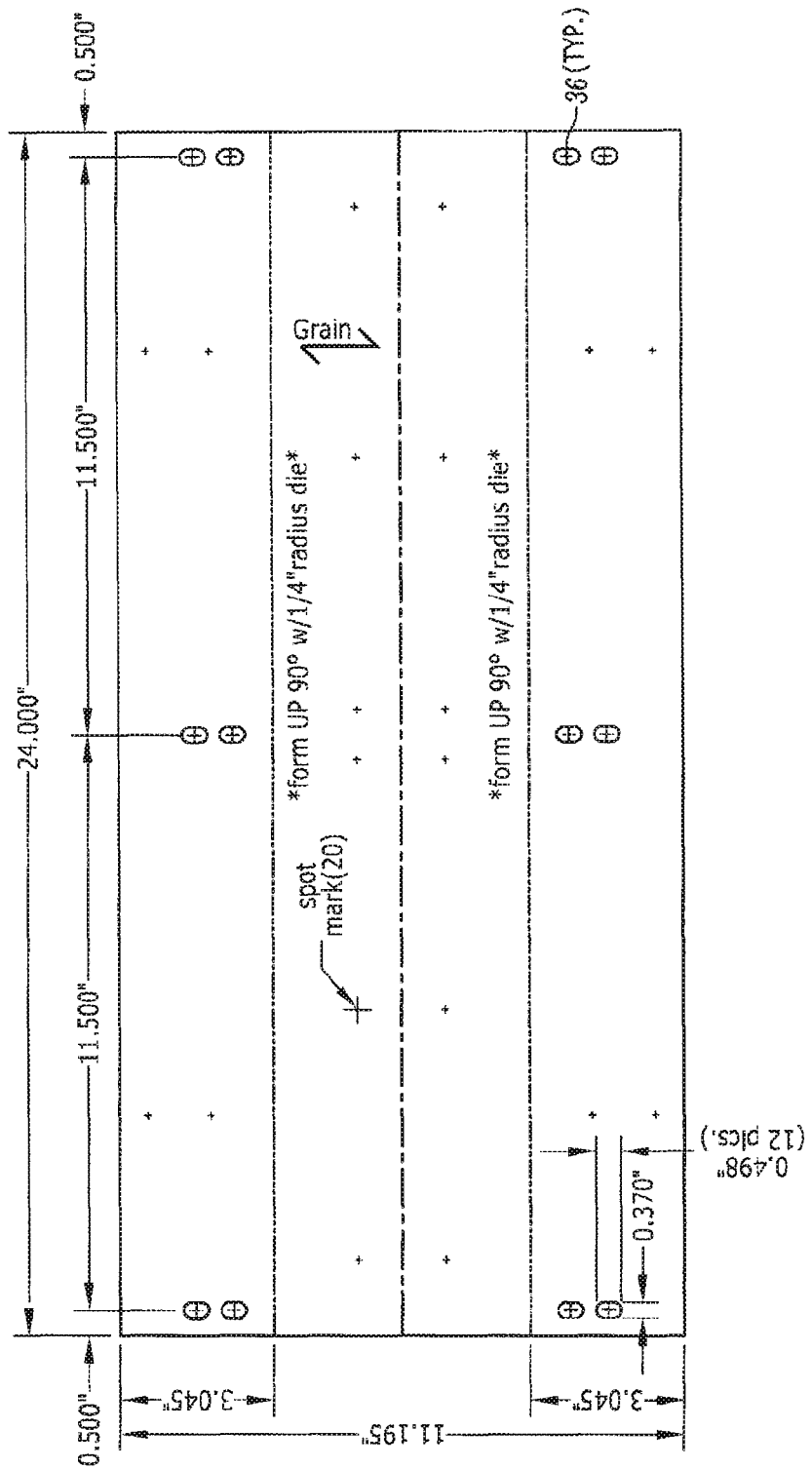
FIG. 19 shows a 70 mm and 52 mm formed channel support in accordance with a further embodiment of the present invention.
Figure 19B:
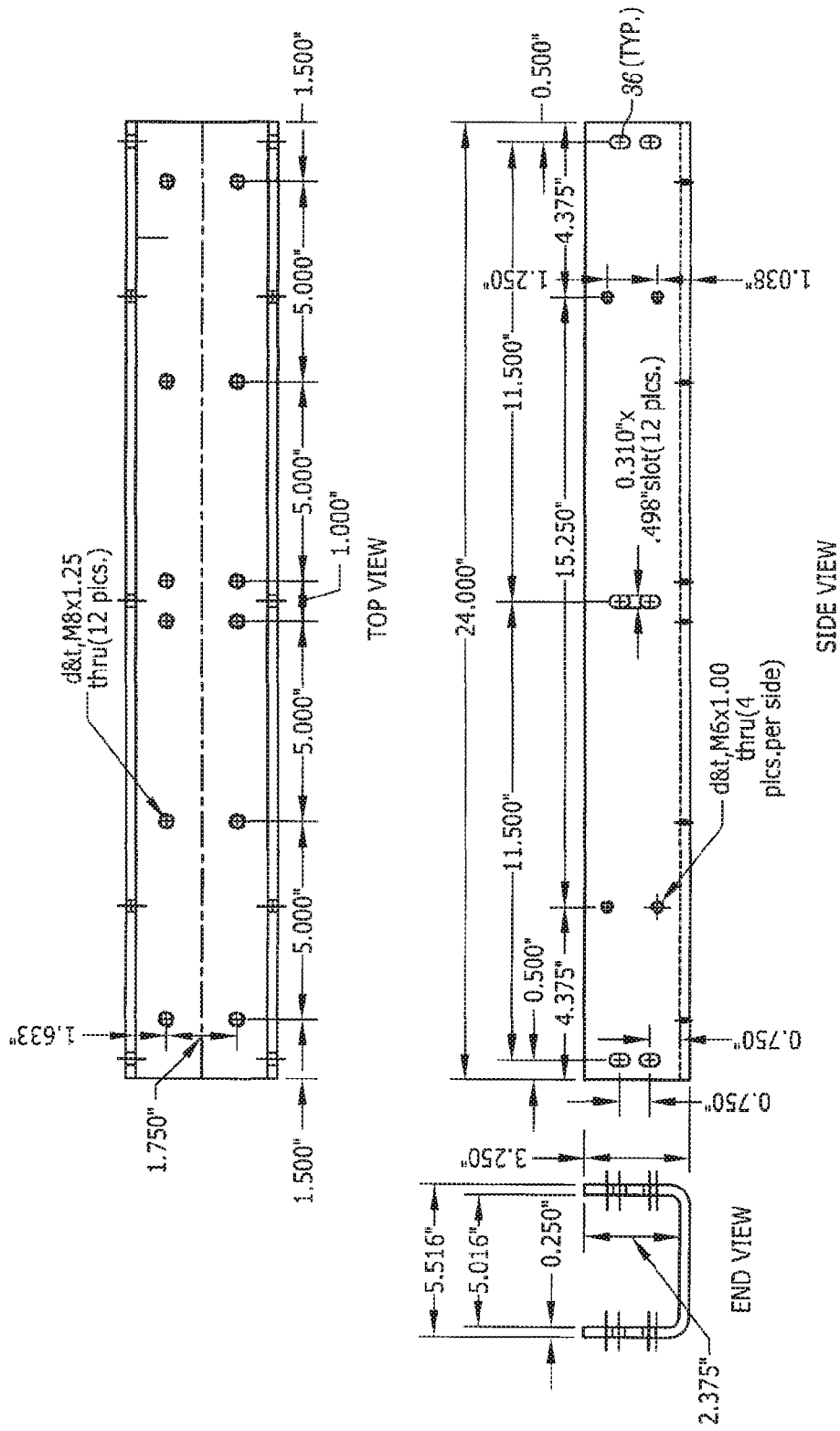
Figure 20:
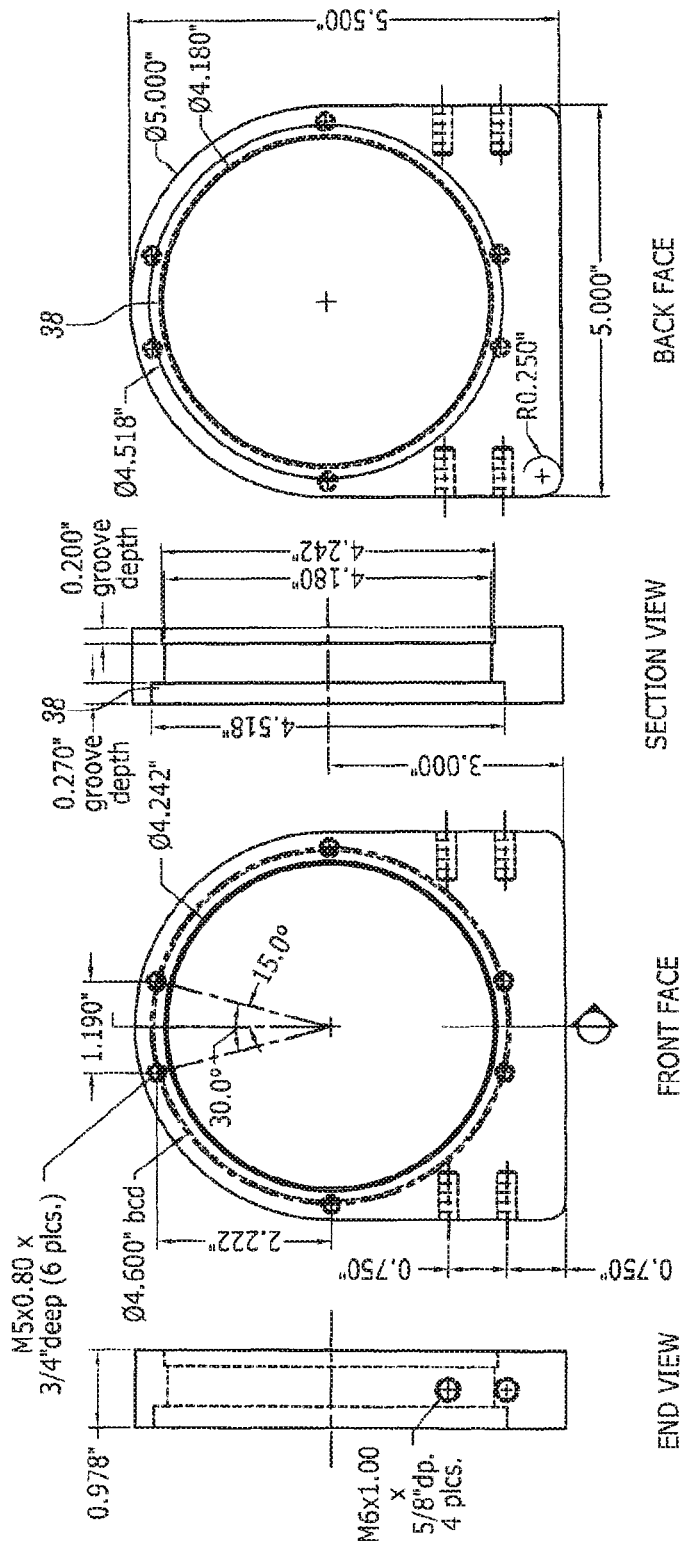
FIG. 20 shows a 70 mm and 52 mm front plate in accordance with a further embodiment of the present invention.
Figure 21:
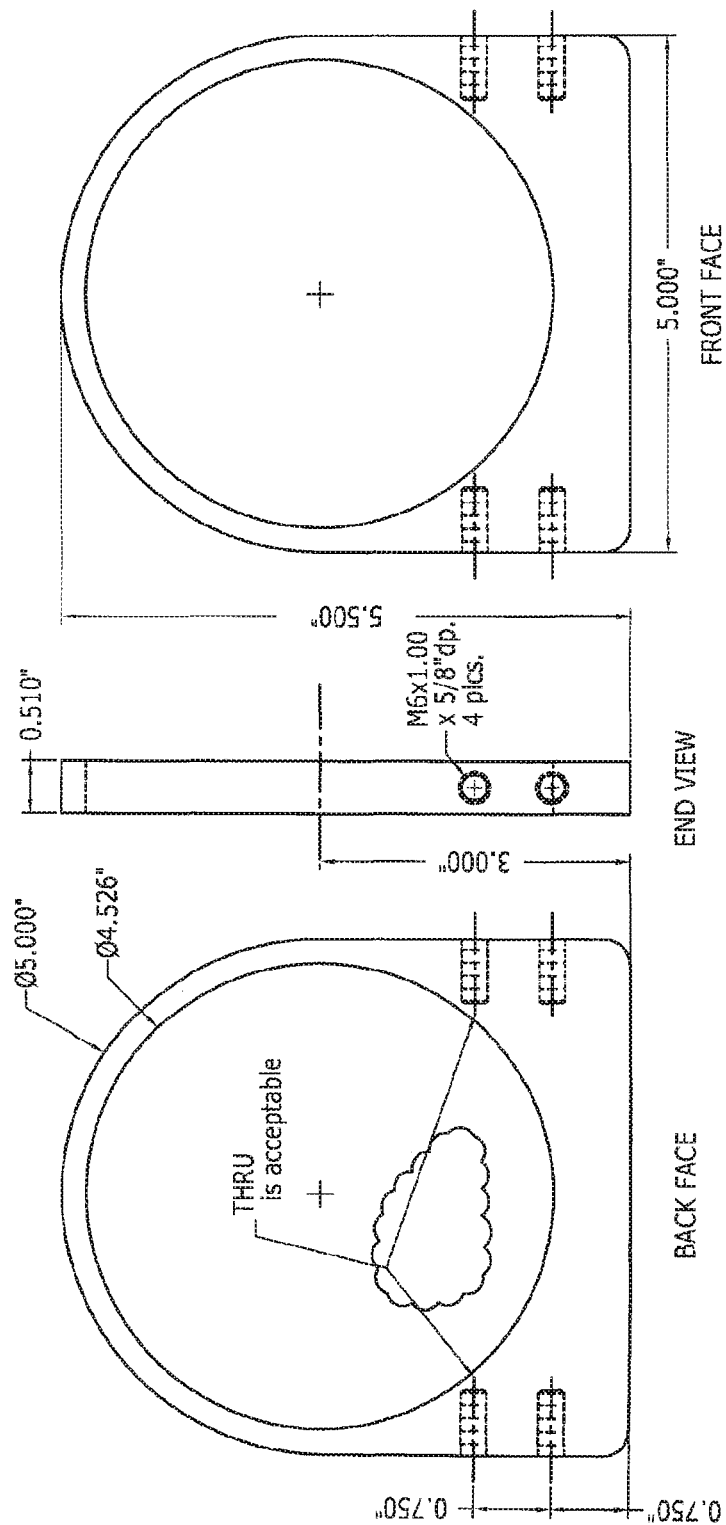
FIG. 21 shows a 70 mm and 52 mm mid plate in accordance with a further embodiment of the present invention.
Figure 22:
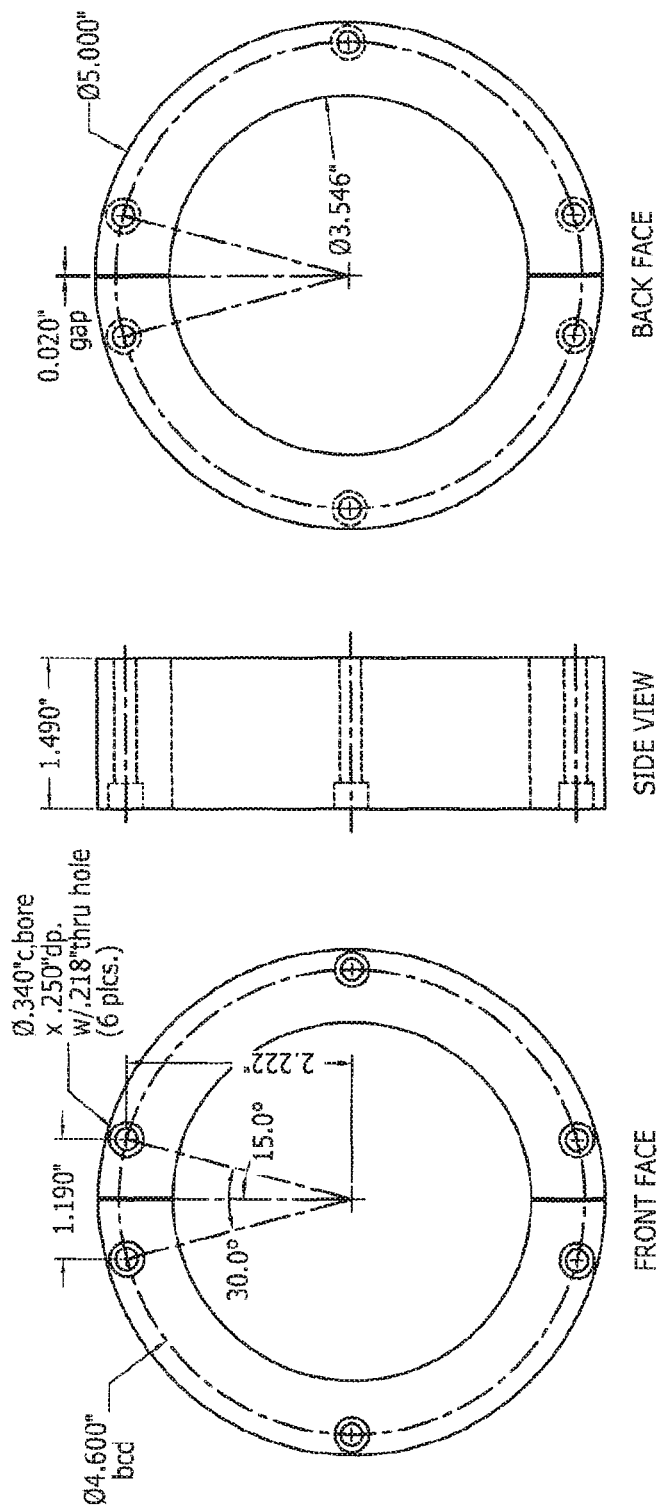
FIG. 22 shows a 70 mm and 52 mm split ring clamp plate in accordance with a further embodiment of the present invention.
Figure 23:
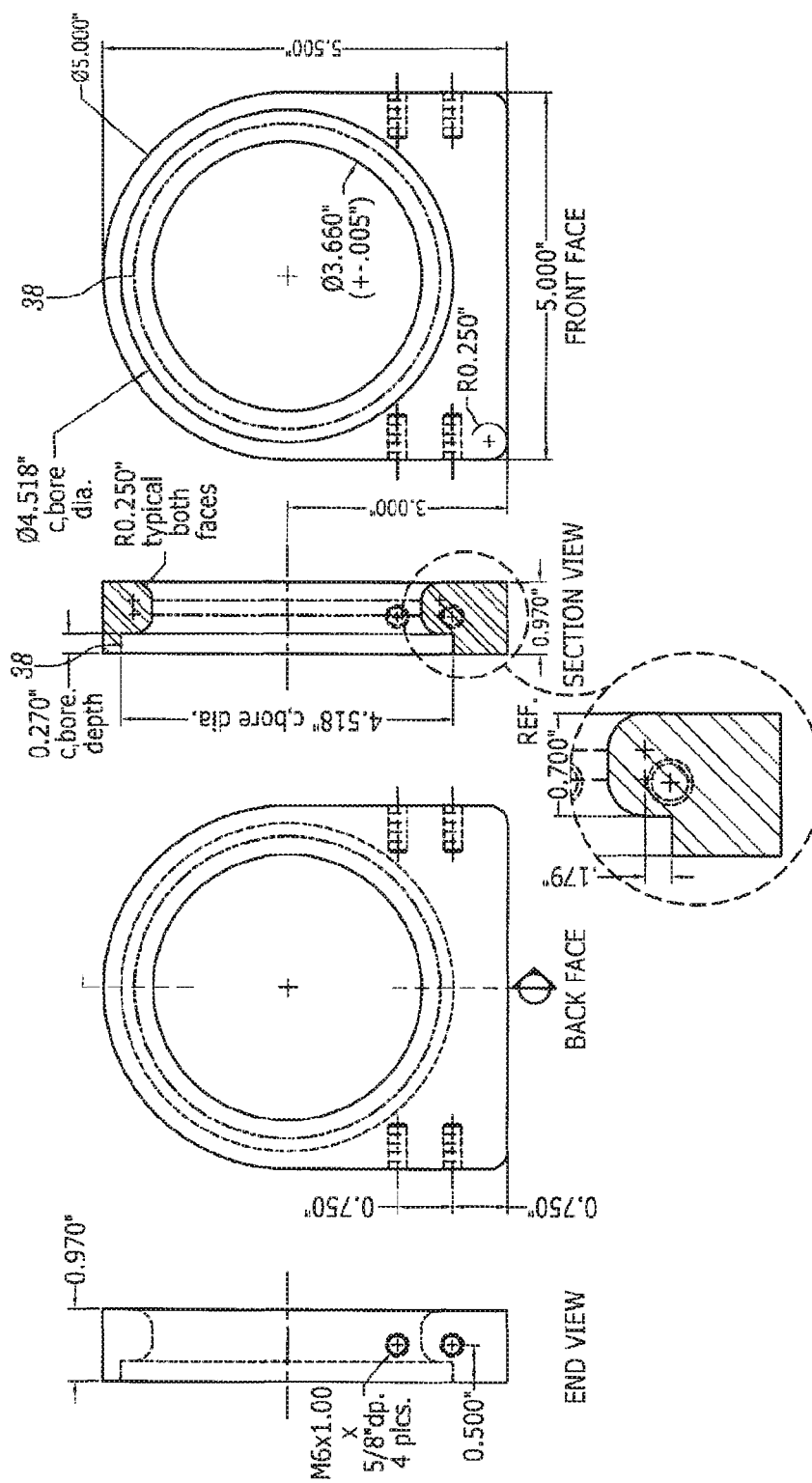
FIG. 23 shows a 70 mm back plate in accordance with a further embodiment of the present invention.
Figure 24:
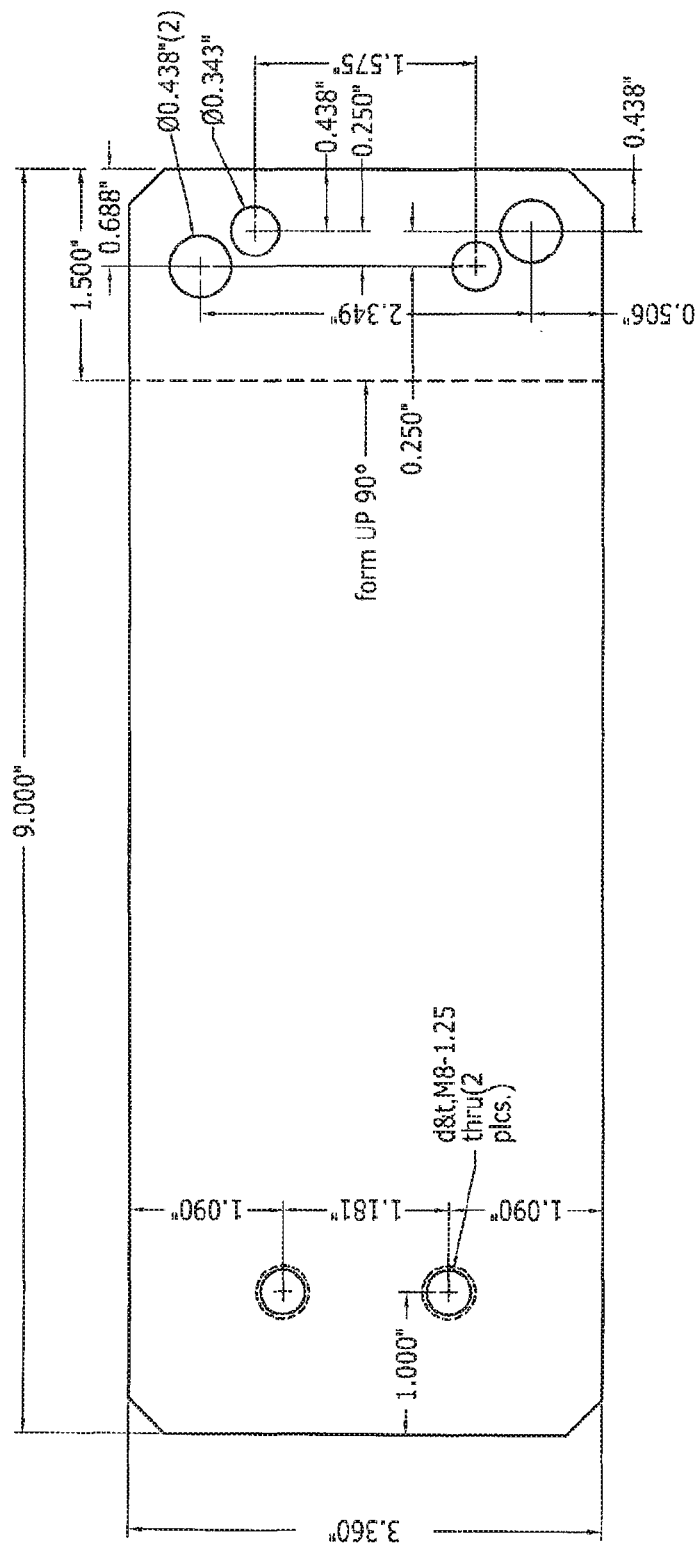
FIG. 24 shows an A3 shoulder bracket—"A" in accordance with a further embodiment of the present invention.
Figure 25:
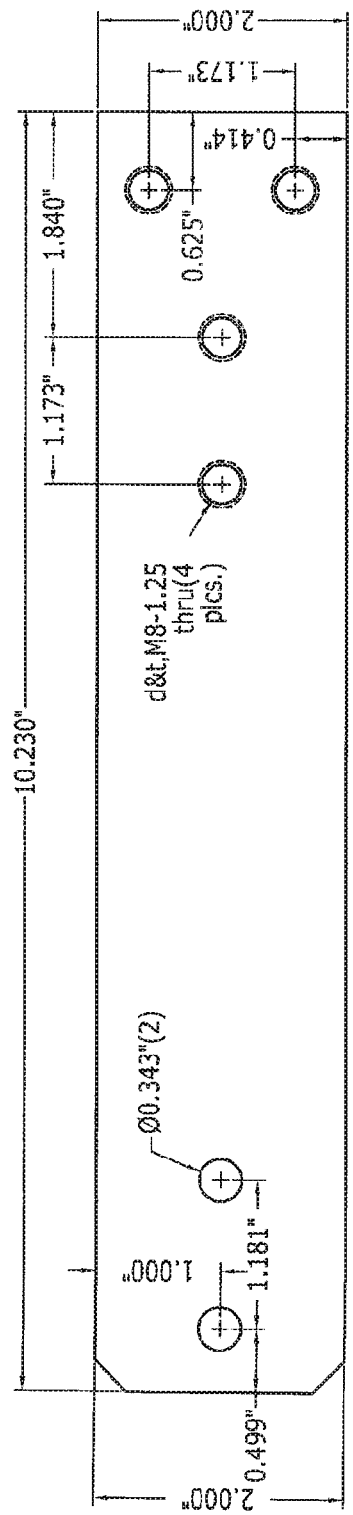
FIG. 25 shows an A3 shoulder bracket—"B" in accordance with a further embodiment of the present invention.
Figure 26:
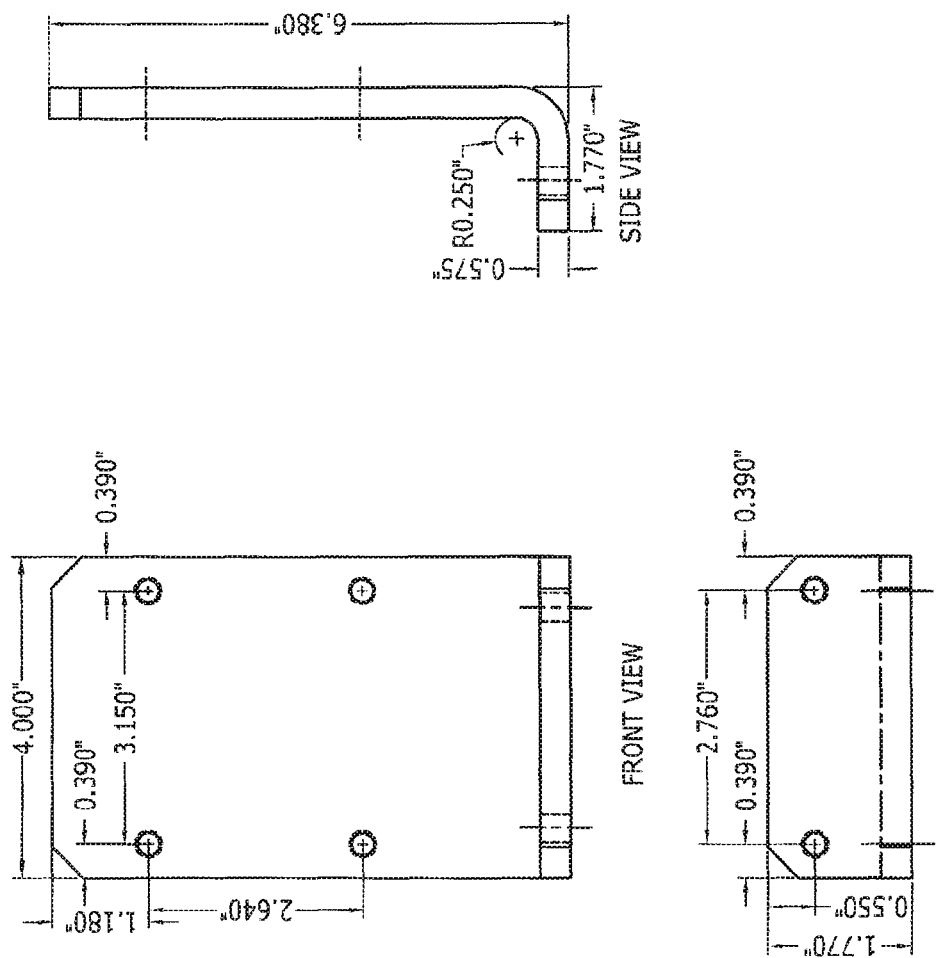
FIG. 26 shows an adaptor bracket for a FANUC710 robot in accordance with a further embodiment of the present invention.
Figure 27:
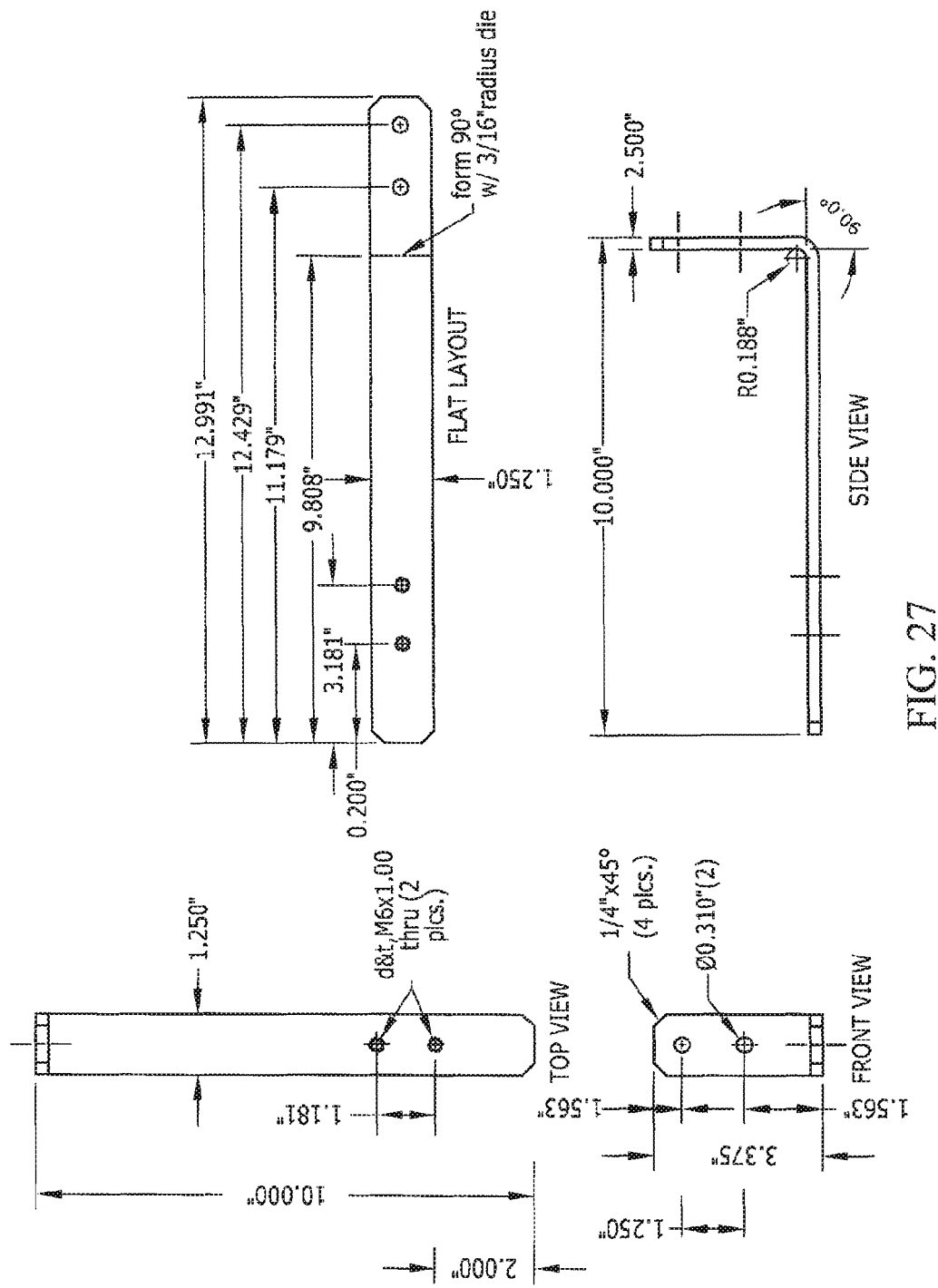
FIG. 27 shows an "L" bracket in accordance with a further embodiment of the present invention.
Figure 28:
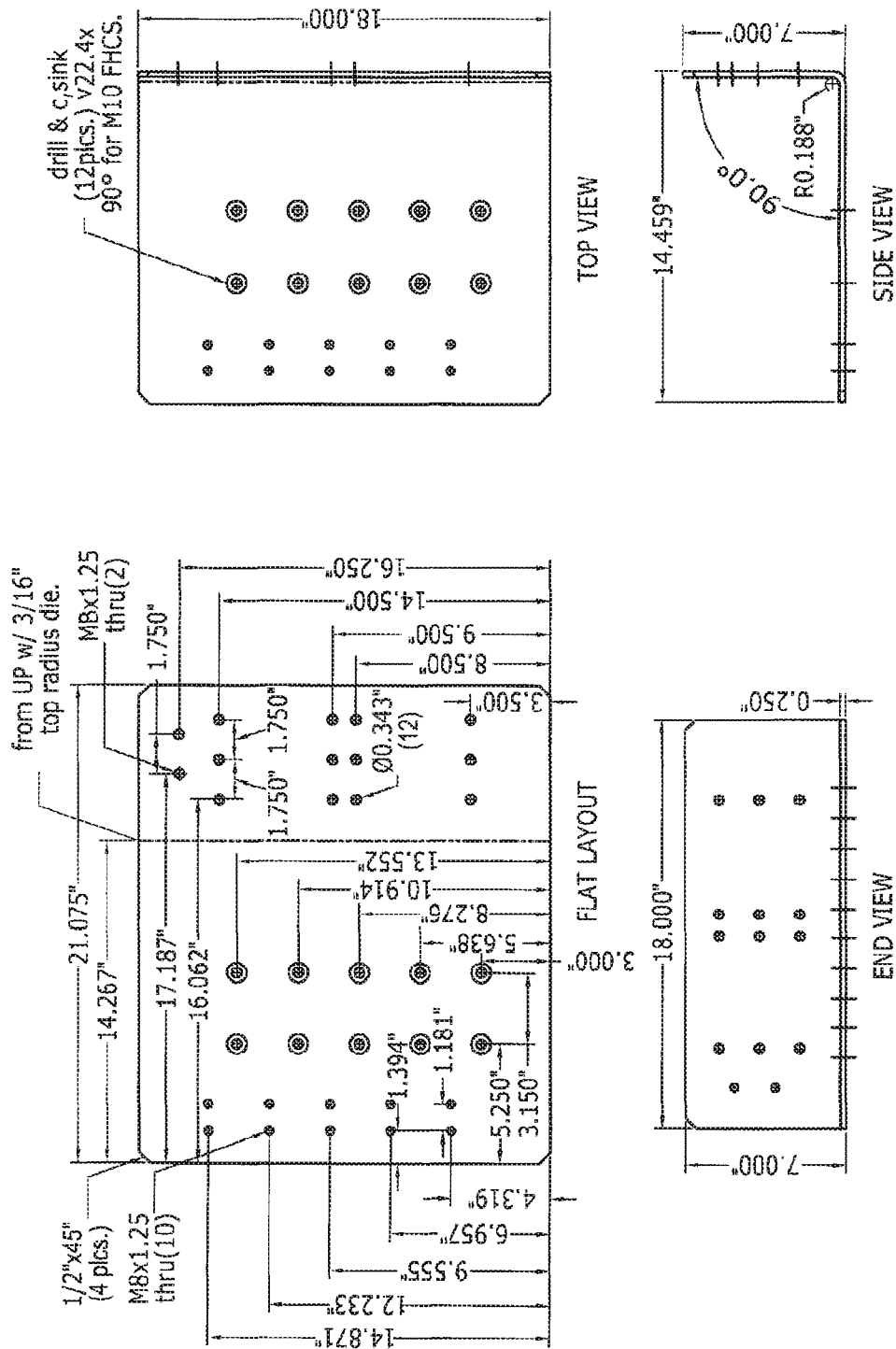
FIG. 28 shows a robot bracket in accordance with a further embodiment of the present invention.
Figure 29:
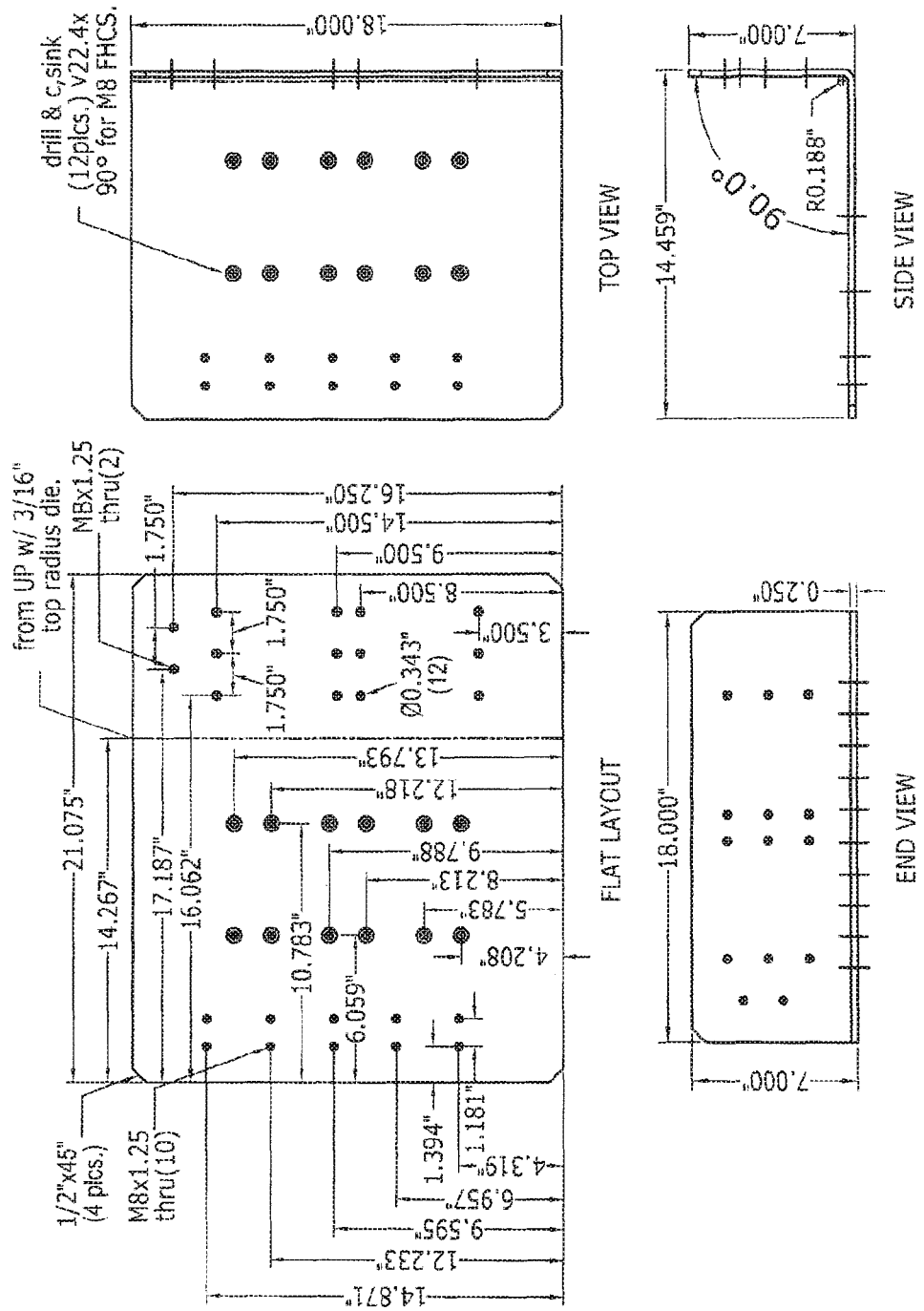
FIG. 29 shows a bracket for a Yaskawa robot in accordance with a further embodiment of the present invention.
Figure 33:
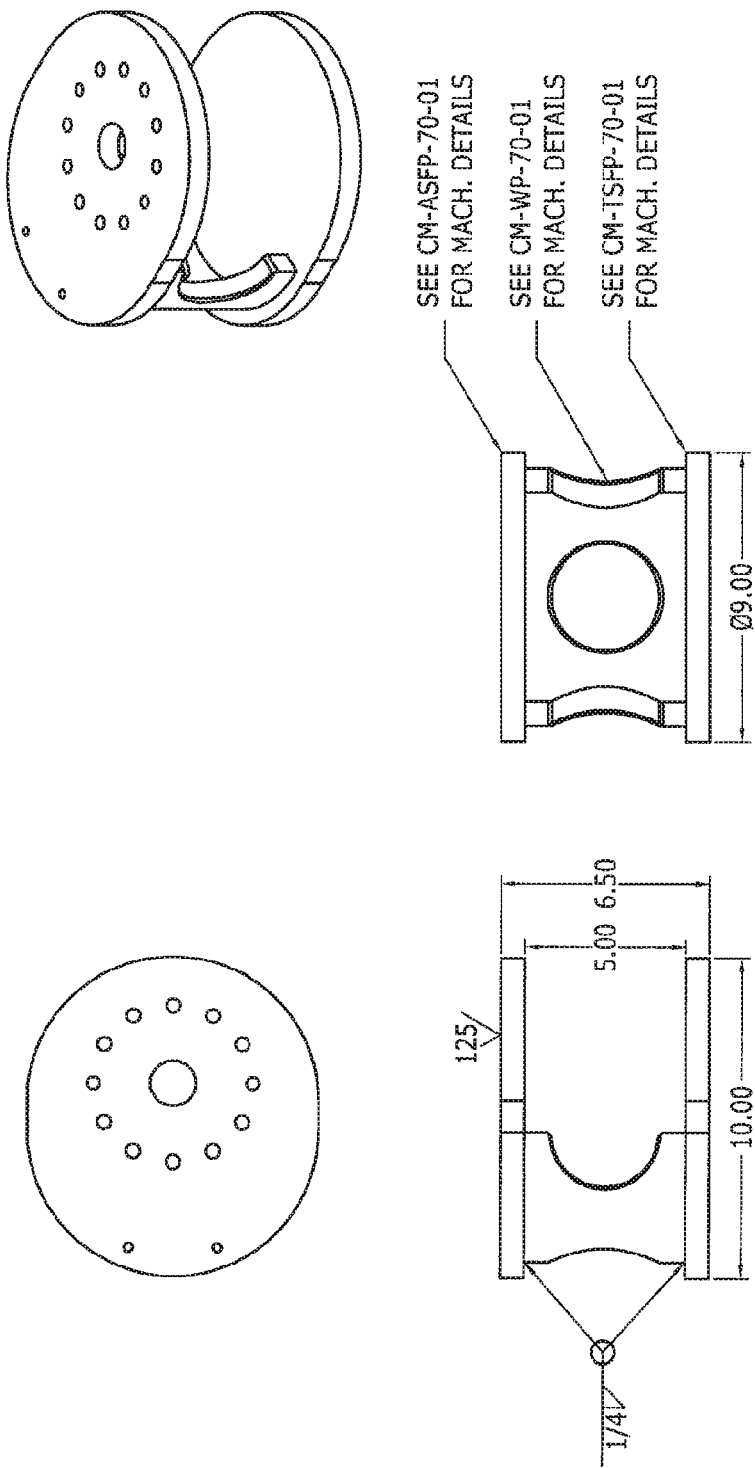
FIG. 33 shows an assembly drawing for a first exemplary cow's mouth in accordance with an embodiment of the present invention.
Figure 34:
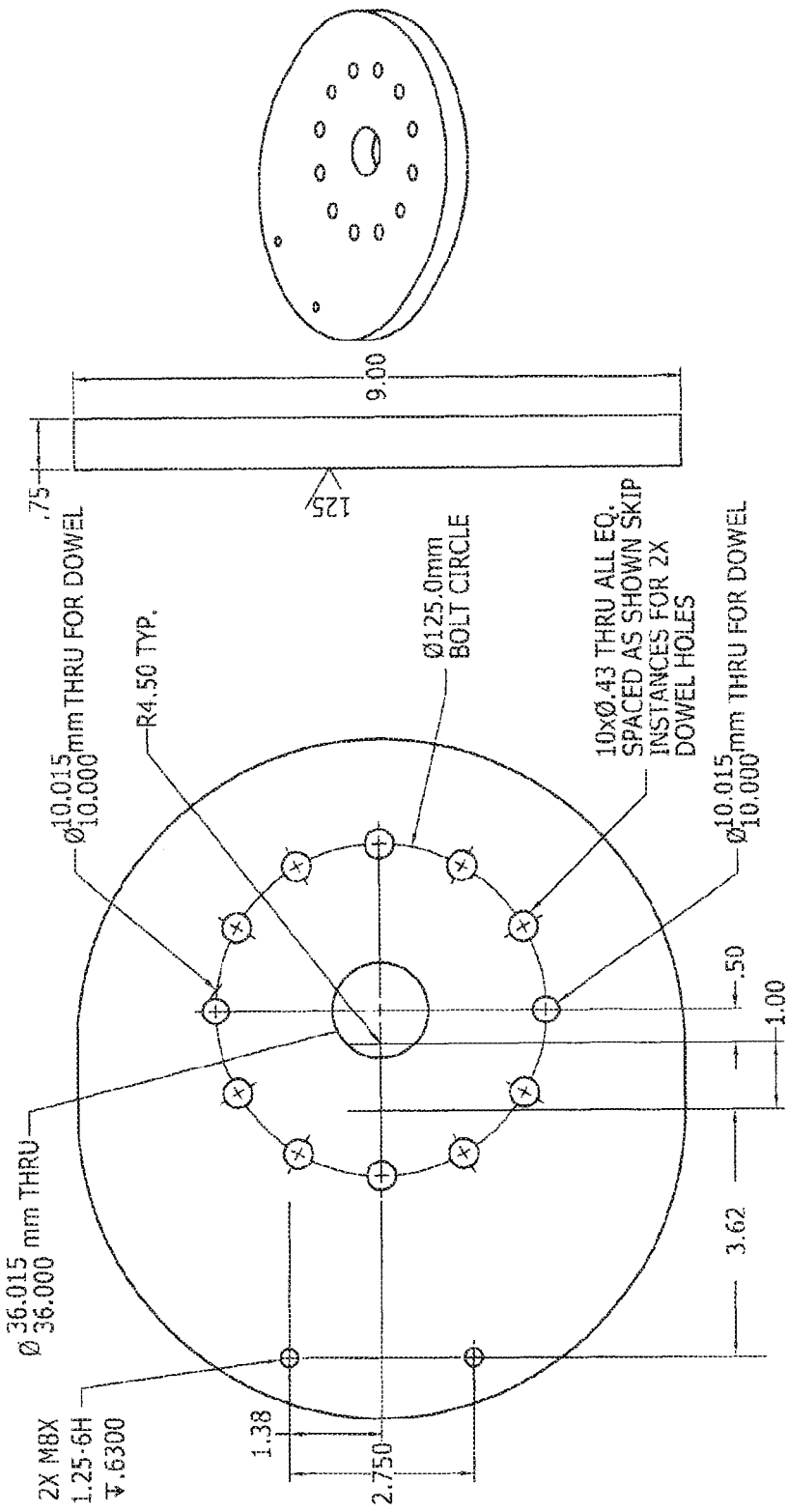
FIG. 34 shows a detail drawing of a face plate—arm side for the first exemplary cow's mouth in accordance with an embodiment of the present invention.
Figure 35:
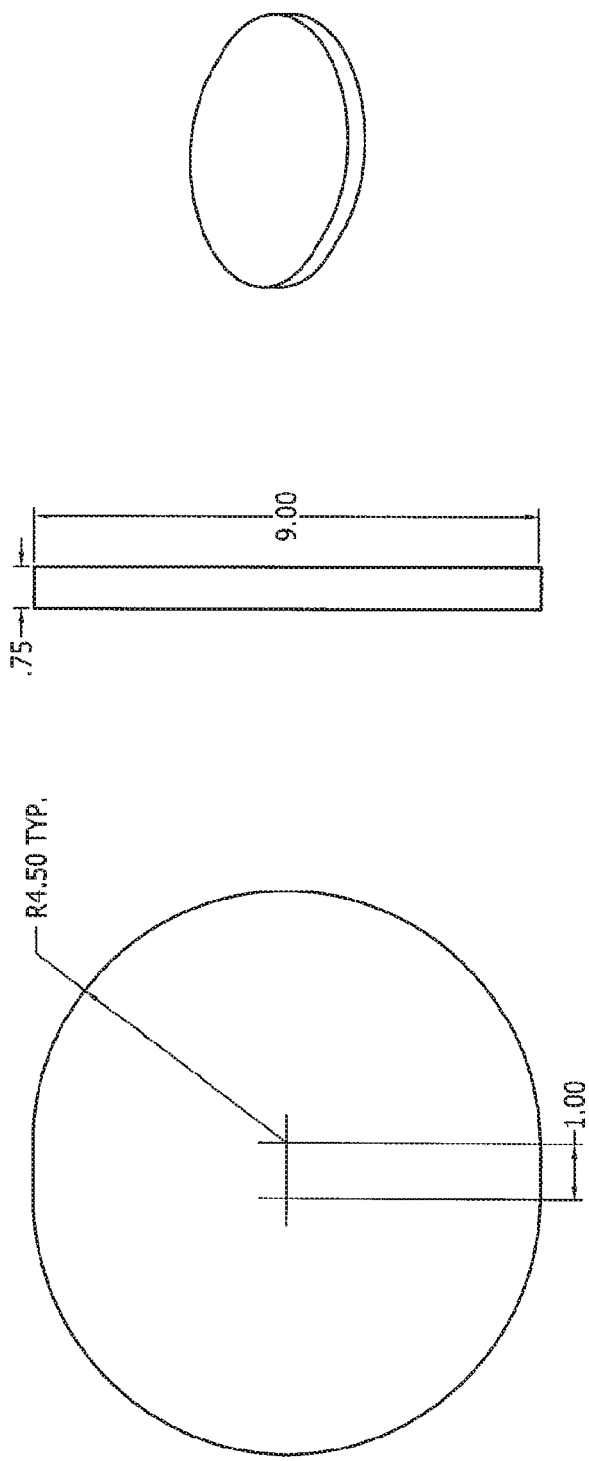
FIG. 35 shows a detail drawing of a face plate—tool side for the first exemplary cow's mouth in accordance with an embodiment of the present invention.
Figure 36:
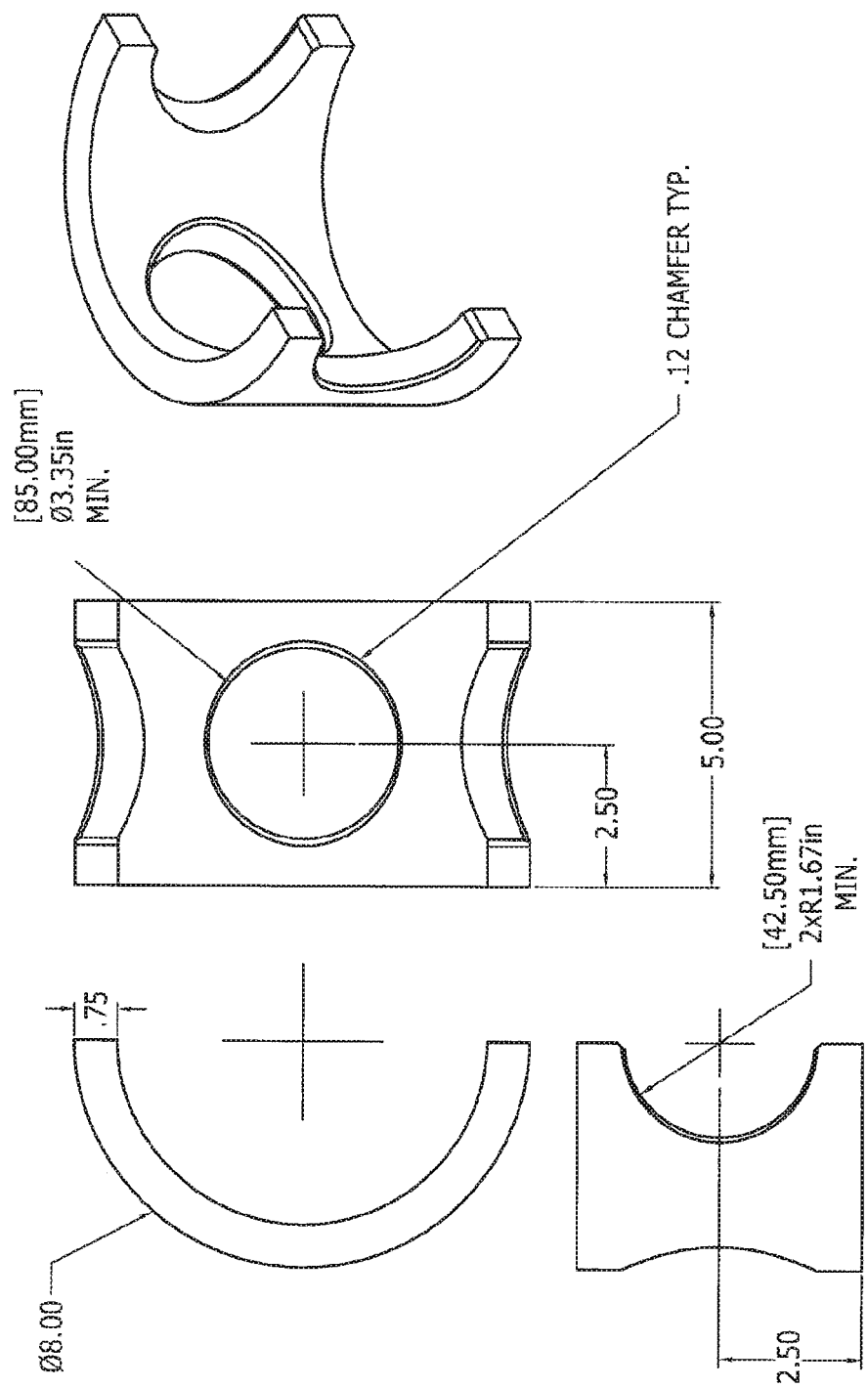
FIG. 36 shows a detail drawing of a web plate for the first exemplary cow's mouth in accordance with an embodiment of the present invention.
Figure 37A:
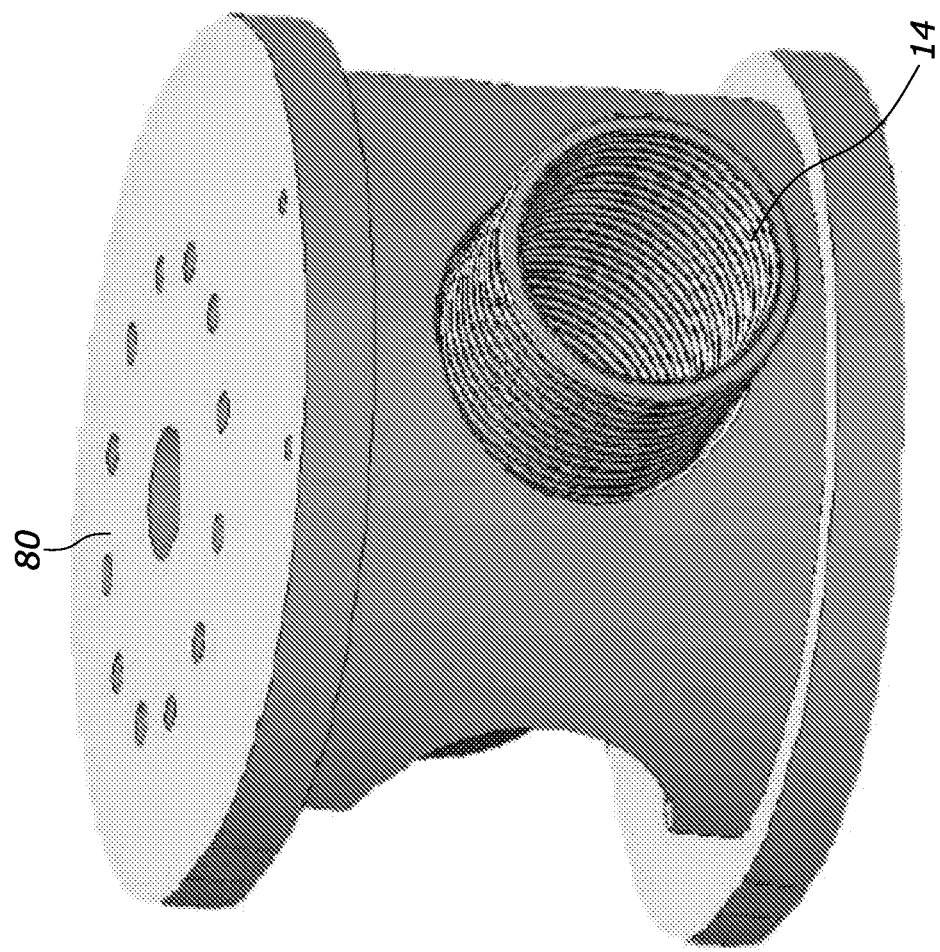
FIGS. 37A to 37I show various perspective views of a CAD design for the first exemplary cow's mouth, in an embodiment of the present invention.
Figure 37B:
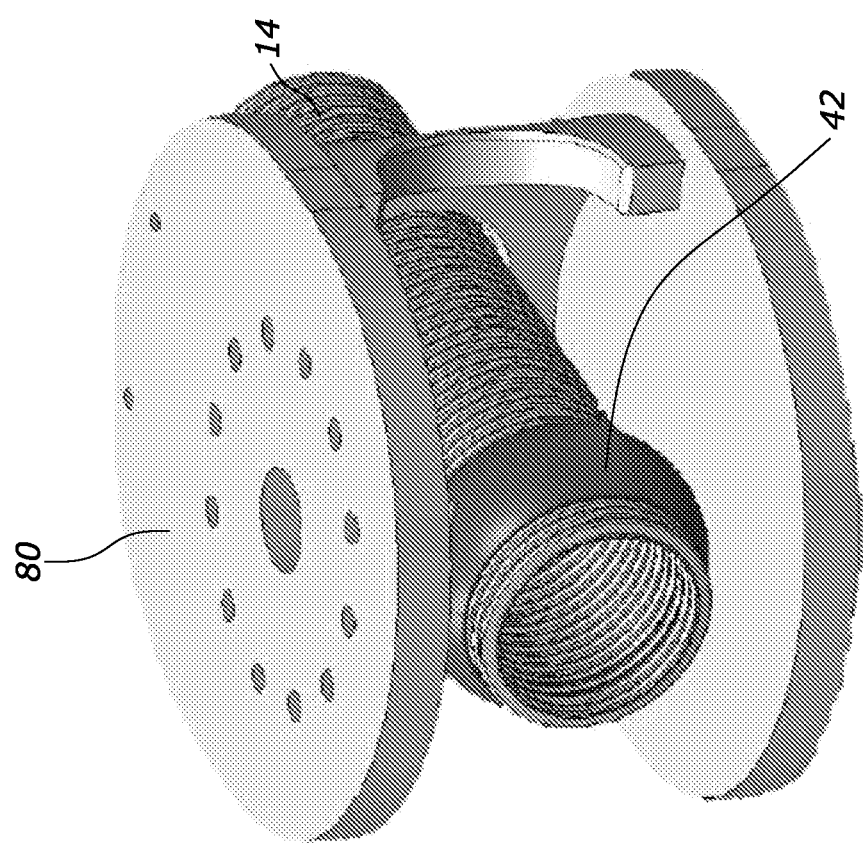
Figure 37C:
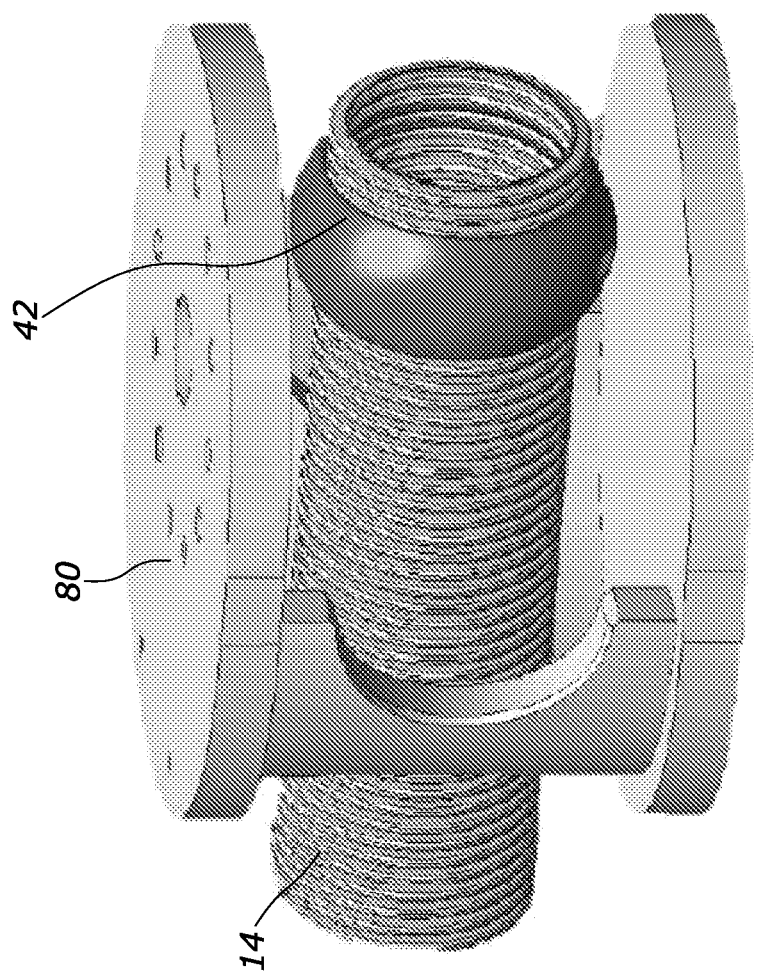
Figure 37D:
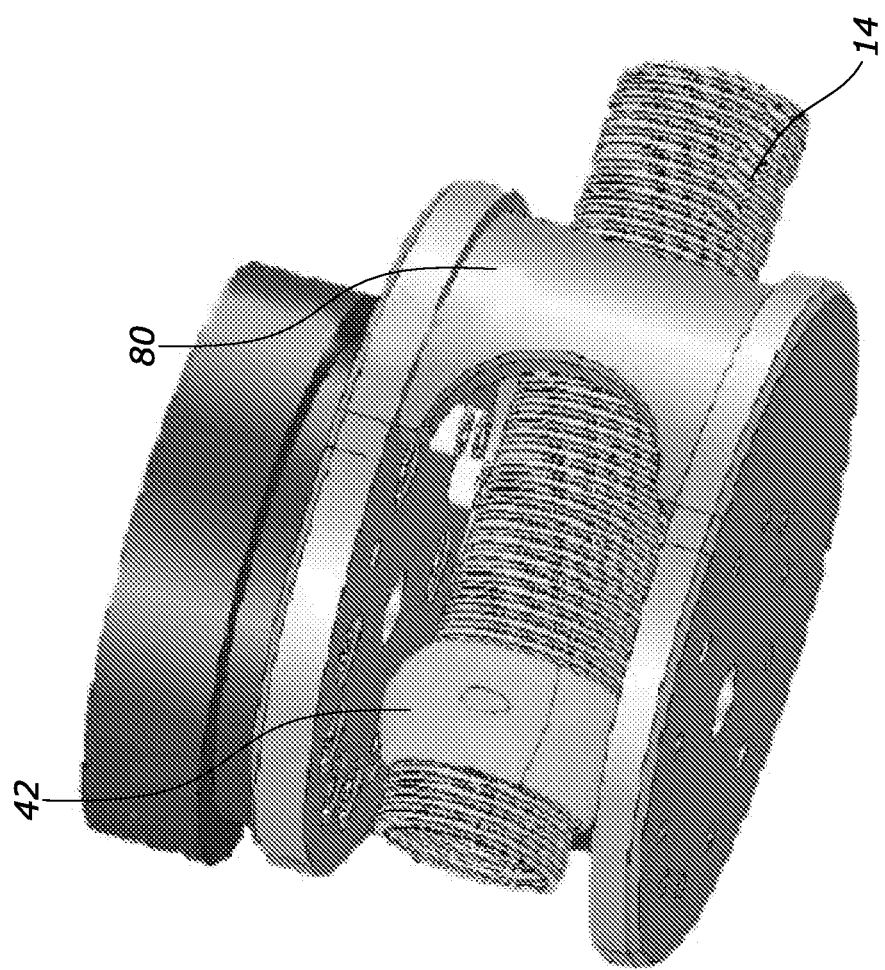
Figure 37E:
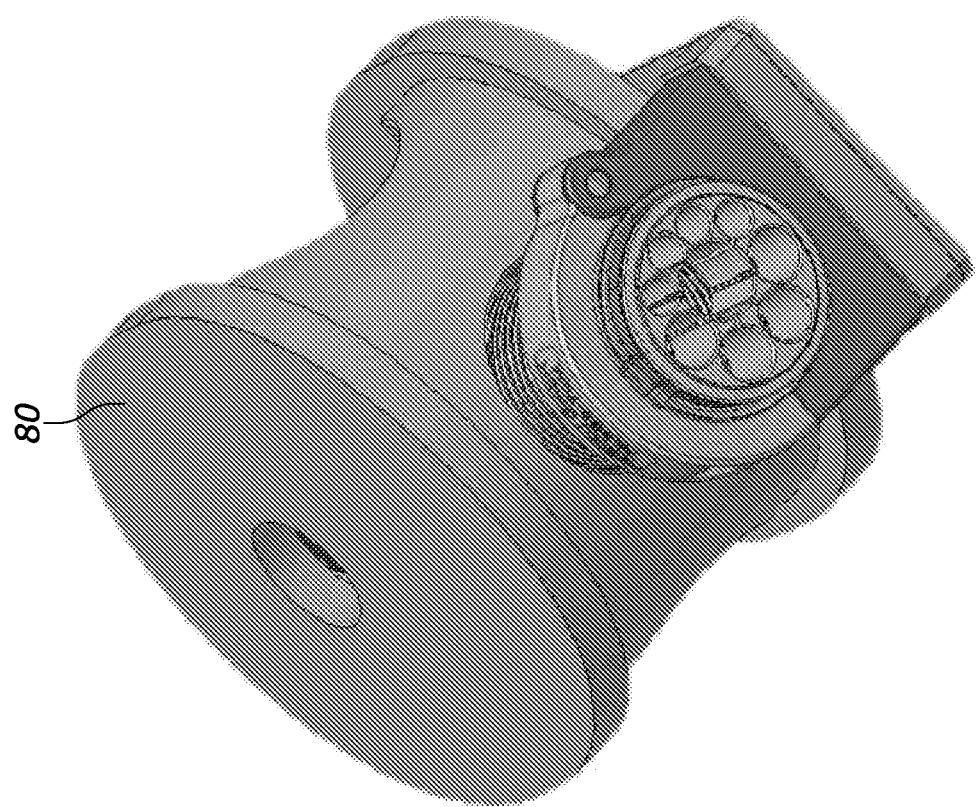
Figure 37F:
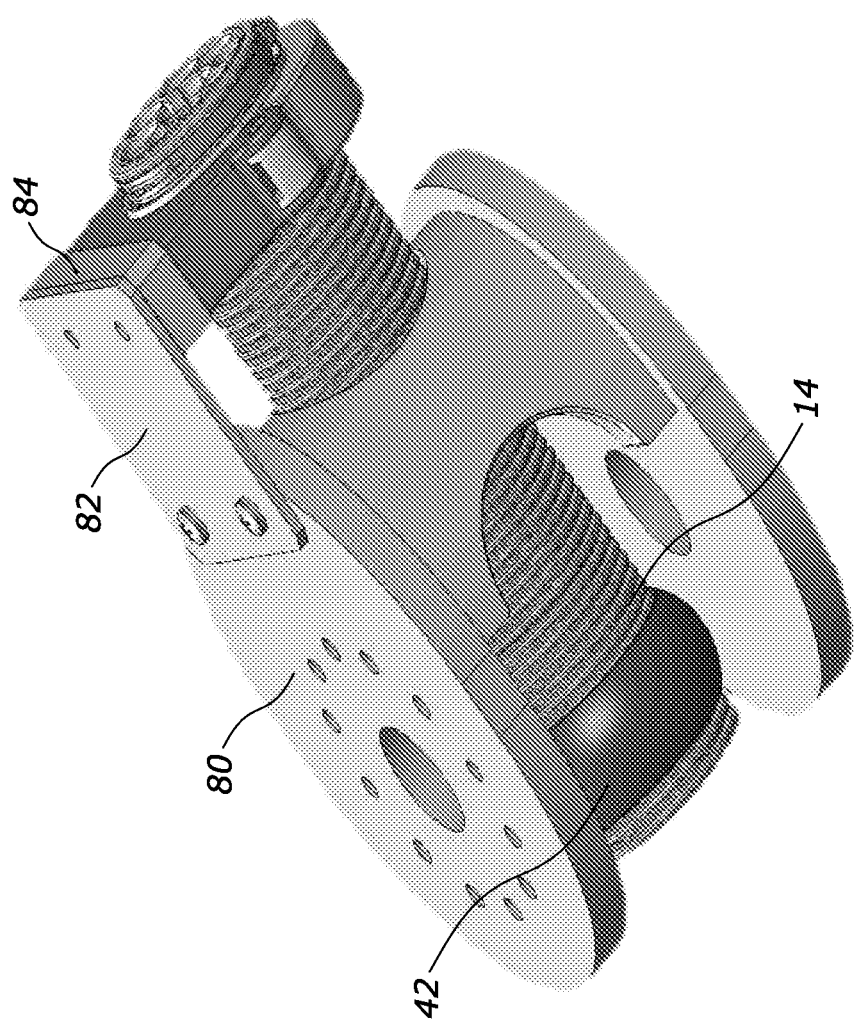
Figure 37G:
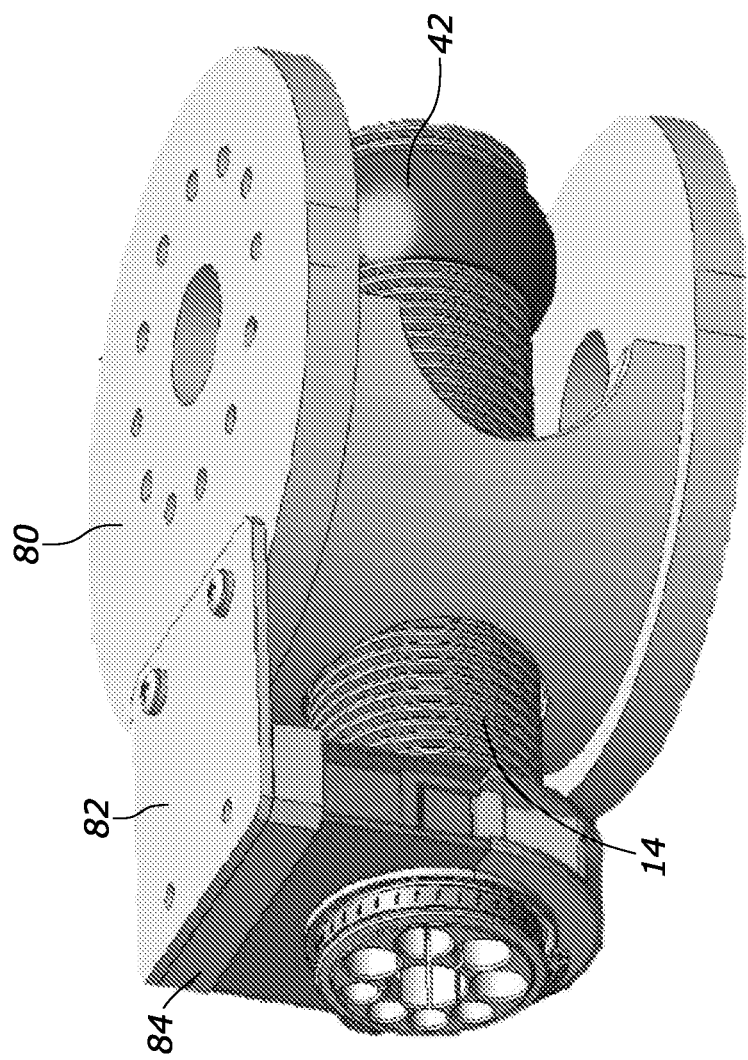
Figure 37H:
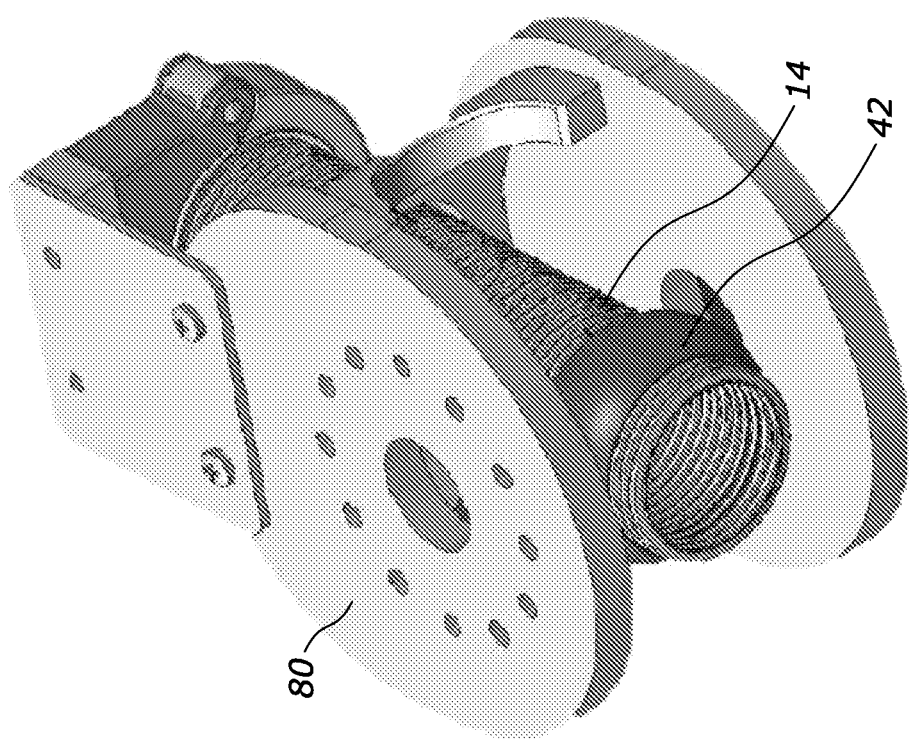
Figure 37I:
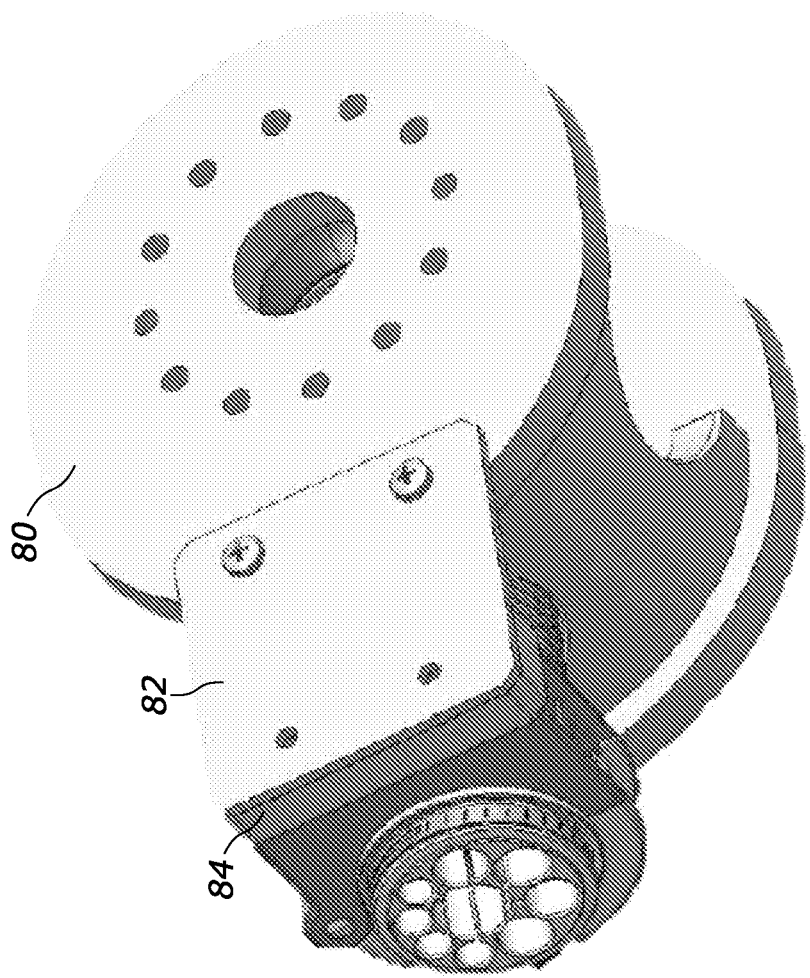
Figure 38A:
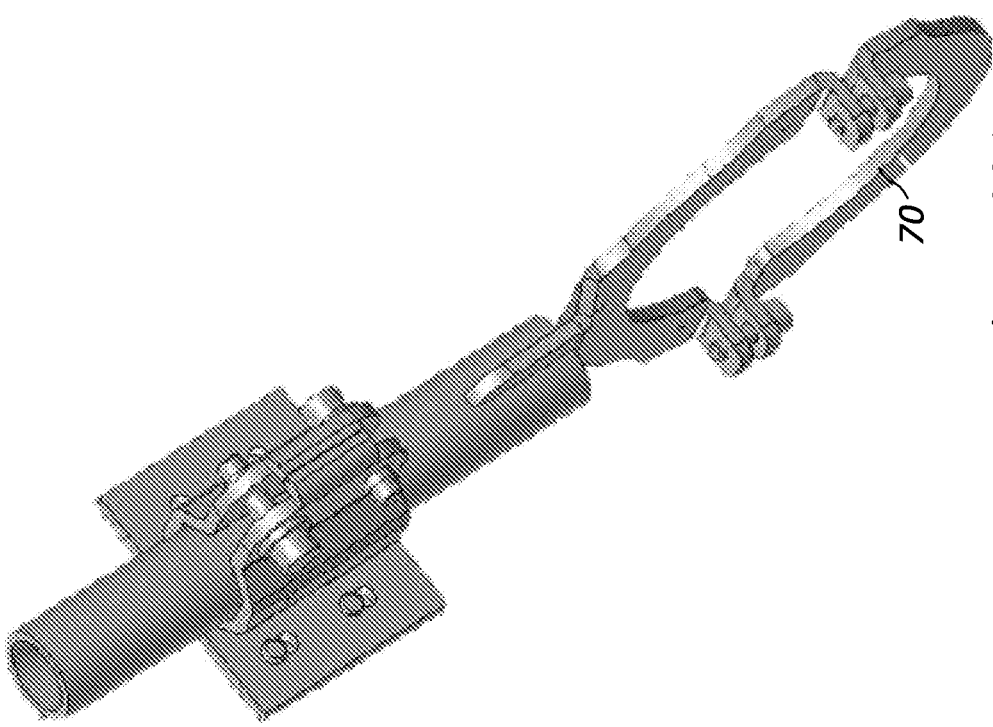
FIGS. 38A to 38E show various perspective views of a CAD design for a frying-pan mount, in an embodiment of the present invention.
Figure 38B:
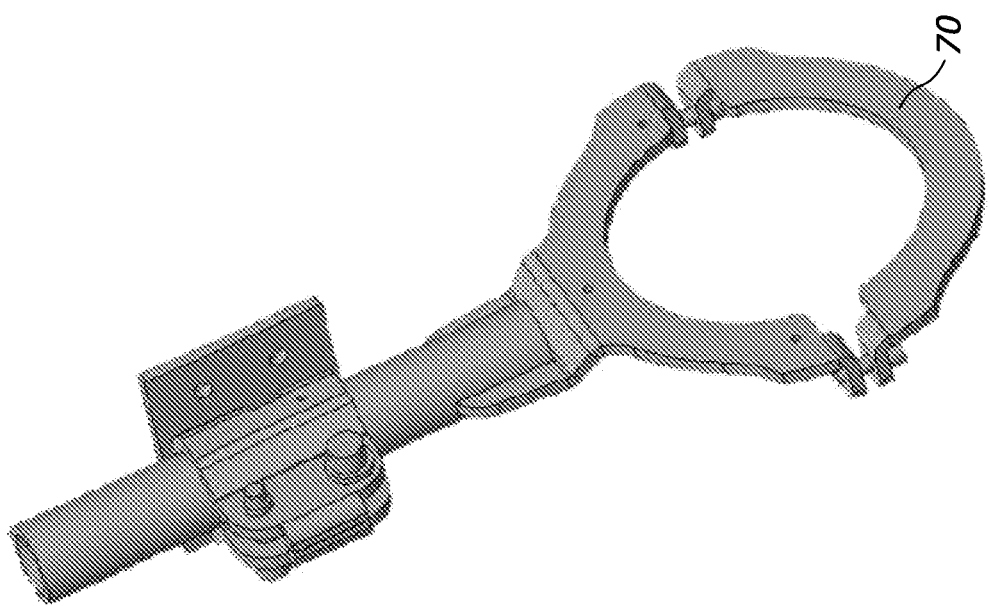
Figure 38C:
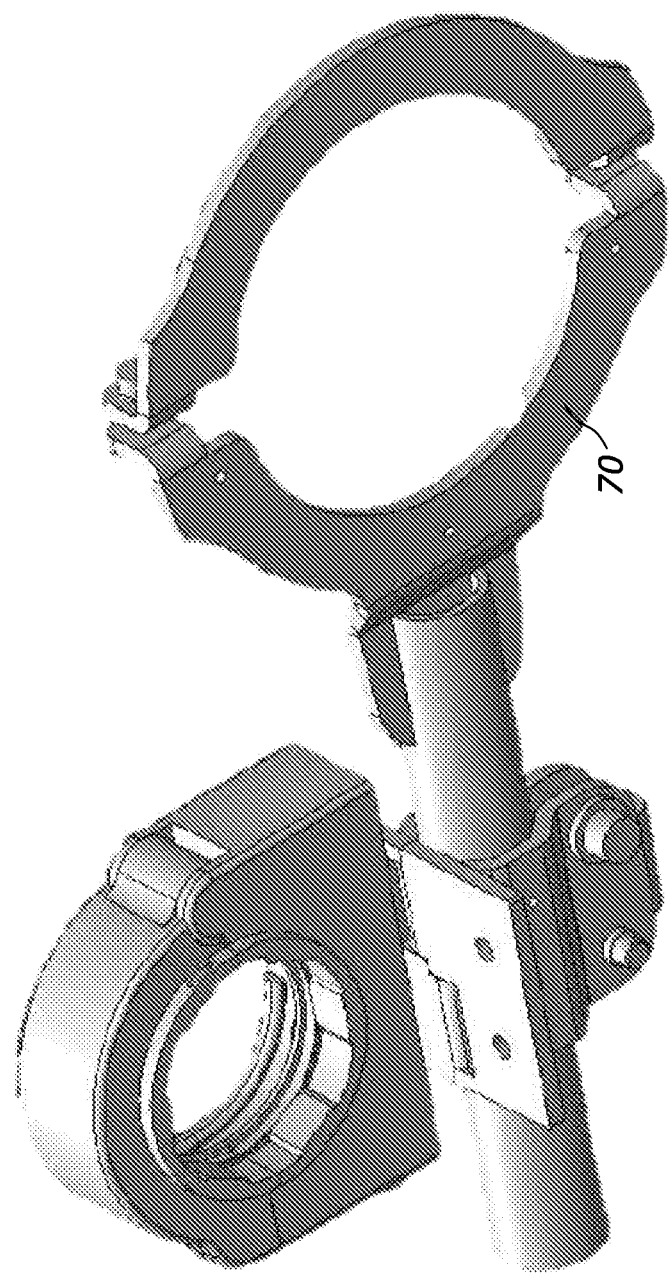
Figure 38D:
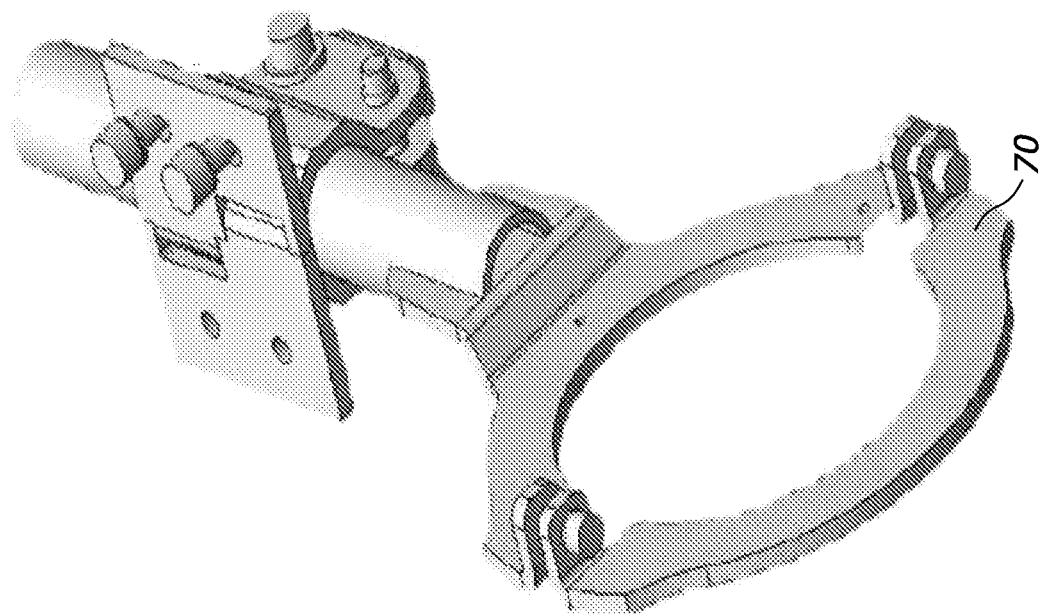
Figure 38E:
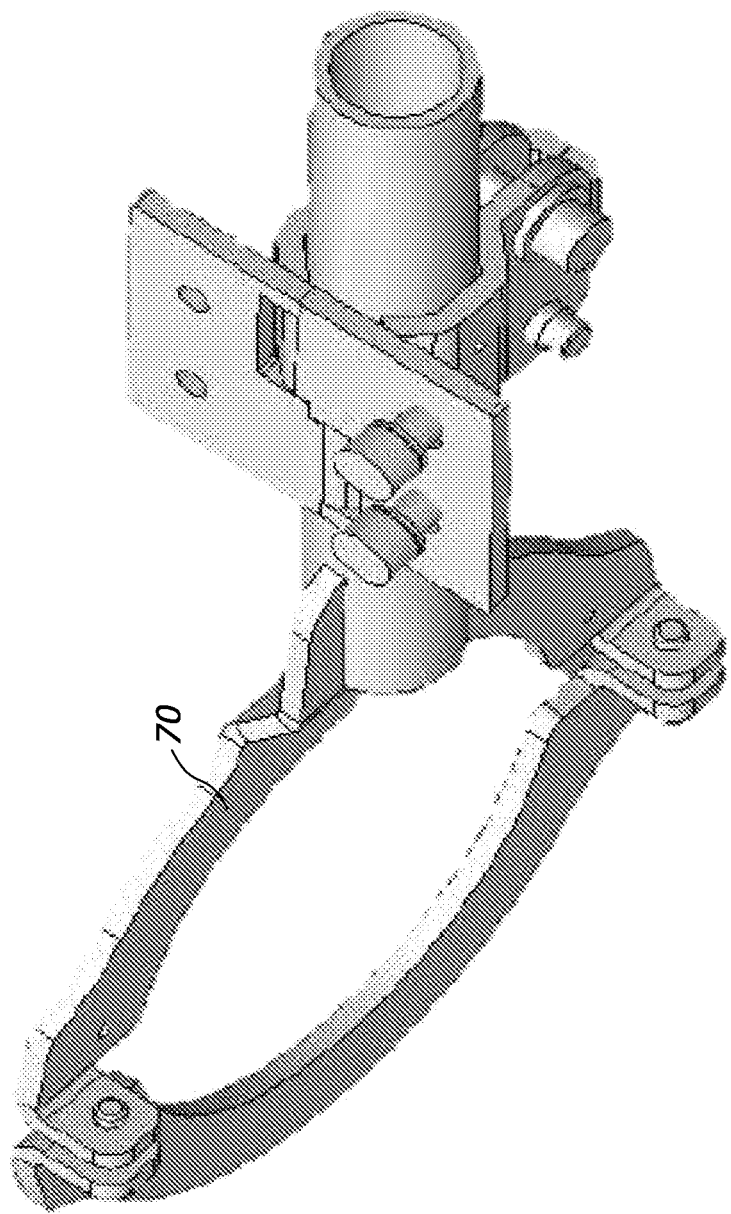

The 52 mm and 70 mm designs use basically the same components as one another as the 18 mm difference in corrugated tubing diameter can be accommodated by the system. The dimensions of the longitudinal rigid tube 20 are shown in FIG. 5E as a 22.526" length of 4" schedule 10, 6061-T4 aluminum pipe. The dimensions and fabrication details of the 52 mm/70 mm back plate 30 are shown in the engineering drawing of FIG. 23, while the 52 mm/70 mm formed channel support 24 is shown in FIGS. 19A and 19B, the 52 mm/70 mm front plate 26 is shown in FIG. 20, the 52 mm/70 mm middle support 28 in FIG. 21 and the 52 mm/70 mm split ring clamp plate 34 in FIG. 22. All of the 52 mm/70 mm back plate 30, front plate 26, middle support 28 and split ring clamp plate 34 are preferably machined from 6061-T6 aluminum. The 52 mm/70 mm formed channel support 24 is preferably fabricated from ¼" thick 5052 aluminum which is folded as shown in FIG. 19B. Again, as shown in FIGS. 5A to 5C, the back plate 30, front plate 26 and middle support 28 are simply bolted to the formed channel support 24, preferably with button head cap screws. The two halves of the split ring clamp plate 34 are installed at a later time to hold the spring holder 44 (Reiku PAFHB-70 as noted in FIGS. 31 and 32) in place, the two halves mounting to the face of the front plate 26. The free end of the spring element 22 is attached to a protector 42 which is clamped to the flexible corrugated hose 14. Because of the small difference in diameter between the 52 mm and 70 mm designs using the same 4" diameter longitudinal rigid tube 20, the 70 mm design uses a straight spring element 22, while the 52 mm uses a tapered spring element 22.

Figure 5F:
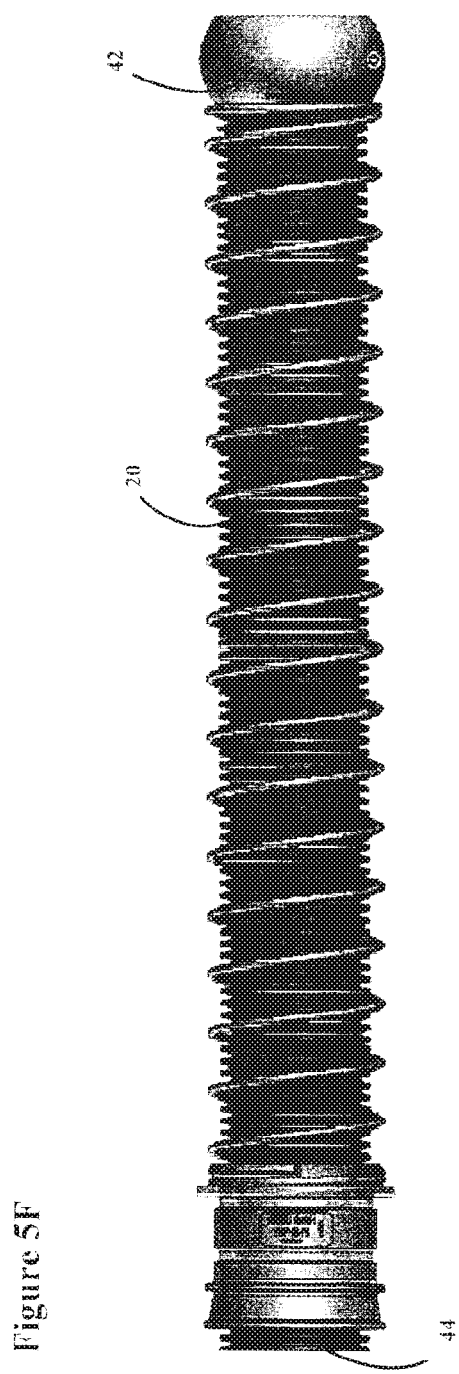

A more detailed view of the spring holder 44, spring element 22 and protector 42 is shown in FIG. 5F. The protector 42 has ridges which lock onto the flexible corrugated hose 14. The I.D. of the spring element 22 is larger than the O.D. of the flexible corrugated hose 14 so the flexible corrugated hose 14 moves laterally through the spring element 22. The O.D. of the protector 42 is larger than the I.D. of the spring element 22, so when the flexible corrugated hose 14 is pulled by the robot movements, in the case of FIG. 5F moving to the left, the protector 42 is pulled to the left with the flexible corrugated hose 14, compressing spring element 22. Once the robot 12 moves back to its "home" position the harnessed energy of the spring element 22 pulls the service loop of the flexible corrugated hose 14 back to the right, to its home position.

Figure 5G:
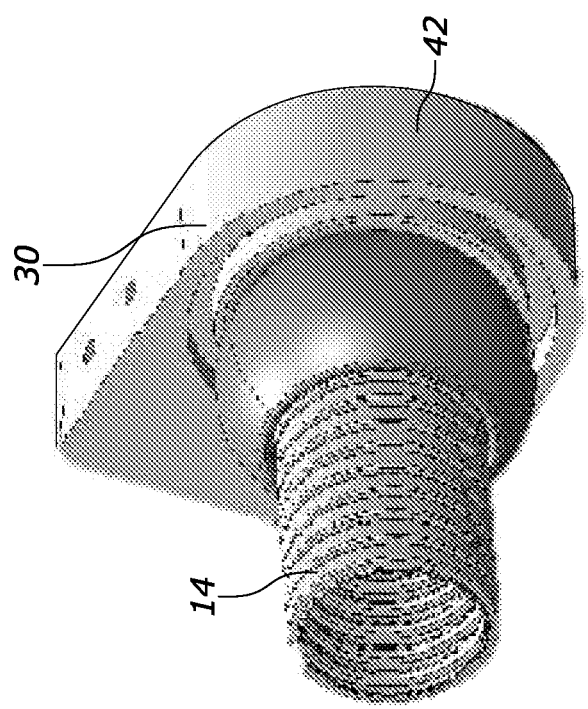
Figure 5H:
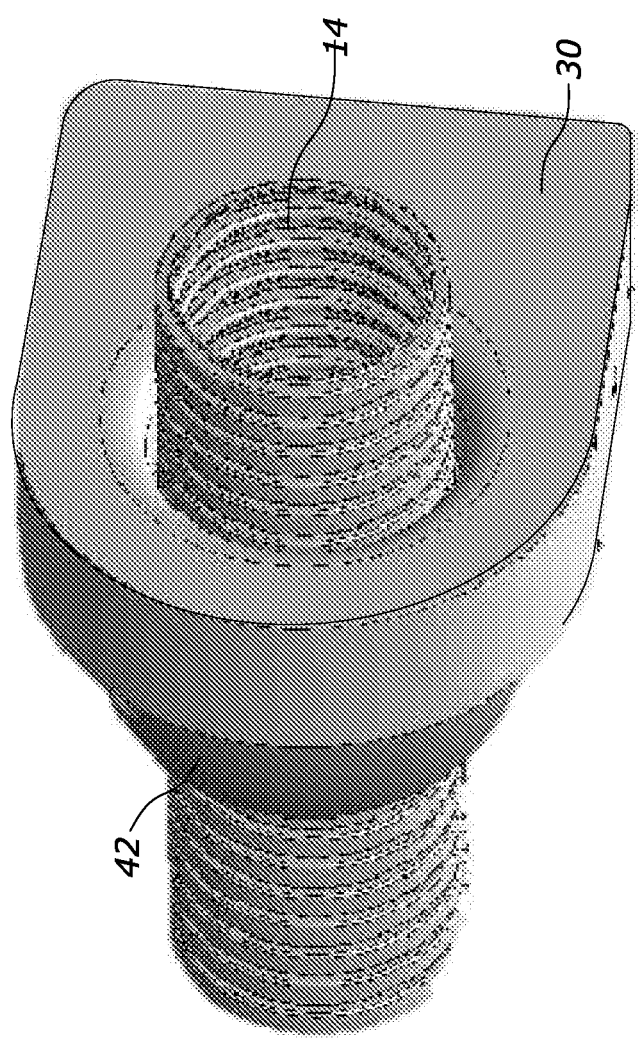

As shown in detailed view of FIGS. 5G and 5H, the O.D. of the protector 42 is larger than the I.D. of the back plate 30, so it will not leave the energy tube 40. Note that the back plate 30 has a smooth radius edge on both the inside and outside of the hole passing through it so that the flexible corrugated hose 14 does not rub against a sharp or rough edge when exiting and making a bend/transition. Alternatively, the back plate 30 may have a funnel- or trumpet-shaped entrance. Robots may cycle millions of times a year so it is imperative to remove any possible mechanical influences from the flexible corrugated hose 14. Also another reason why the Cable Saver system was designed to be adjustable and have several size options was to provide optimized geometry for the flexible corrugated hose 14 which minimizes mechanical interference.

Because the protector 42 has an O.D. that is larger than the hole in the back plate 30, the energy tube 40 is typically sold in a pre-assembled form, with a generous length of flexible corrugated tubing 14 that would be cut back during installation. A typical length of flexible corrugated tubing 14 that comes with a Cable Saver assembly is 5 meters long, with the protector 42 inside the energy tube 40 engaged at the 2 meter mark. Thus, 2 meters of conduit protrudes out the rear of the energy tube 40 to form a retractable service loop. Of course, the system may be provided with any length of flexible corrugated tubing 14. Alternatively, the energy tube 40 could be disassembled/reassembled in the field so that the length of flexible corrugated tubing 14 could be customized, although it may be more convenient to simply use a splice in the flexible corrugated tubing 14.

Figure 51:
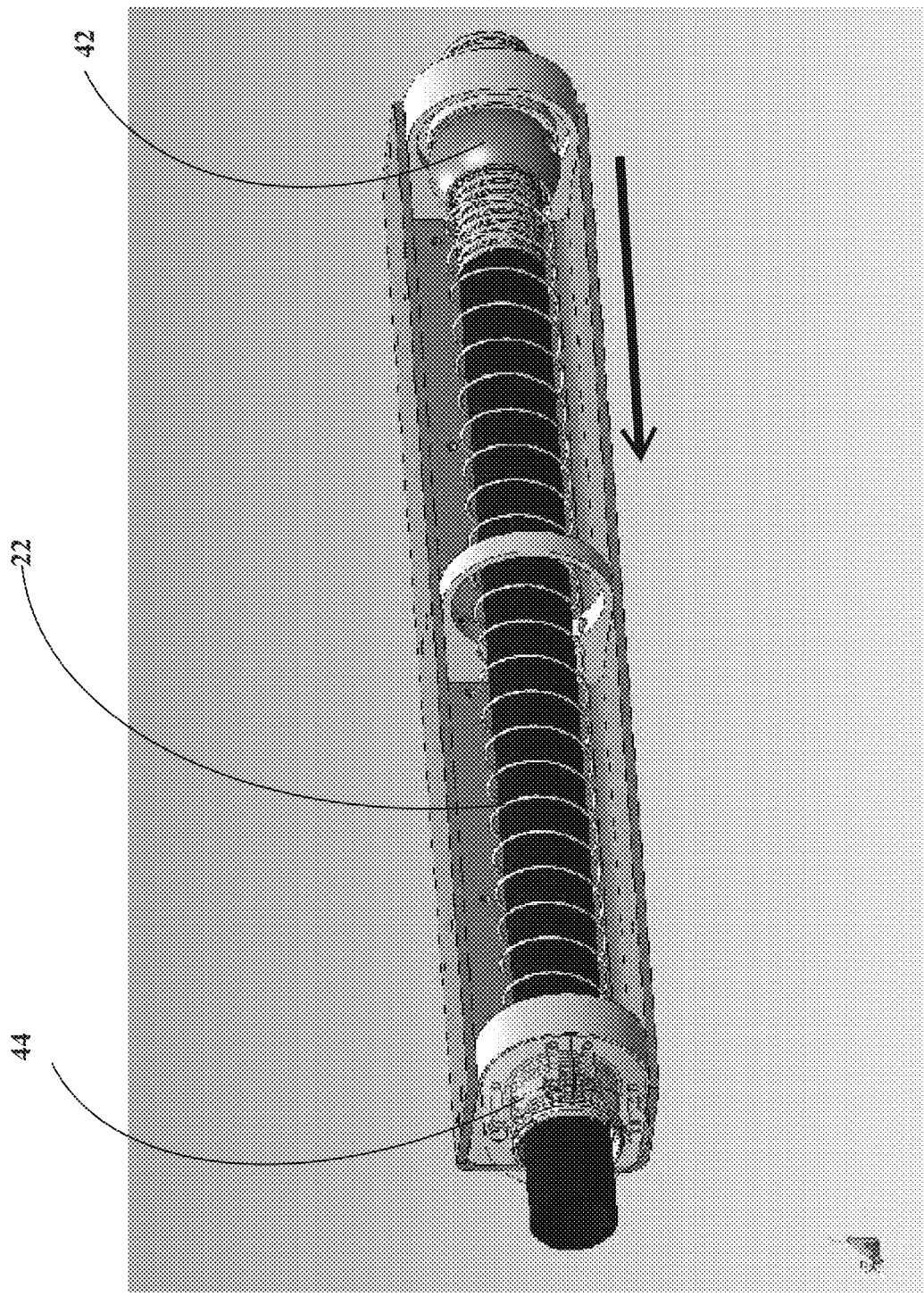

Finally, FIG. 51 shows a view of the spring holder 44, spring element 22 and protector 42 installed in the energy tube 40, immediately prior to the installation of the split ring clamp plate 34. The longitudinal rigid tube 20 is not shown in this view so that the internal components can be seen, but of course it would have been installed before the front plate 26 and back plate 30 were fixed to the formed support channel 24. Clearly, the split ring clamp plate 34 could be provided with whatever channels or grooves are required to mate with the particular spring holder 44 being used.

The initial design of the Cable Saver 10 primarily used mild steel components, but it was found that the overall weight of the system became a factor in certain installations. By redesigning the system to generally use aircraft quality 5052 H32 aluminum components, it was found that a 66% overall weight reduction could be achieved. More specifically, for the energy tube 40 itself the formed support channel 24 was originally fabricated from 3/16" (0.48 mm) mild steel. By switching to 1/4" (6.35 mm) thick 5052 aluminum a 3.15 kg weight savings was demonstrated on the smaller 36 mm size system and 4.76 kg weight reduction was obtained on the larger 52 mm and 70 mm sized systems. The thickness of the aluminum was increased in order to offer more surface area for mating of screws in the tapped holes of the formed support channel 24 used for mounting the energy tube 40. The mounting screw diameter was also increased from 6 mm to 8 mm.

The Cable Saver 10 mounting hardware was also converted from mild steel to 5052 H32 aluminum in order to reduce overall weight. All bracket component thicknesses were increased from 3/16" (0.48 mm) thickness to 1/4" (6.35 mm) again to provide more mating surface for tapped holes and screws. An additional third row of holes was added to the robot bracket—main mounting plate 60 to offer height adjustment for energy tube 40 mounting.

It was also found that a reduction of certain tolerances for the system components would result in faster manufacturing times and therefore a decrease for machining and fabrication costs, without compromising the operation of the system. In particular, it was determined that the holes 36 in the formed support channel 24 for mounting of the front plate 26, back plate 30 and middle support 28, could be elongated or slotted in a vertical direction in order to allow for easier alignment during assembly (see FIGS. 5C, 14A, 14B, 19A and 19B). The slotted holes 36 in the formed support channel 24 enable easier vertical alignment of the slotted holes 36 with the receiving holes in the front plate 26, back plate 30 and middle support 28.

As well, it was found that the groove/shoulder 38 in the front plate 26 and back plate 30 which mates with the longitudinal rigid tube 20, could be deepened to provide additional lateral movement, assisting with the assembly process (see FIGS. 5C, 13, 15, 18, 20 and 23). That is, it is not necessary that the longitudinal rigid tube 20 sit flush with the bottom of the groove/shoulder 38 in the front plate 26 and back plate 30. When the energy tube 40 was assembled by installing the middle support 28 and back plate 30 in the formed support channel 24, and then inserting the longitudinal rigid tube 20 through the middle support 28 and seating it in the groove/shoulder 38 in the back plate 30, it was found that the front plate 26 would bottom-out when pushed into position in the front plate 26. This prevented the holes in the front plate 26 from lining up with the mounting holes 36 in the formed support channel 24. The depth of the groove/shoulder 38 was increased in both the front plate 26 and back plate 30 to provide lateral slack. Of course, the additional slack was not enough that the longitudinal rigid tube 20 would fall out of engagement with the front plate 26 and the back plate 30.

Figure 44A:
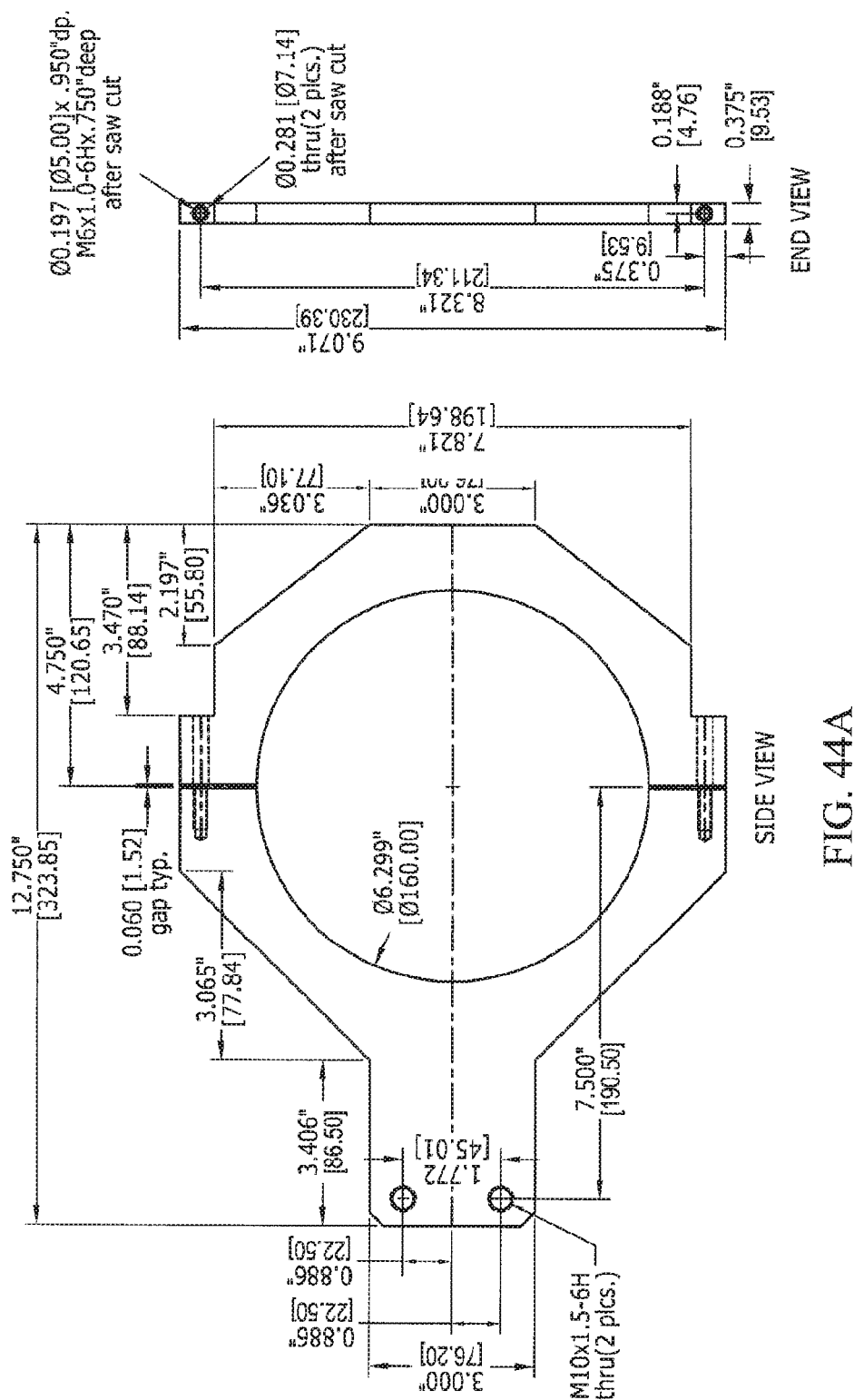
FIGS. 44A to 44C show engineering drawings of exemplary frying-pan mounts, in an embodiment of the present invention.
Figure 44B:
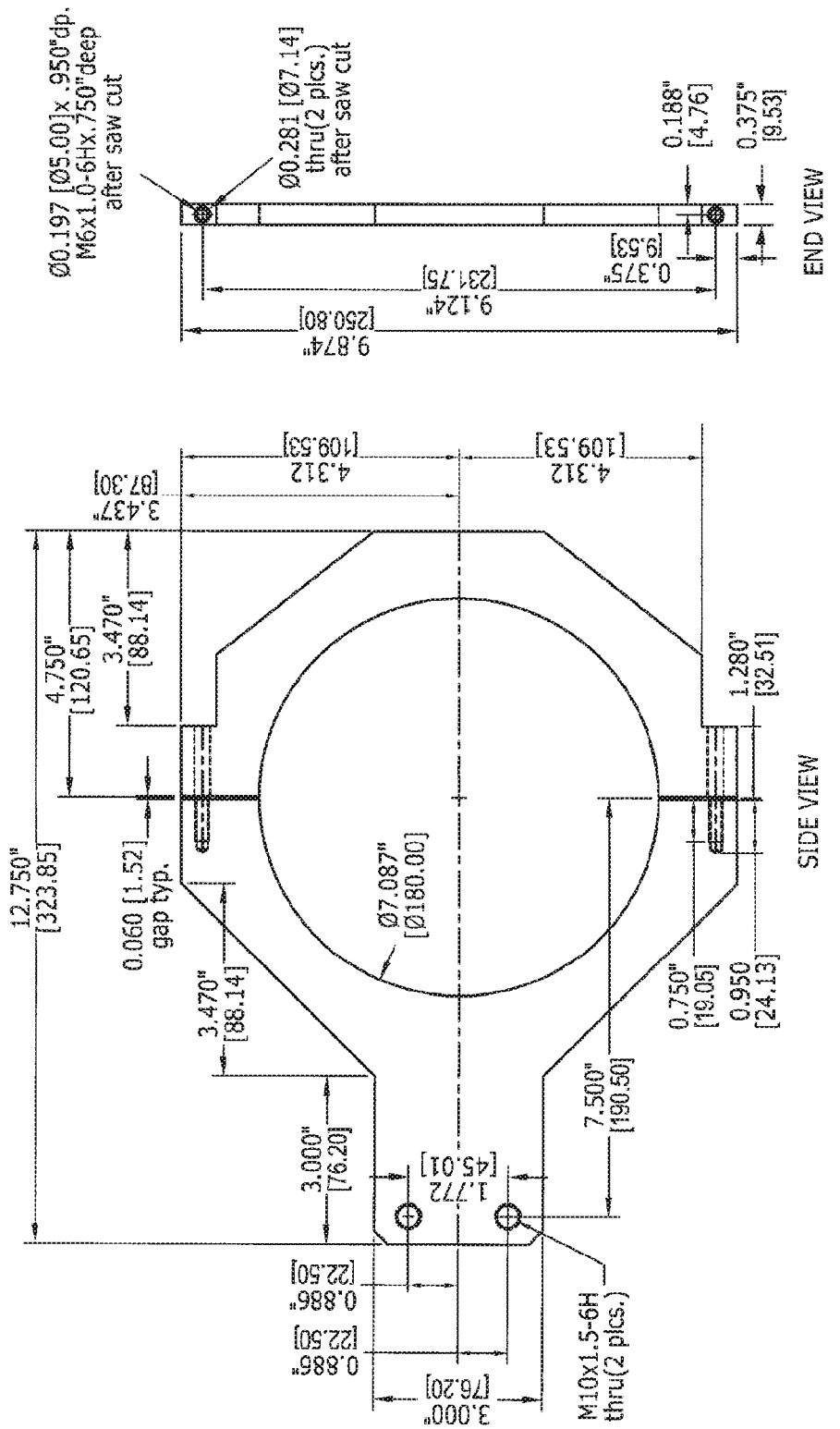
Figure 44C:
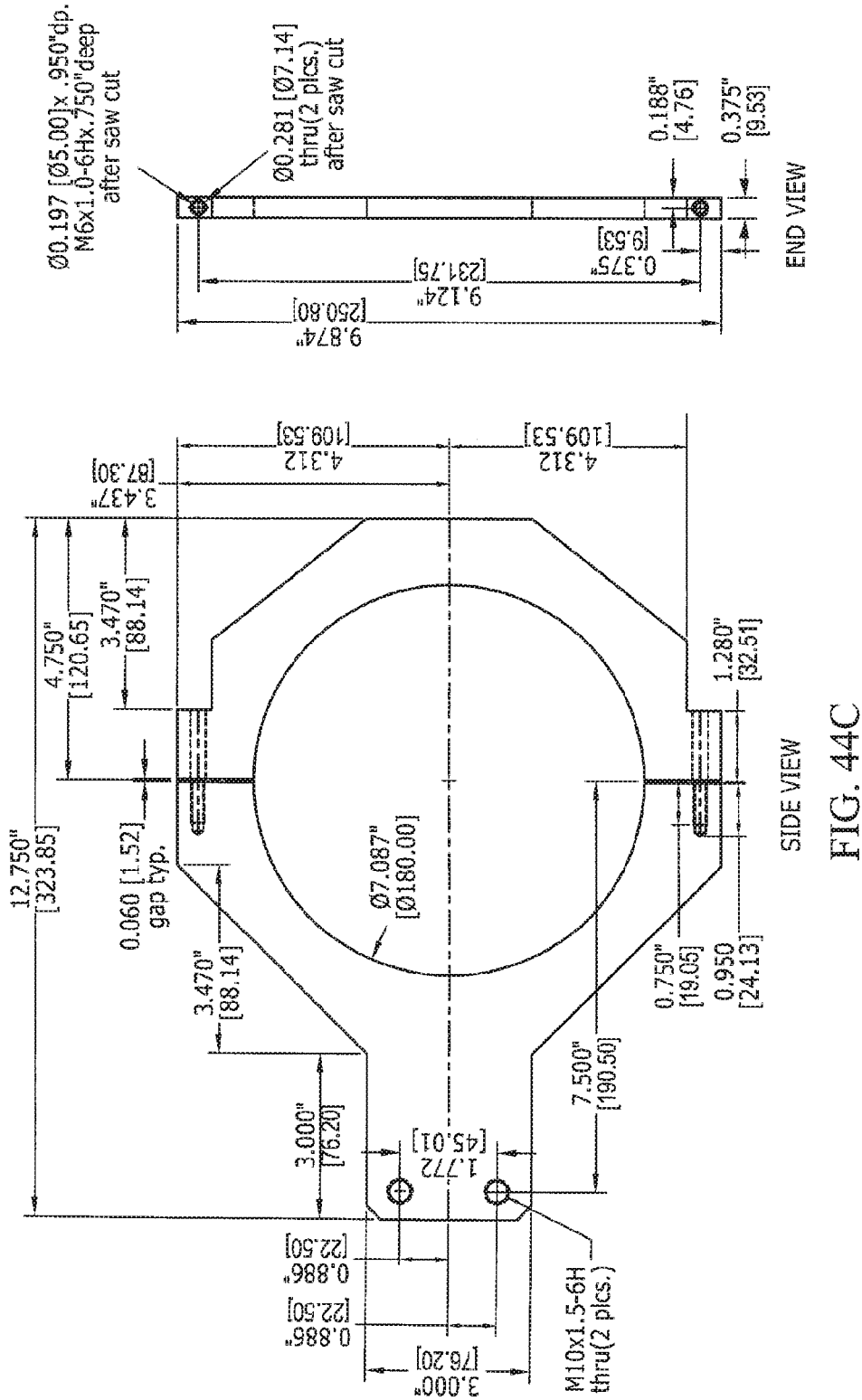

Cow's Mouth:

In a lot of robotic applications there is considerable dynamic motion and rotation at the end of the robot arm (EOAT). Even with the cables and hoses being protected by flexible corrugated tubing/conduit in some extreme instances it is possible for the cables and hoses to become wrapped around the robot wrist. This can cause maximum bend expectation forces to be applied to the conduit or cables/hoses, resulting in damage or failure of the robot 12. In order to secure the conduit final clamp component in the EOAT area various versions of hardware known as "frying-pans" can be installed around the robot wrist area. A "frying-pan" rotates with the robot wrist and may cause the conduit service loop to be pulled from its safe location in order to facilitate the mobility of the wrist. See FIGS. 8 and 9 for implementations of a "frying-pan" 70. FIGS. 38A to 38E show various perspective views of a CAD design for a frying-pan mount, while FIGS. 44A to 44C show engineering dimensions for two embodiments of 'short-handle' frying-pan designs.

Figure 10:
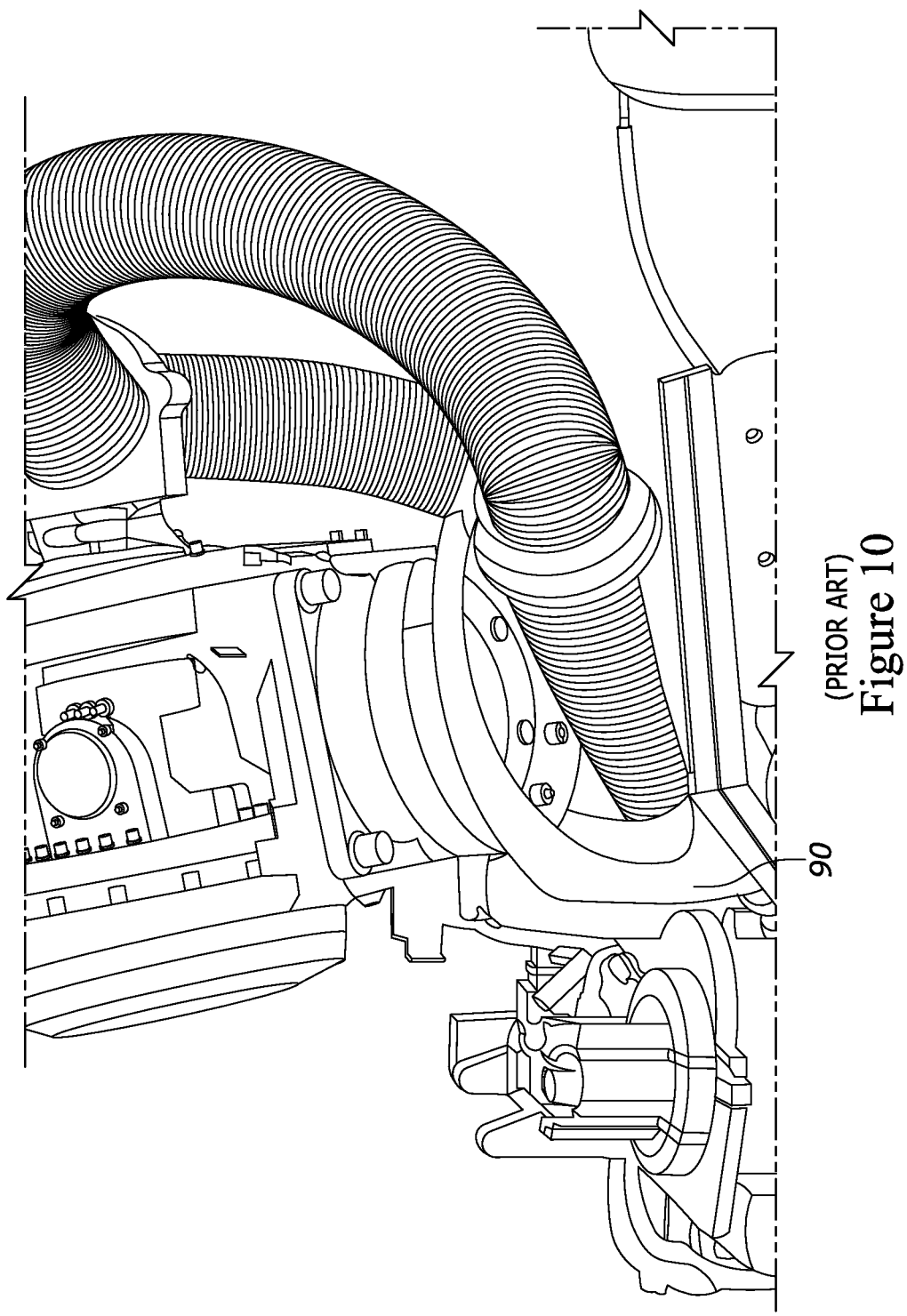
FIG. 10 shows an example of a cast metal EOAT "C" bracket.

To combat the wrapping of the conduit/cables and hoses around the wrist area of the robot 12, cast metal devices shaped like a "C" are sometimes installed in the robot wrist area (see the "C" bracket 90 in FIG. 10). This "C" shape allows the flexible conduit to ride inside the device instead of wrapping around the robot wrist. However, the known cast metal "C" brackets 90 have some drawbacks. For example, they are generally heavy which compromises robot payloads as they are attached to the extreme end of the robot arm, the cantilever effect of this additional weight reducing the robot maximum payload. As well, the mounting hole pattern for these "C" brackets 90 are generally specific to one particular robot manufacturer and model of robot 12. Finally, the span of the two plates of the known "C" brackets 90 are based on using larger 70 mm I.D. conduit only.

The Cable Saver 10 system is designed to be installed on a broad variety of makes and models of robots 12. With this in mind, a "Cow's Mouth" device 80 was designed which addresses several of the shortcomings of the known "C" brackets 90.

For example, the Cow's Mouth 80 of the invention is not made from cast metal but rather it is fabricated by welding or fusing the three major metal pieces together so that the Cow's Mouth 80 can withstand a 210 kg payload. The Cow's Mouth 80 can be fabricated, for example, from stainless steel or aluminum, which is an important offering to some customers. Fabricating in this manner provides numerous other advantages over the known "C" brackets 90 such as lighter weight and the ability to counter bore mounting holes to accommodate hex heads of bolts and the like. The counter boring reduces the overall height/depth of the cow's mouth 80 and also increases precision of the system. SAE approval and the use of a certified welding and fabrication shop ensures that the 210 kg maximum potential payload is maintained for integrity of the Cow's Mouth 80.

Figure 39A:
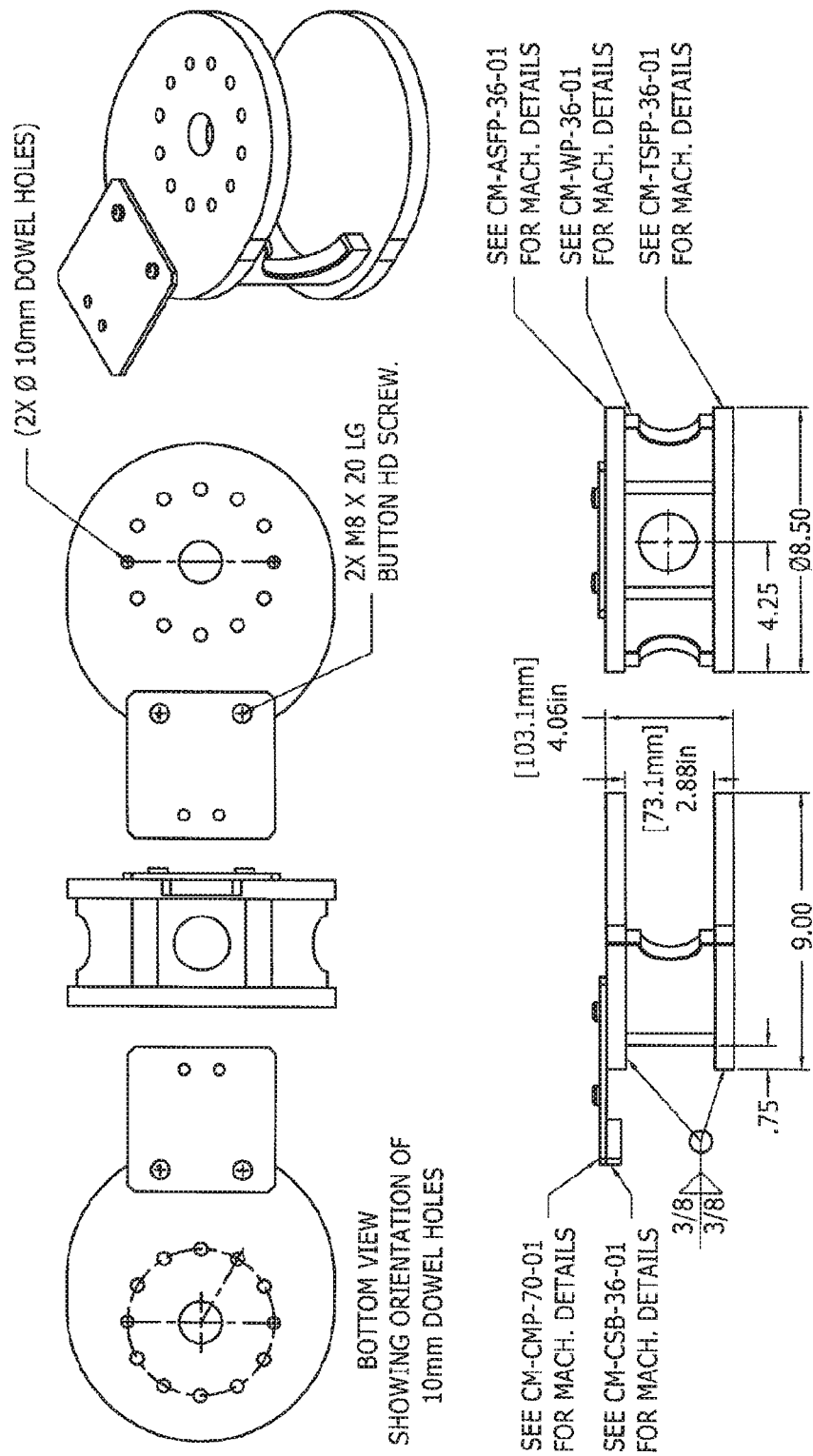
FIGS. 39A to 39F show engineering drawings of a second exemplary cow's mouth, in an embodiment of the present invention.
Figure 39B:
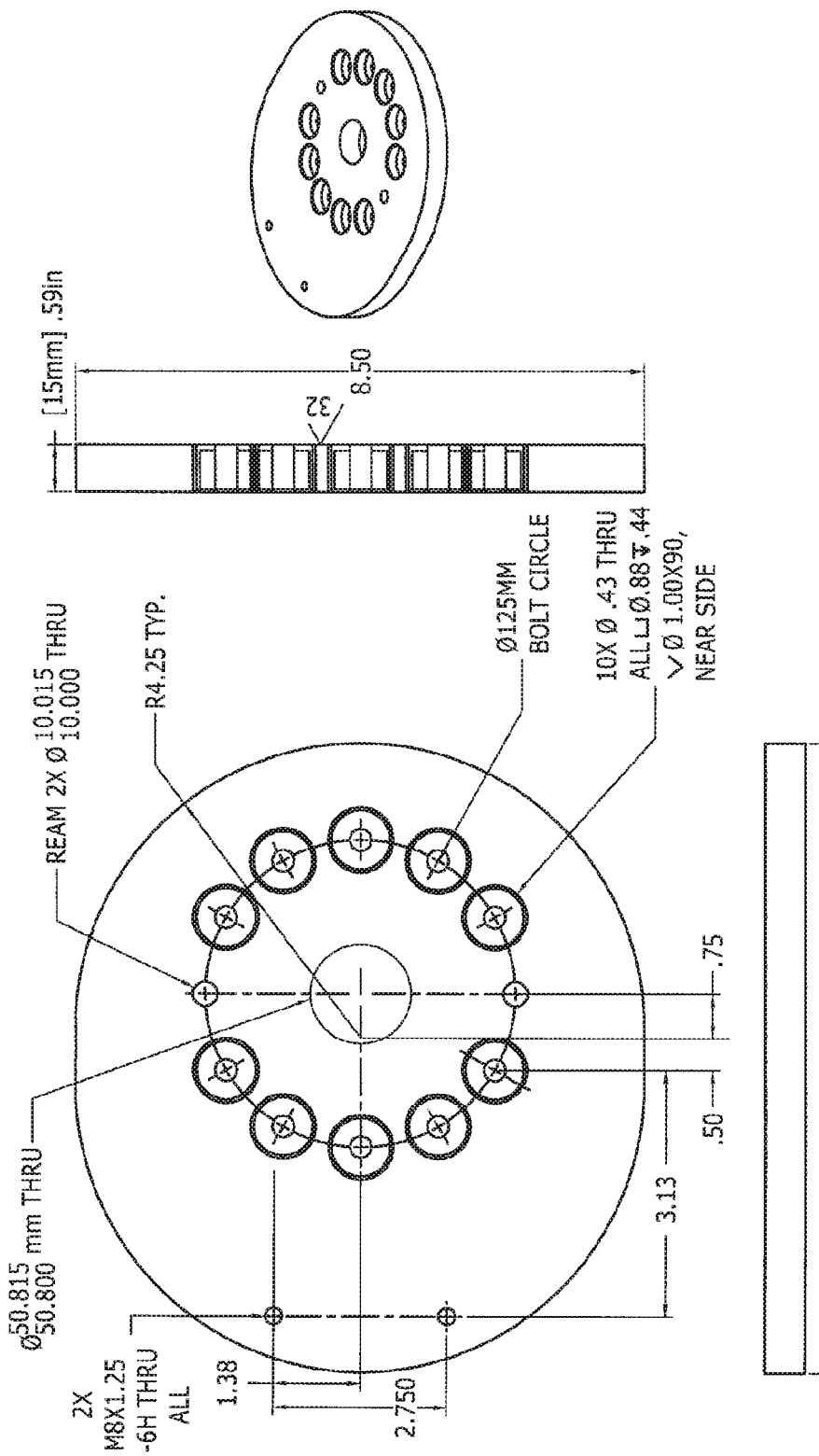
Figure 39C:
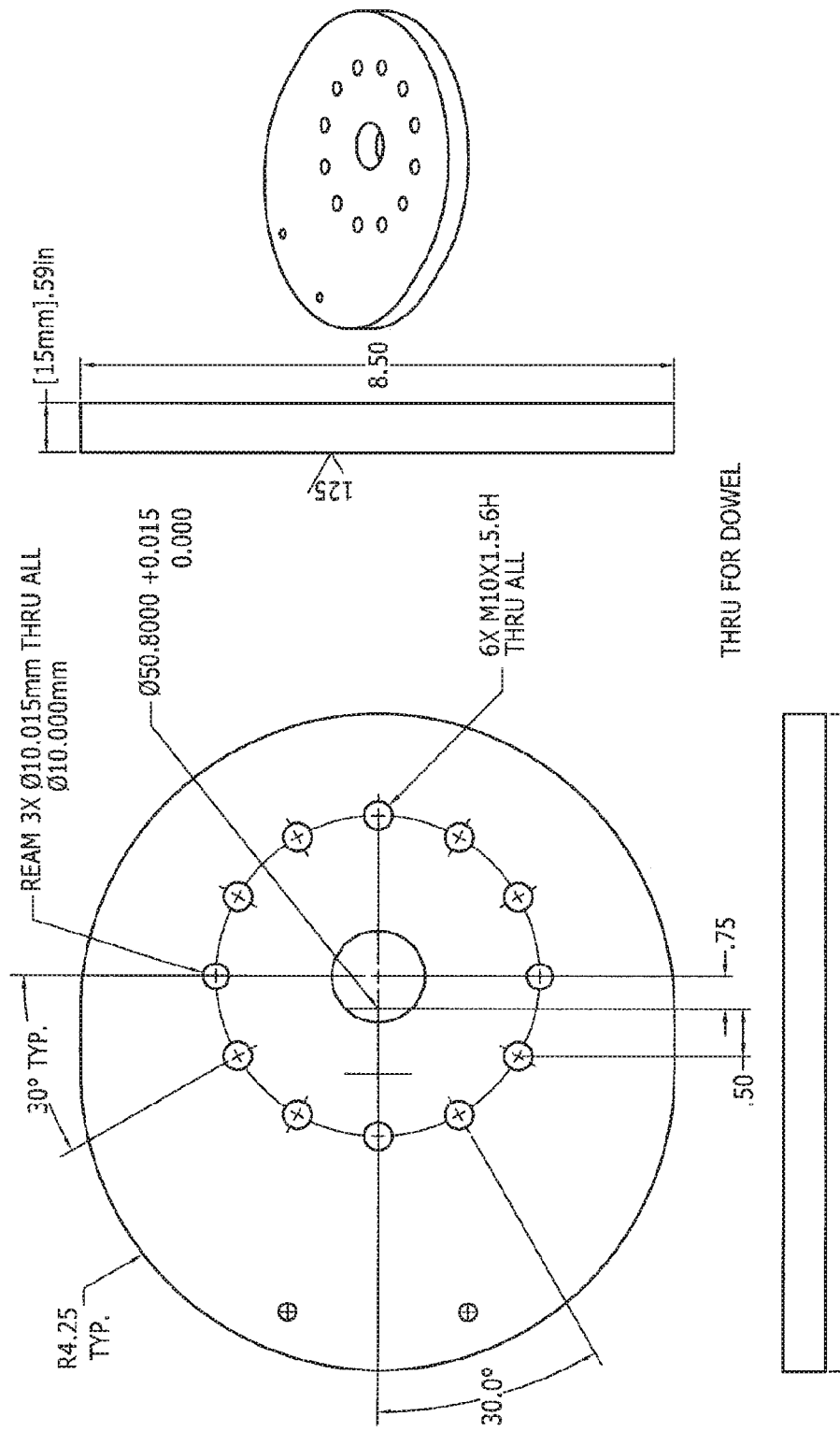
Figure 39D:
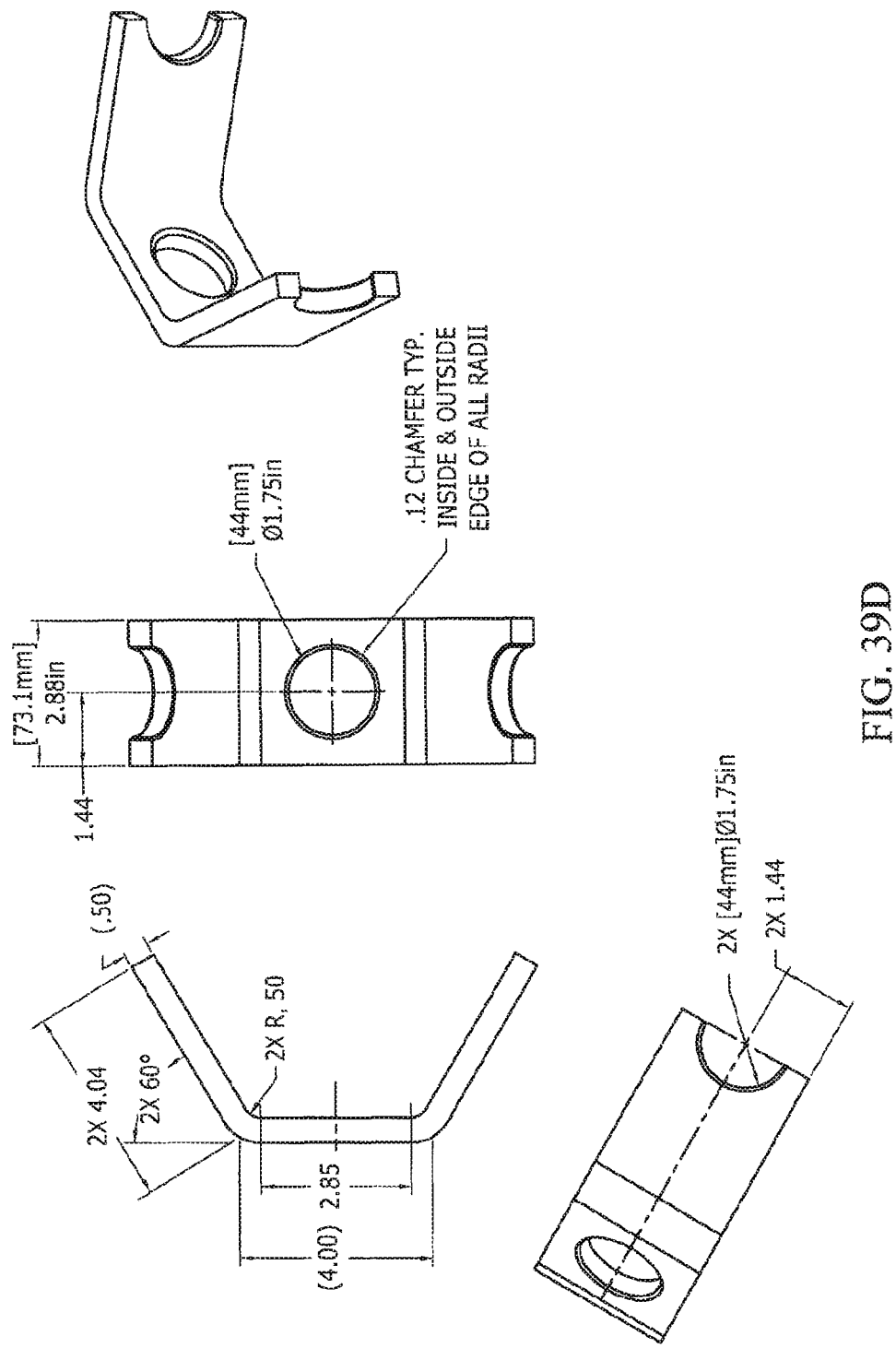

The Cow's Mouth 80 is preferably fabricated with a mounting hole pattern for any robot model through holes cut into its mounting surface, thus making it a universal fit. Robot faceplates are where the "tools" are mounted that the robot 12 utilizes (welding gun, paint sprayer, grippers, etc.) As is the case with car tires for example, each manufacturer has various sizes of wheel rims based on models and payloads, with somewhat distinctive mounting hole patterns. The same occurs for robots, so to offer a more universal product the current system has been designed with a variety of mounting hole patterns, sizes of faceplates and wrists, and payloads. Thus, the components of Cow's Mouth 80 match a variety of hole patterns for the "top" surface so that they will fit on almost all makes and models of robots 12, while the hole patterns on the "bottom" surface accept a variety of tool mounting hole requirements (see for example, the hole patterns in FIGS. 39A to 39C).

Figure 11:
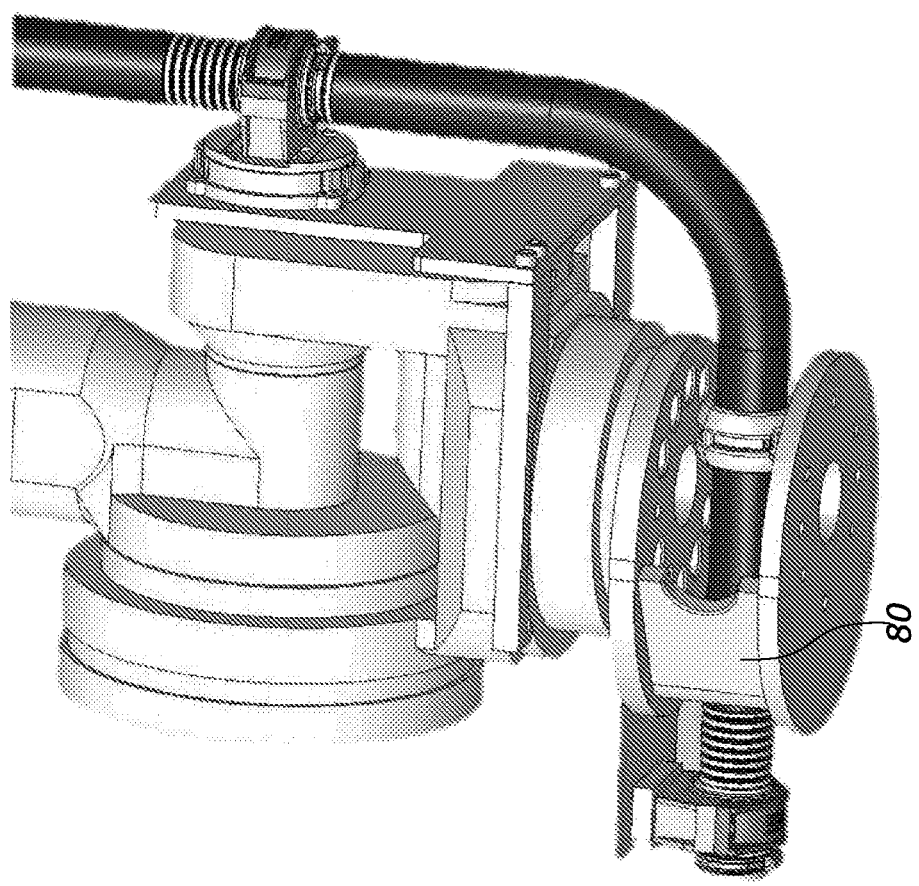
FIG. 11 shows an example of a "Cow's Mouth" in accordance with a further embodiment of the present invention.
Figure 12:
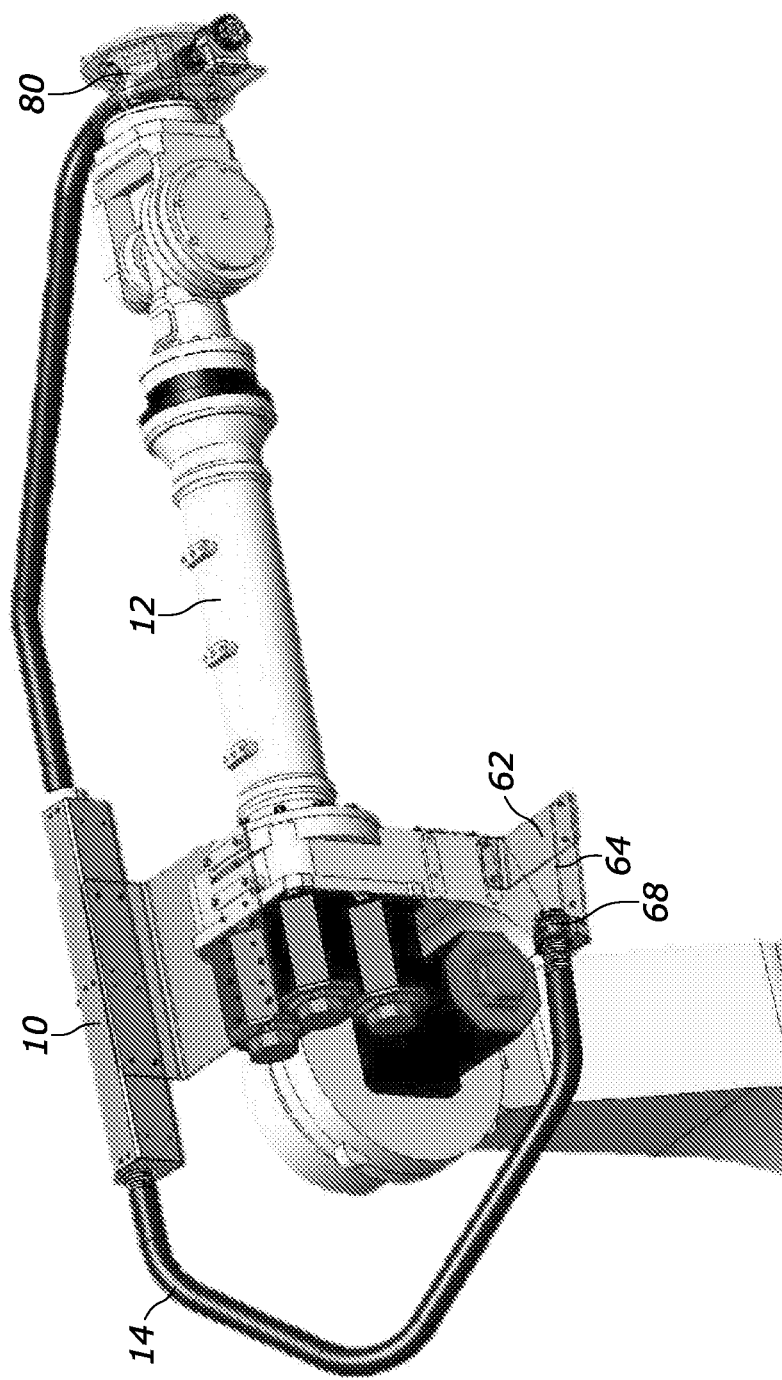
FIG. 12 shows an example of a "Cow's Mouth" in accordance with a further embodiment of the present invention.
Figure 13:
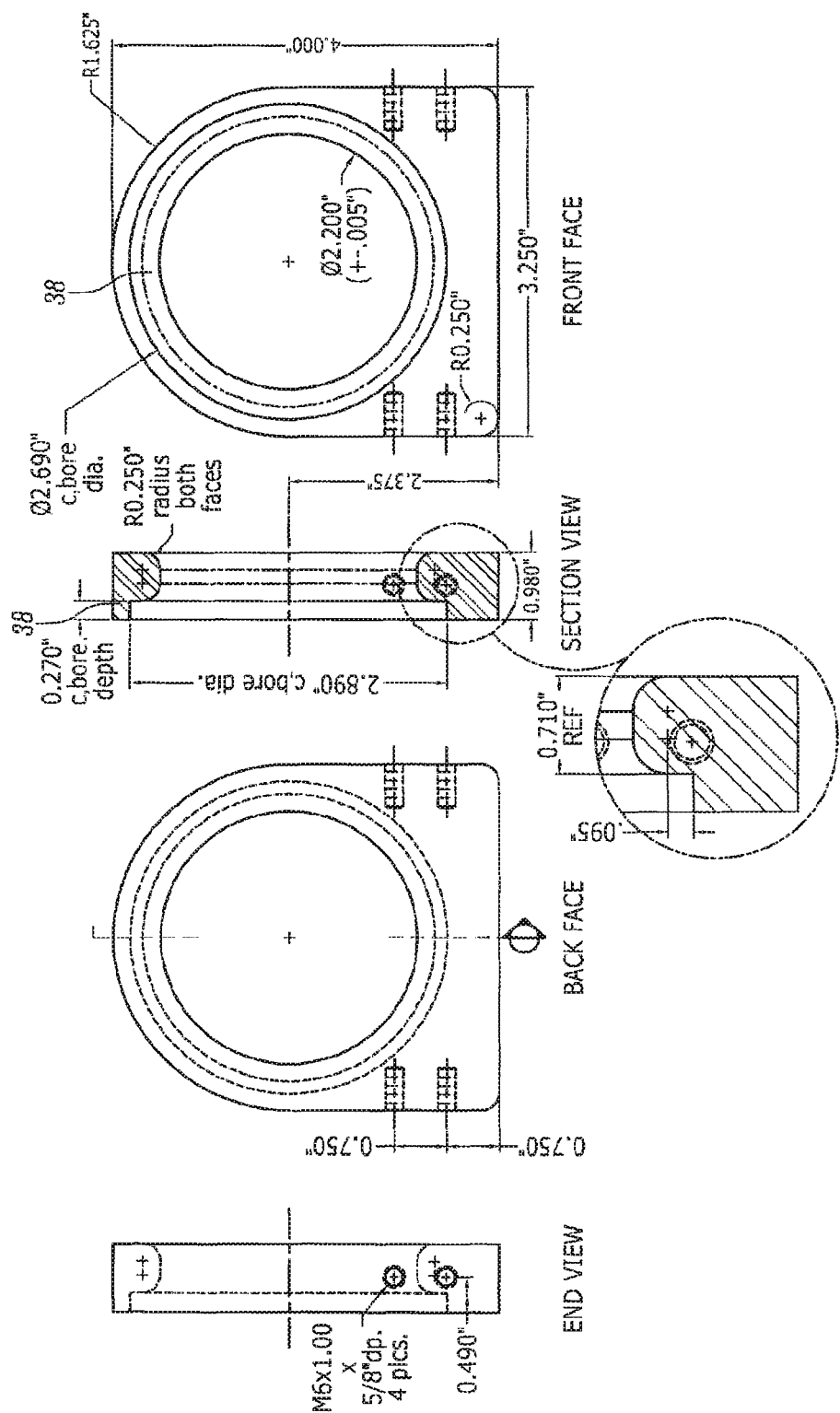
FIG. 13 shows a 36 mm back plate in accordance with a further embodiment of the present invention.

The Cow's Mouth 80 is available for three different conduit sizes to compliment the three different sizes of Cable Saver Solution offerings: 36 mm, 52 mm and 70 mm I.D. conduit sizes (see FIGS. 11 and 12). But of course, other conduit sizes may also be accommodated. The conduit size will dictate the height of the generally arcuate wall, as well as the size of the passage or bore through the generally arcuate wall. In contrast to the known "C" brackets 90, which only come in the cast 70 mm size, having the smaller sizes of Cow's Mouth 80 allows the selection of a component which is less expensive, takes up less room, and weighs less. FIGS. 33 to 36 present exemplary details for fabrication of a 70 mm Cow's Mouth 80, while FIGS. 39A to 39F present exemplary details for fabrication of a 36 mm Cow's Mouth 80. FIGS. 37A to 37I and FIGS. 40A to 40C present various perspective views of a CAD design for an exemplary Cow's Mouth 80.

While the generally arcuate wall in FIGS. 33 to 36 clearly is rolled to comprise a portion of a cylinder, it is also possible for other arrangements to be used. In FIGS. 37A to 37I and FIGS. 40A to 40C for example, the generally arcuate wall comprises a single piece of plate material with two breaks, thus forming three connected walls. In either case, it is possible to 'cut-out' a portion of the sides of the generally arcuate wall to form an arch which still provides strength but allows greater flexibility for motion of the flexible corrugated hose 14 passing through the Cow's Mouth 80. The edges of these walls, as well as the passage or bore through the Cow's Mouth 80 should be chamfered, rounded or beveled, to minimize damage to the flexible corrugated hose 14 during use.

Figure 39E:
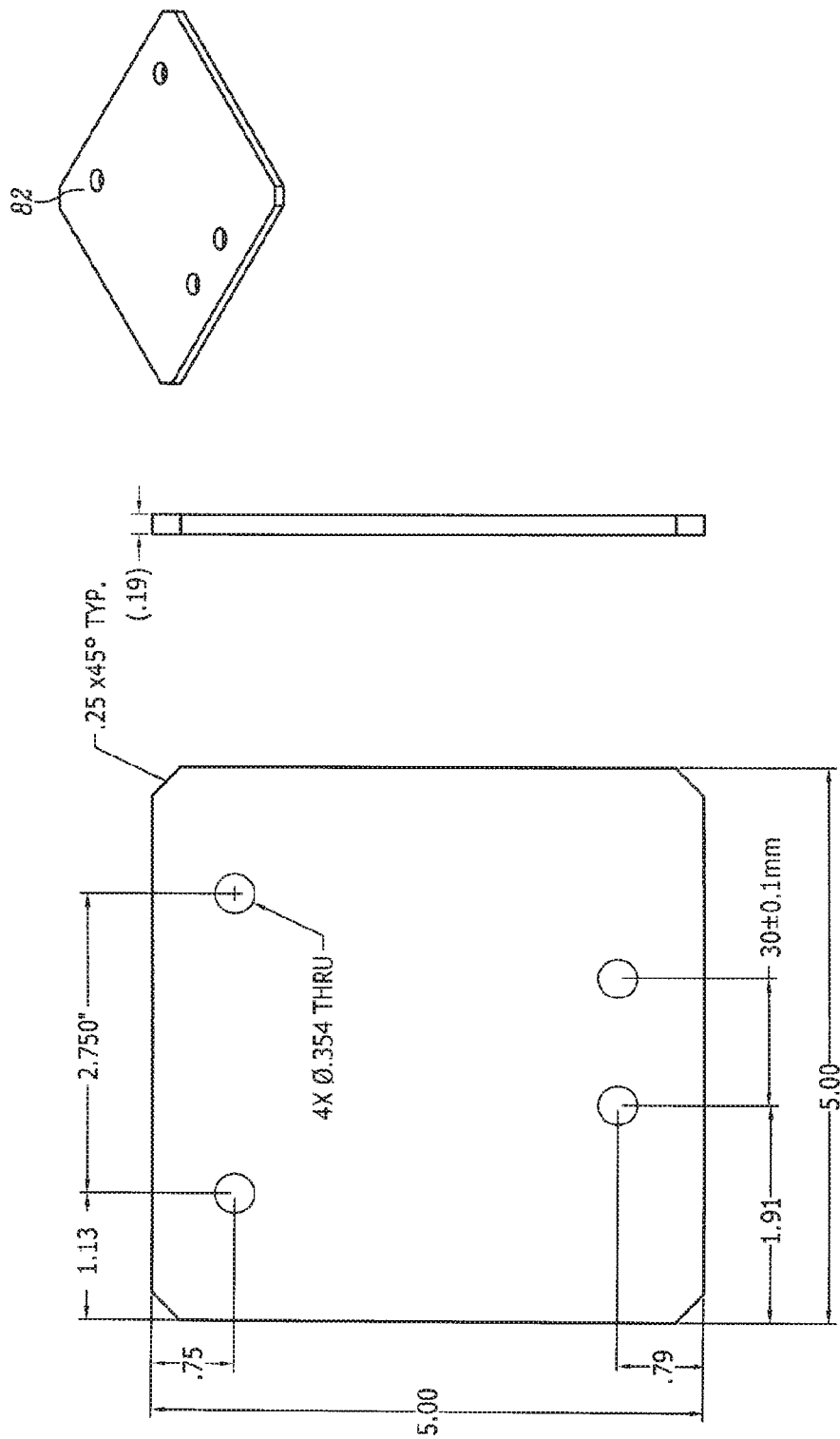
Figure 39F:
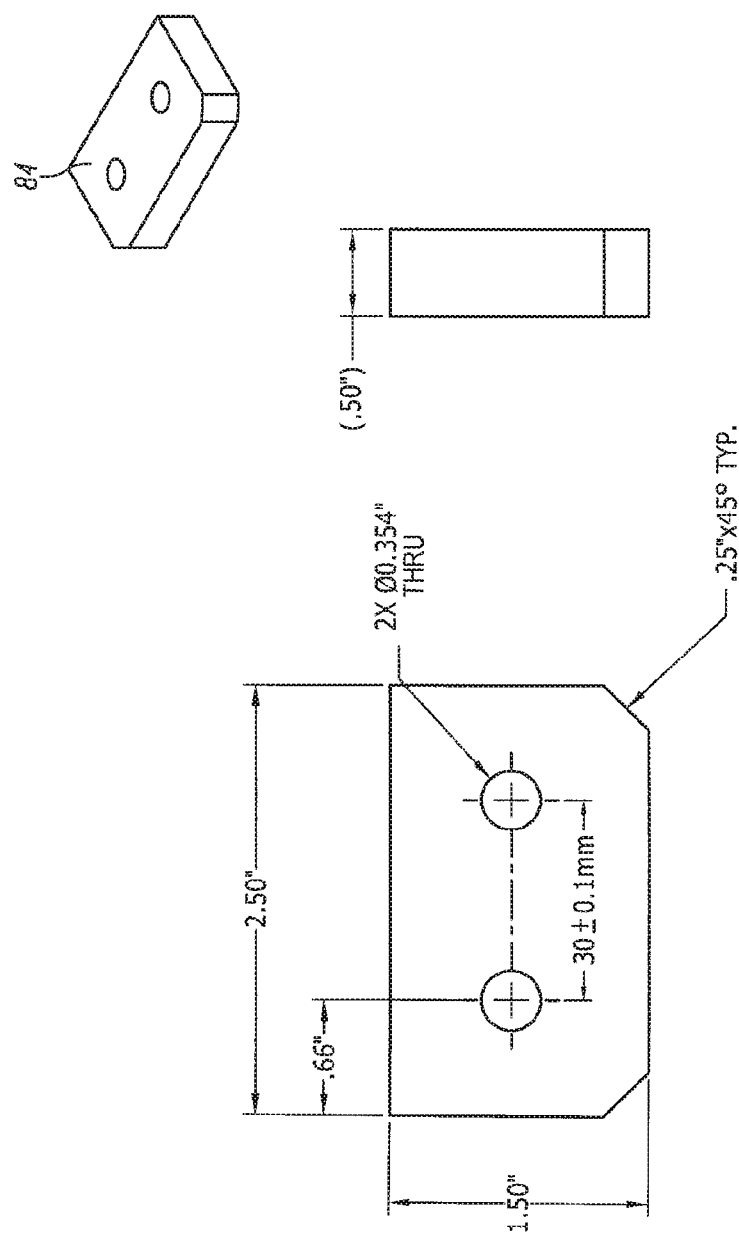
Figure 40A:
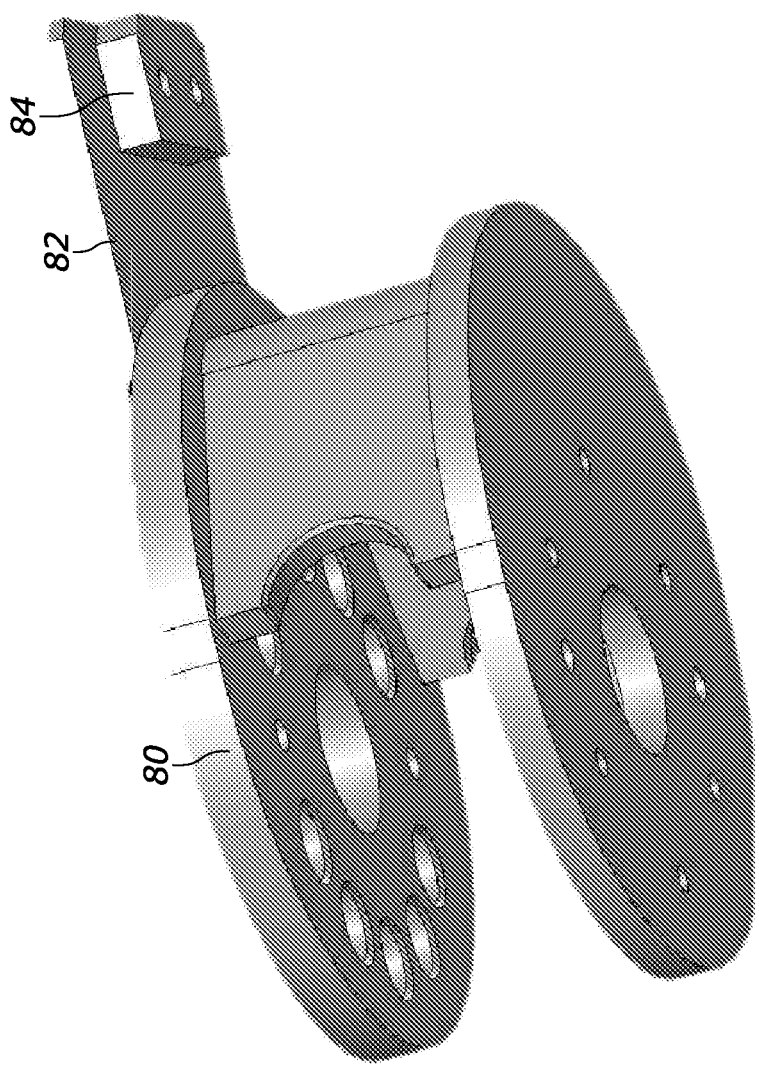
FIGS. 40A to 40C show various perspective views of a CAD design for a second exemplary cow's mouth, in an embodiment of the present invention.
Figure 40B:
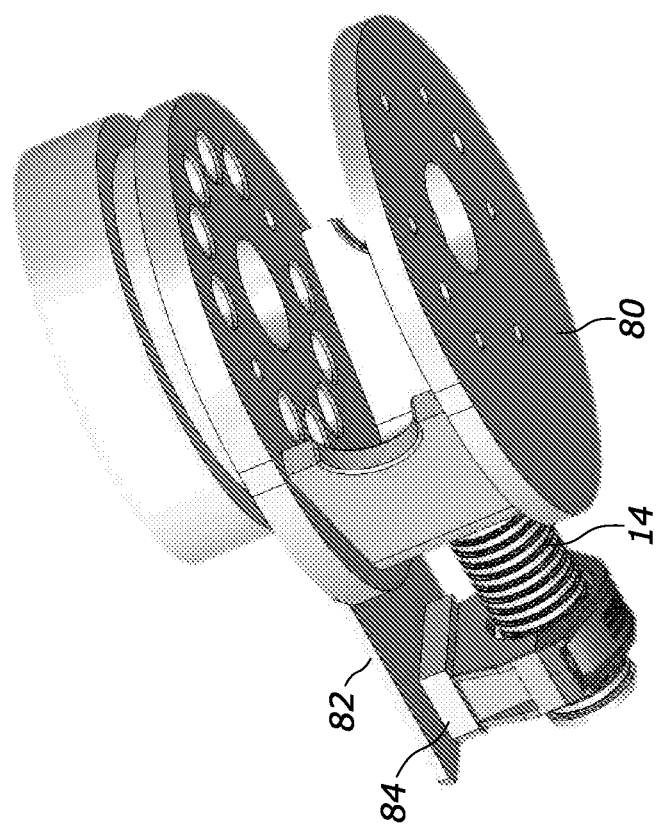
Figure 40C:
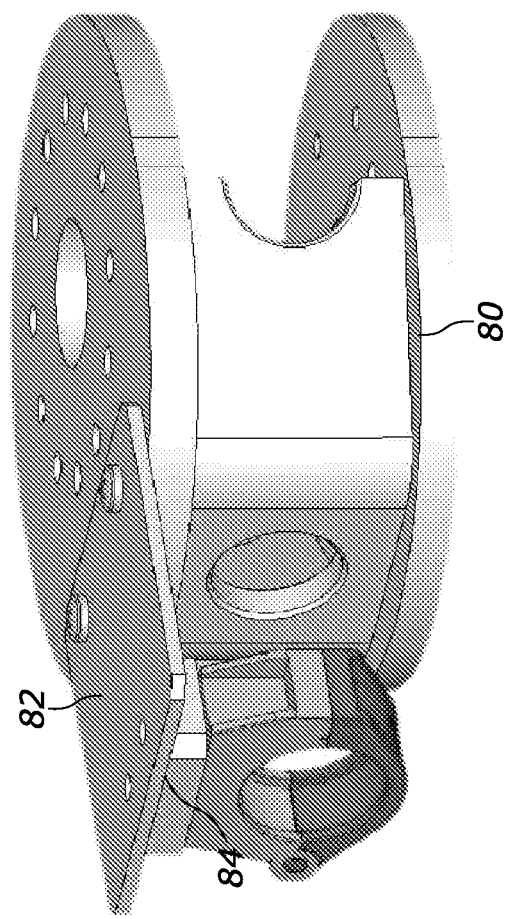

Note that FIG. 39E presents engineering details for a cow's mouth bracket assembly clamp mounting plate 82, while FIG. 39F presents engineering details for a cow's mouth bracket assembly clamp spacer block 84. The cow's mouth bracket assembly clamp mounting plate 82 and cow's mouth bracket assembly clamp spacer block 84 provide a base for clamping of a flexible corrugated hose 14 passing through it (see FIGS. 37F-37I and FIGS. 40A to 40C).

There is necessarily a tradeoff between the dimensions of the Cow's Mouth 80 and the performance of the system. That is, large robots which handle higher loads will need to use thicker materials in fabricating the Cow's Mouth 80, and will need to have smaller openings for the flexible corrugated hose 14. However, it is straightforward for a person skilled in the art to perform the necessary calculations or use CAD design software to determine the dimensions for their specific application.

Installation:

This section describes a variety of installations employing the Shoulder "A" Bracket 62 (see FIG. 24), Shoulder "B" Bracket 64 (see FIG. 25), Robot Bracket 60 (see FIG. 28), "L" Bracket 66 (see FIG. 27) and energy tube 40. Other brackets can also be fabricated and employed such as the Fanuc bracket of FIG. 26 and the Yaskawa bracket of FIG. 29.

Figure 8:
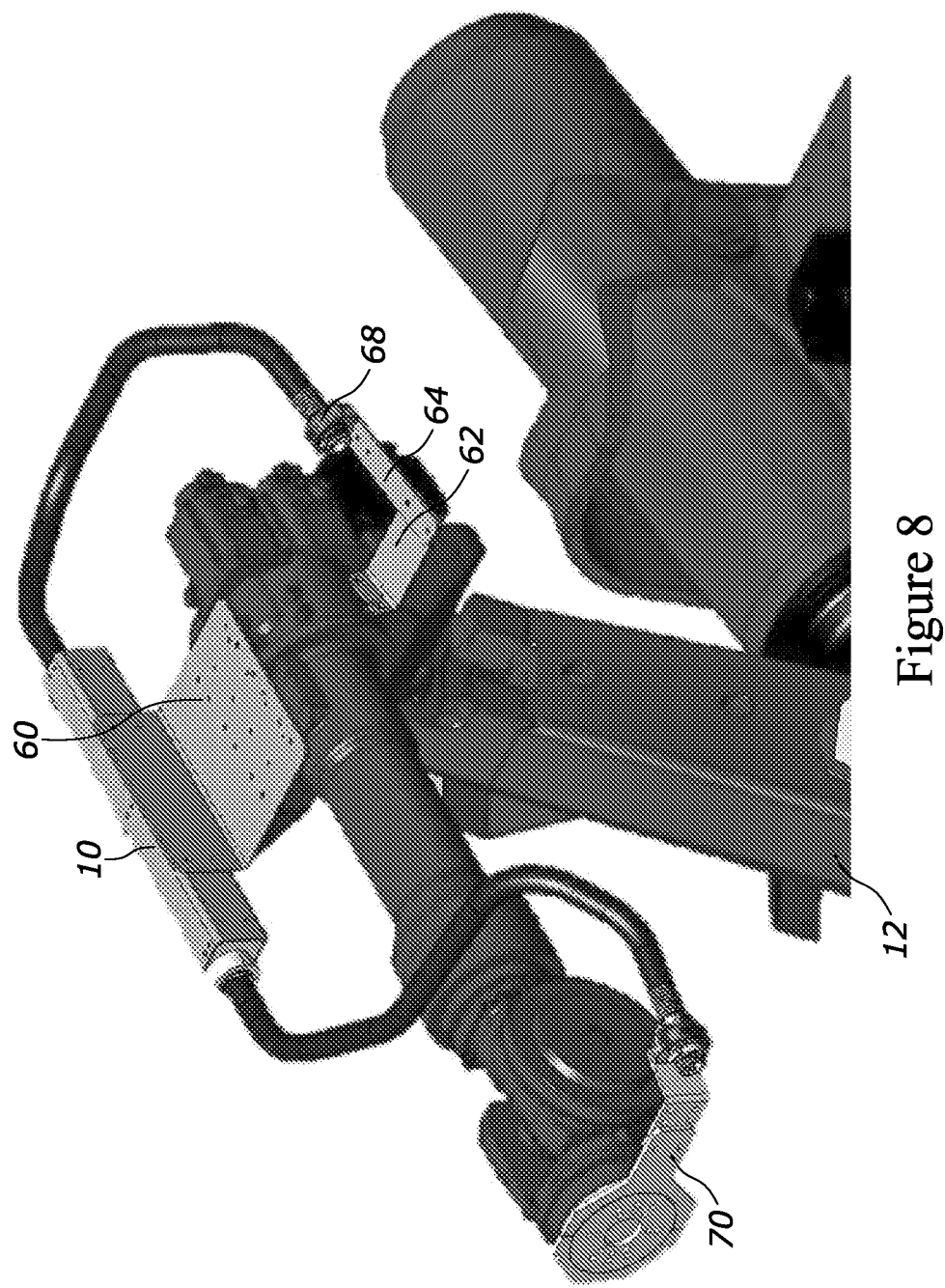
FIGS. 8 and 9 show example of "frying-pans" in accordance with further embodiments of the present invention.
Figure 9:
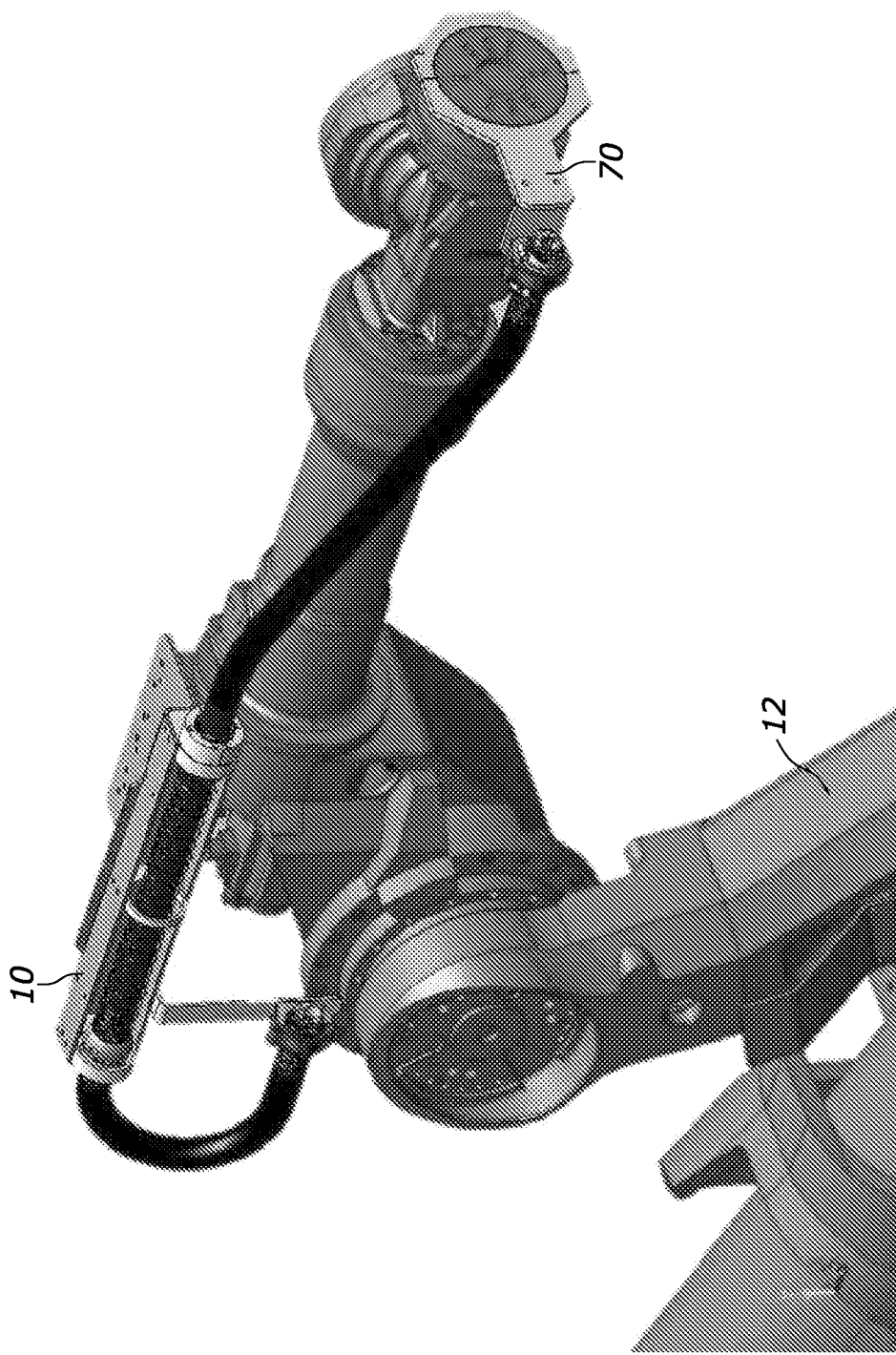

Referring to FIGS. 8 and 12, it is recommended that the main Robot Bracket 60 should be the first piece of mounting hardware to be fixed to the robot 12. Note that there are multiple mounting holes in the main Robot Bracket 60 to provide flexibility in the orientation and location of this bracket on the robot 12. It would be straightforward to fabricate additional adapter plates if required, to accommodate other applications or other makes/models of robots 12. It is recommended that the flexible corrugated hose 14 be shortened only after the Cable Saver 10 has been completely installed and tested.

The first consideration should be on which side of the robot 12 to mount the energy tube 40, and hence the main Robot Bracket 60. Factors affecting this decision may include the following:

is there adequate clearance for the corrugated flexible tubing 14 on the left or right side of the robot 12?

is there adequate clearance for the corrugated flexible tubing 14 above the robot 12?

when installing on an existing application observe what side the cables and hoses are currently routed as termination points and connector locations may dictate optimum location for the corrugated flexible tubing 14 to be run.

Figure 2:
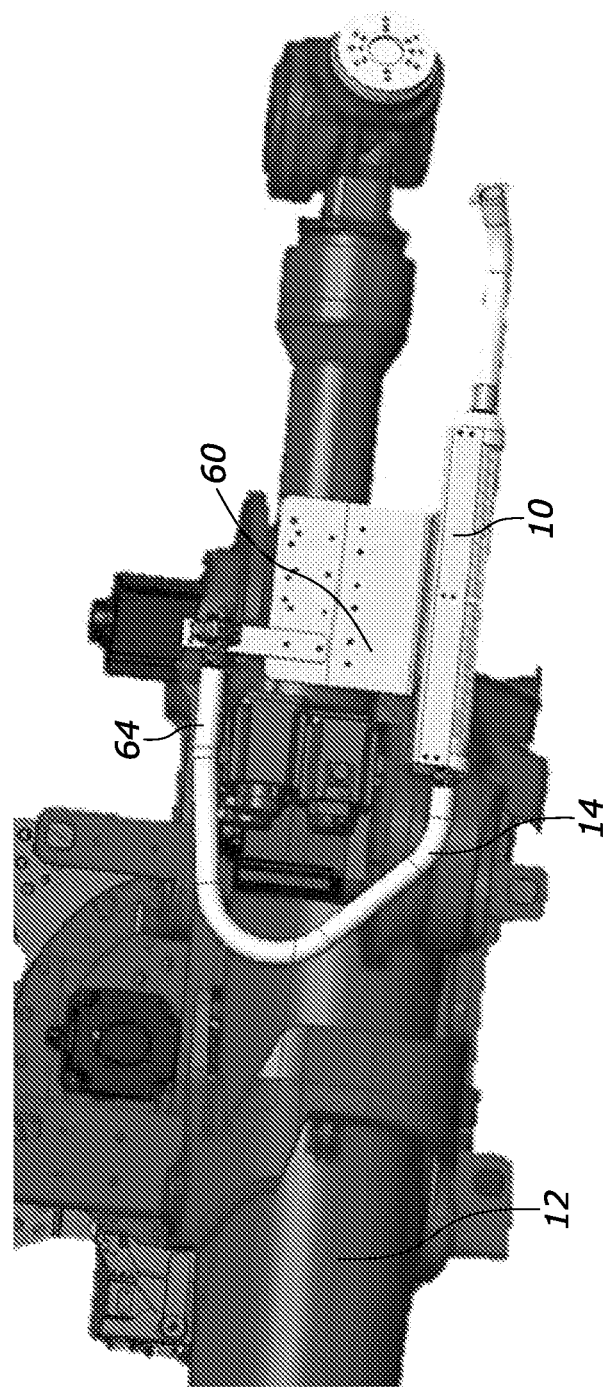
FIG. 2 shows an example of right side installation in accordance with a further embodiment of the present invention.
Figure 41:
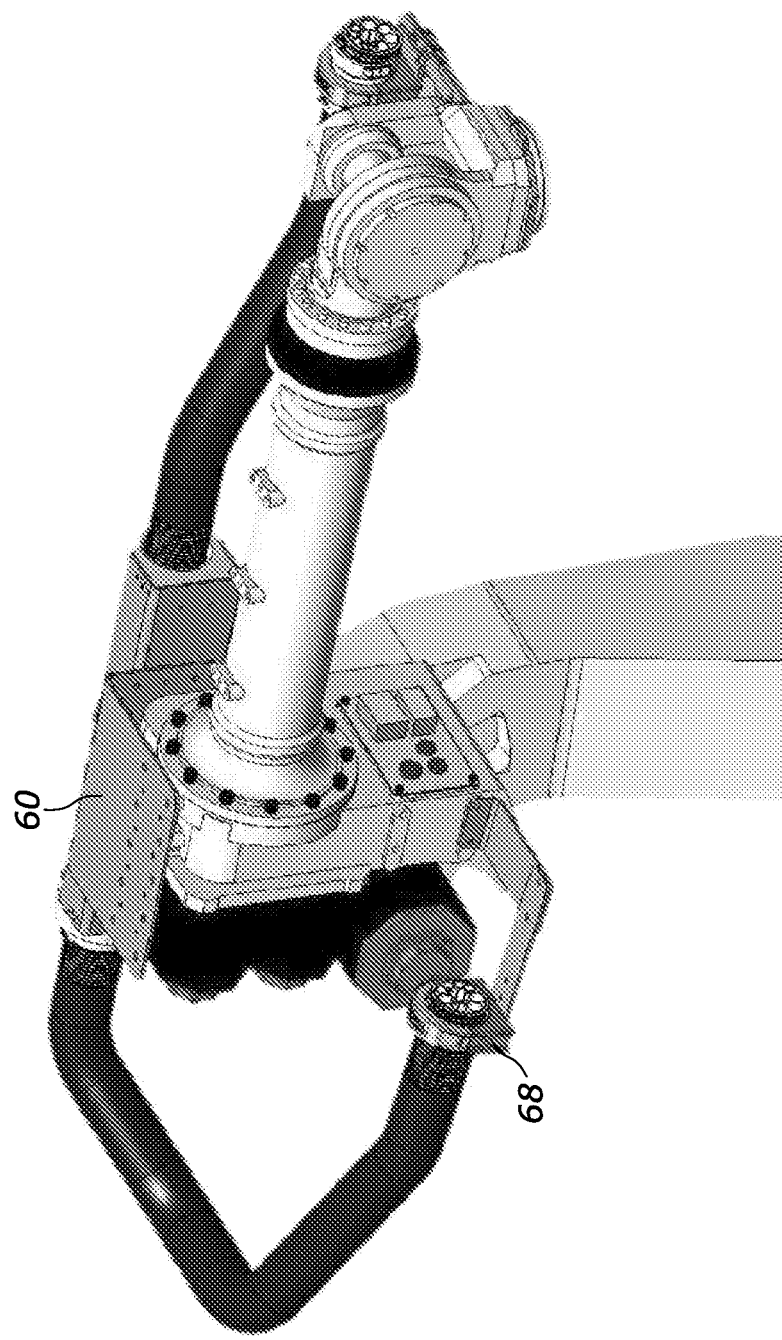
FIG. 41 shows a robot bracket installed in an inverted position on the Axis three area of a robot, in an embodiment of the present invention.

Install the Robot Bracket 60 in the orientation that compliments the side you have selected which will provide the maximum clearance for the flexible corrugated tubing 14 to be routed. As an example, FIG. 1 shows the Robot Bracket 60 mounted on the left side of the robot 12, while FIG. 2 shows it mounted on the right side. Note that the Robot Bracket 60 can be inverted so that the energy tube 40 is mounted lower than the top of the Axis three area (see FIG. 41). This will provide additional clearance for installations where there is limited overhead space.

Next, the mounting hardware for the #1 Clamp Assembly 68 should be installed. Part of the decision on how to orientate the Robot Bracket 60 and location of the energy tube 40 should be based on the current routing for the cables and hoses from Axis 3 to the EOAT (end of arm tool area). On some models of robots 12 some of the supply lines are routed internally from Axis 1 to Axis 3 so the use of the "A" bracket 62 and "B" bracket 64 can be an option for support of the #1 Clamp Assembly 68.

Note that in FIGS. 1 and 2 only the "B" Bracket 64 has been used for the #1 Clamp Assembly 68, the "B" Bracket 64 being attached to the Robot Bracket 60. The Robot Bracket 60 has been designed to accommodate this, being provided with multiple attachment hole options for installation of the "B" Bracket 64 and the #1 Clamp Assembly. A third option for locating the #1 Clamp Assembly is to utilize the "L" Bracket 66 as shown in FIGS. 5A and 5B. In this case the "L" bracket 66 attaches to the underside of the energy tube 40 and then the #1 Clamp Assembly attaches to the "L" Bracket 66.

The next recommended step is to attach the energy tube 40 to the Robot Bracket 60. The energy tube 40 can be mounted at two potential heights by using the middle and bottom row of holes or the middle and top row of holes. The energy tube 40 can also be moved towards the rear or towards the front of the robot 12 depending on which set of holes are utilized.

For the final clamping location at the End Of Arm Tool (EOAT) area there numerous mounting options and the optimal selection is application driven. As a person skilled in the art would be aware, there are many factors that will affect the selection for the optimum mounting option at the EOAT.

For some installations/applications the ability to mount the #3 Clamp assembly directly to the tool or tool fixture could be an option. In other applications a frying-pan mount may be used, such as one presented in FIGS. 38A to 38E, or in FIGS. 44A to 44C. The frying-pan portion is attached "around" the wrist of the robot 12. The I.D. for the frying-pan selected will be dependent on the O.D. of the wrist of the robot 12. There are also optional handle designs for frying-pans such as long and short flat handles, as well as round handled versions. The selection of the frying-pan handle will be application driven.

The most adaptable and optimal recommendation for the EOAT area is to use the Cow's Mouth 80 described above. The Cow's Mouth 80 is a unique bracket that is mounted to the faceplate of the robot 12, allowing the flexible corrugated hose 14 to ride inside the open "mouth" area which prevents the flexible corrugated hose 14 from wrapping around the Robot wrist. The Cow's Mouth 80 is available in three sizes in order to work with the three different sizes of Cable Saver 10 corrugated flexible tubing: 36 mm, 52 mm and 70 mm. The Cow's Mouth brackets 80 have a variety of mount hole patterns to accommodate most standard robot faceplace mount configurations and hole patterns for robot tools.

At this point it is recommended that the robot 12 be cycled through its operating range, if possible. It is also recommended that the flexible corrugated hose 14 not be populated with any cables and hoses until after the location of the system components has been tested and fined-tuned, and the flexible corrugated conduit 14 has been cut to the correct length.

The service loop that runs from the #1 Clamp Assembly to the rear of the energy tube 40 will need to be shortened eventually but it is recommended that the flexible corrugated hose 14 be allowed to run out past the #1 Clamp Assembly until the initial cycling and testing has been completed. It is important to observe the behaviour of the service loop with the robot 12 moving, as there is the potential that you may wish to relocate the #1 Clamp Assembly.

It is also suggested that you allow the flexible corrugated hose 14 to run past the #3 Clamp Assembly until the flexible corrugated hose 14 behaviour is observed with the Robot cycling. The #3 Clamp Assembly can be opened and the Middle Jaws can be relocated on the flexible corrugated hose 14 to shorten or lengthen the service loops in order to observe the effects that will occur when the flexible corrugated hose 14 is cut.

Of course, relocating the energy tube 40 on the Robot Bracket 60 will affect the length of conduit service loops. Also, moving the Robot Bracket 60 position on the robot 12 itself will affect the length of the conduit service loops. These impacts must be considered as part of the fine-tuning process. If by chance the flexible corrugated hose 14 is cut too short and relocating the energy tube 40 or Robot Bracket 60 does not provide a solution, then a Protector/Wear Ball 42 may be used to splice on a length of flexible corrugated hose 14 that has accidentally been cut too short.

Once you are satisfied that there is adequate flexible corrugated hose 14 for both service loops then cut the flexible corrugated hose 14 to length. Using liquid paper to mark the flexible corrugated hose 14 works well as this provides a readily visible reference mark that can easily be scraped off.

At this point you can populate the flexible corrugated hose 14 with the cables and hoses. Once the flexible corrugated hose 14 is cut to length and the cables and hoses are installed, cycle the robot 12 and install protectors 42 in any areas where the flexible corrugated hose 14 is making contact with the Robot arm/wrist or tool areas.

Figure 42A:
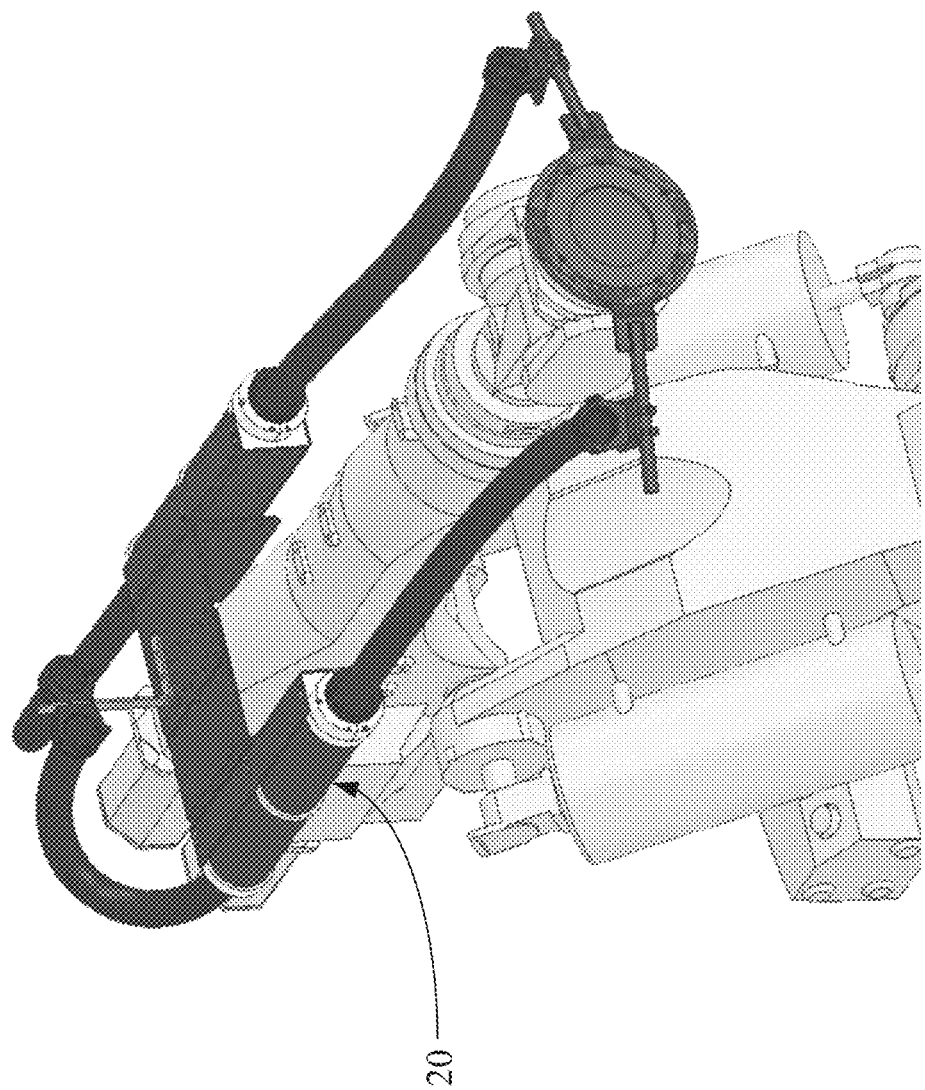
FIGS. 42A to 42B show various perspective views of an exemplary implementation of a pair of Cable Savers mounted on opposing sides of a robot, in an embodiment of the present invention.
Figure 42B:
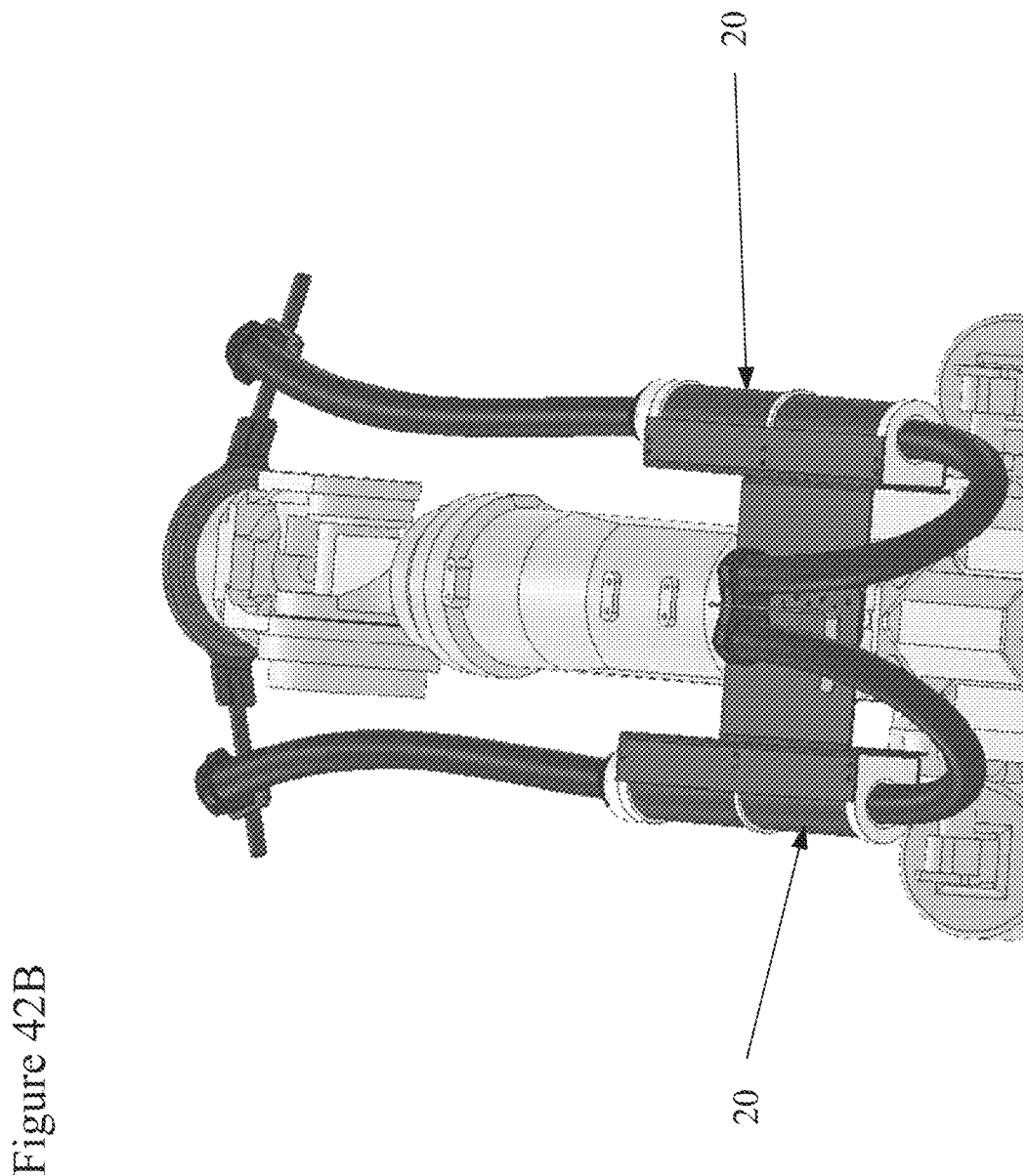
Figure 43A:
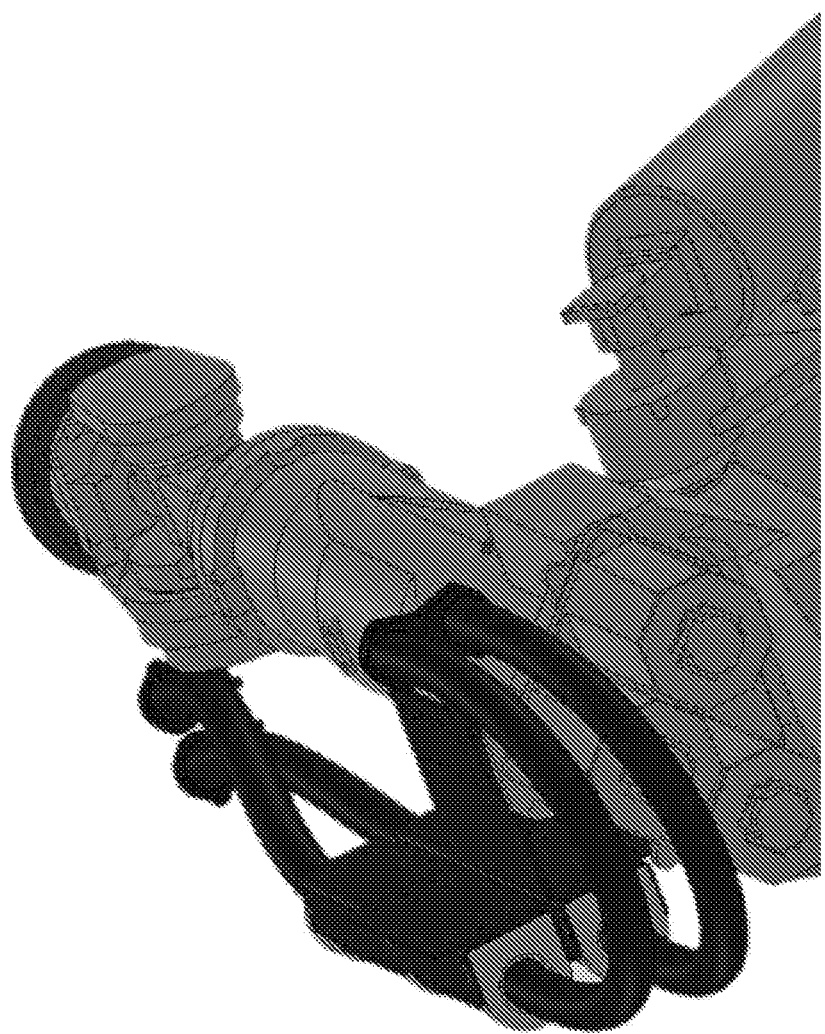
FIGS. 43A to 43C show various perspective views of an exemplary implementation of a pair of Cable Savers mounted on a robot in tandem, in an embodiment of the present invention.
Figure 43B:
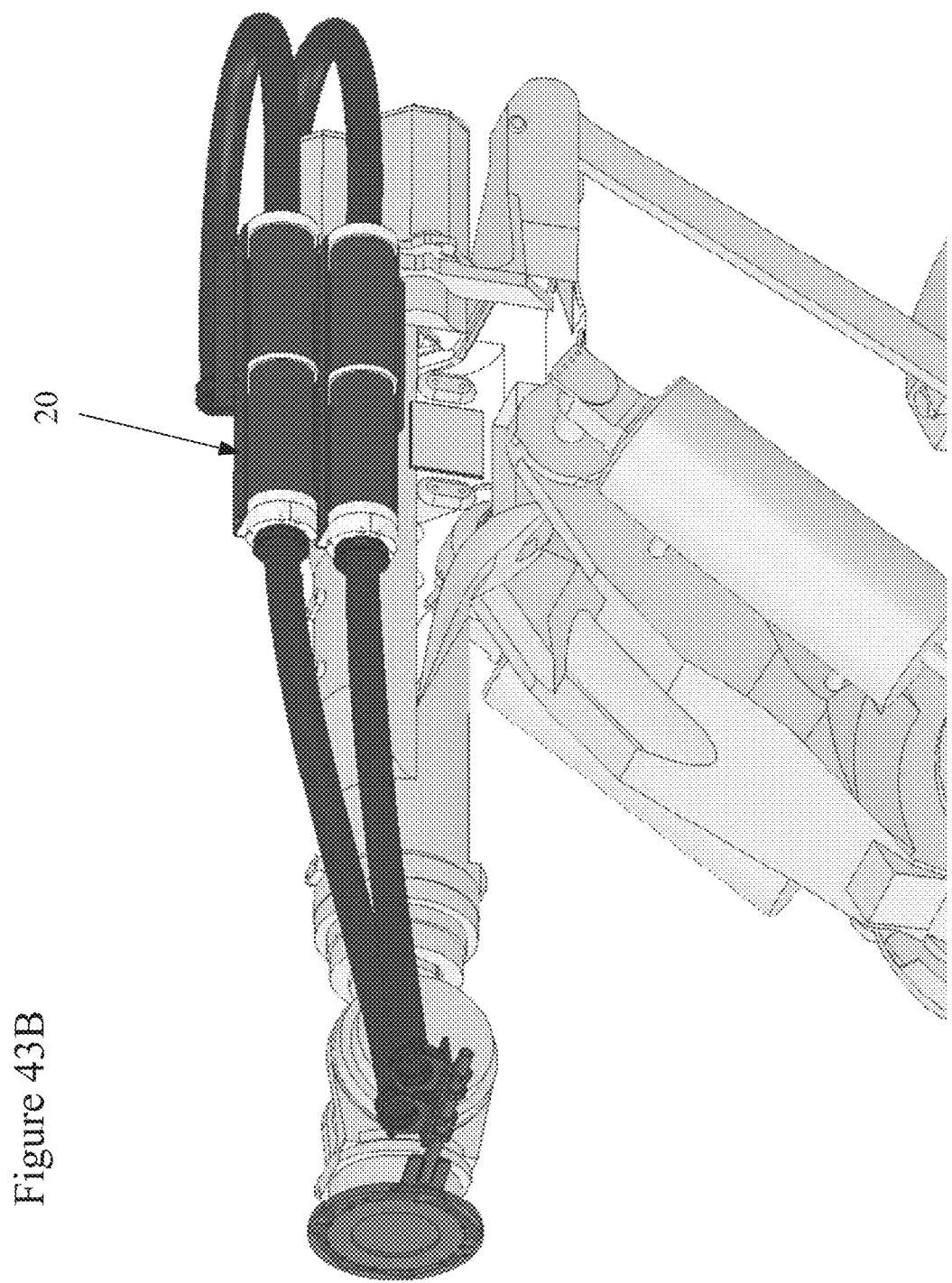
Figure 43C:
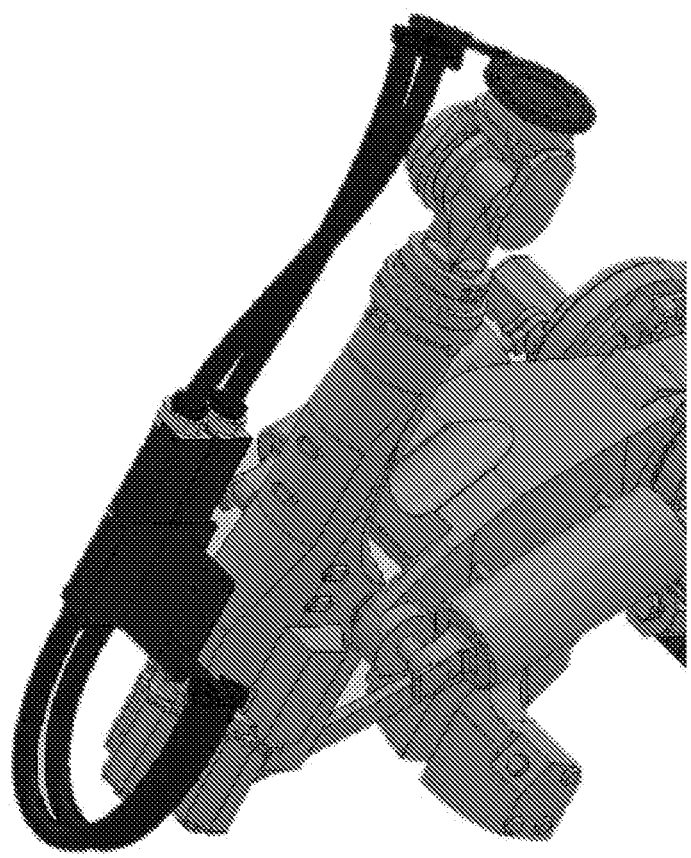

As previously noted, the system of the invention provides a number of advantages in terms of smaller size and flexibility in installation. As a result, many different installation configurations can be achieved, which were not possible with prior art systems. For example, as shown in FIGS. 42A to 42B it is possible to mount a pair of Cable Savers 10 on opposing sides of a robot 12. As another example, it is possible to mount a pair of Cable Savers 10 on a robot 12 in a tandem configuration, either side-by-side or one above the other as shown in FIGS. 43A to 43C.

Options and Alternatives:

The invention has been described with respect to particular examples and embodiments, but many options and alternatives may be used. For example:
1. different components, dimensions or manufacturers may be used than those described herein; and
2. different fabrication materials may be used if dictated by the environment (non-ferrous, non-metallic, chemical resistant, etc.)

CONCLUSIONS

While particular embodiments of the present invention have been shown and described, it is clear that changes and modifications may be made to such embodiments without departing from the true scope and spirit of the invention.

All citations are hereby incorporated by reference.

What is claimed is:

1. A device for guiding at least one supply line in a robot installation, comprising:
    a flexible hose for containing the at least one supply line;
    a rigid tube for containing at least a portion of the flexible hose, the rigid tube having a length and being positioned in a channel-shaped support extending the length of the rigid tube, wherein the rigid tube is fixed to the channel-shaped support by way of a front plate positioned at a first end of the channel-shaped support and a back plate positioned at a second end of the channel-shaped support, the front plate and the back plate each having a groove or shoulder for matingly engaging with their respective ends of the rigid tube, and fixing the position of the rigid tube within the channel-shaped support;
    wherein the front plate and the back plate each have an opening for the flexible hose, and the flexible hose extends through the opening in the front plate and the opening in the back plate;
    wherein the rigid tube prevents the flexible tube from extending laterally outside the channel-shaped support along the length of the rigid tube between the front plant and the back plate; and
    a spring element enclosed by the rigid tube, a first end of the spring element being fixed to the front plate, and a second end of the spring element being fixed to the flexible hose by way of a circular clamp or brace having an outside diameter which is smaller than an inside diameter of the rigid tube and larger than the opening in the back plate, whereby the flexible hose is drawable out of the rigid tube through the opening in the front plate against a force of the spring element, in a longitudinal direction of the rigid tube, the spring element urging the flexible hose to return to a home position.

2. The device according to claim 1, wherein the channel-shaped support is provided with drilled and tapped holes for mounting of the device on the robot.

3. The device according to claim 1, wherein the back plate comprises a funnel- or trumpet-shaped entrance.

4. The device according to claim 1, wherein the rigid tube is further fixed to the channel-shaped support by way of a middle support positioned between the front plate and the back plate.

5. The device according to claim 1, wherein the flexible hose comprises a flexible corrugated hose.

6. The device according to claim 1, wherein the spring element comprises a compression spring.

7. The device according to claim 1, wherein the spring element comprises an extension spring.

8. The device according to claim 1, wherein the rigid tube is circular in cross-section.

9. The device according to claim 1, wherein the flexible hose is circular in cross-section.

10. The device according to claim 1, wherein the rigid tube has an inner diameter defining a cylindrical passage which contains at least the portion of the flexible hose.

11. The device according to claim 10, wherein the inner diameter defining the cylindrical passage is provided by a pipe.

\* \* \* \* \*